US007346728B1

(12) United States Patent  (10) Patent No.: US 7,346,728 B1
Jackson  (45) Date of Patent:  Mar. 18, 2008

(54) METHOD AND APPARATUS FOR A HUB CAPABLE OF BEING SELF-POWERED FOR USE IN A USB-COMPLIANT SYSTEM

(75) Inventor: Daniel Kelvin Jackson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 11/109,029

(22) Filed: Apr. 18, 2005

(51) Int. Cl.
*G06F 13/20* (2006.01)
(52) U.S. Cl. .................. 710/313; 710/300; 710/306; 710/62
(58) Field of Classification Search ........ 713/310–320, 713/323–340; 710/300–306, 313–315, 62–64, 710/72
See application file for complete search history.

(56) References Cited

U.S. PATENT DOCUMENTS

| | | | | |
|---|---|---|---|---|
| 5,675,813 | A * | 10/1997 | Holmdahl | 713/310 |
| 5,799,196 | A * | 8/1998 | Flannery | 713/320 |
| 5,818,948 | A | 10/1998 | Gulick | |
| 5,819,051 | A | 10/1998 | Murray et al. | |
| 5,884,086 | A | 3/1999 | Amoni et al. | |
| 5,890,015 | A | 3/1999 | Garney | |
| 6,105,143 | A * | 8/2000 | Kim | 713/324 |
| 6,128,743 | A | 10/2000 | Rothenbaum | |
| 6,131,125 | A | 10/2000 | Rostoker et al. | |
| 6,253,329 | B1 * | 6/2001 | Kang | 713/300 |
| 6,308,215 | B1 * | 10/2001 | Kolbet et al. | 709/233 |
| 6,584,519 | B1 | 6/2003 | Russell | |
| 6,697,372 | B1 | 2/2004 | McAlear | |
| 7,028,133 | B1 * | 4/2006 | Jackson | 710/313 |

FOREIGN PATENT DOCUMENTS

CA   2262334   8/2000

OTHER PUBLICATIONS

Siegmund et al: Efficient Modeling and Synthesis of On-chip Communication Protocols for Network-On-Chop Design; IEEE Xplore, release 2.1; Appears in: Circuits and Systems, 2003, ISCAS '03, Proceedings of the 2003 Int'l Symposium . . . May 25-28, 2003, vol. 5, 2 pages.

(Continued)

*Primary Examiner*—Raymond N Phan
(74) *Attorney, Agent, or Firm*—Philip A. Pedigo

(57) ABSTRACT

Method and apparatus are described for improving information transfer over USB. In one approach, hub-based extension is realized wherein power is distributed using auxiliary wiring distinct from signal and power wiring present in conventional USB cabling. Additional signals allow optimization of power distribution for powering attached devices, and for detecting and handling illegal connection configurations.

In another approach, improvements are realized through use of alternative signaling techniques which eschew reflective and high-speed common-mode signaling. Described are various configuration, media and signal-protocol combinations, including implementations containing embedded hubs. Methods ensuring reliable system behavior are also described, including determination of extension path delay and use of topology-enforcement hubs.

In other approaches, further improvements are realized by allowing information exchanges to take longer than the nominal timeout period, or by allowing host requests to be delayed for transmission until the extended bus is available for use.

7 Claims, 42 Drawing Sheets

OTHER PUBLICATIONS

Glazar et al, FM RDS PnP Radio Receiver, vol. 1 pp. 114-117, IEEE Xplore, Appears in Eurocon 2003, May 2002.

Nathan et al, Design and Features of an Intelligent PC-Based DAB Receiver, vol. 48, issue 2 pp. 322-328, IEEE Xplore, Appears in Consumer Electronics, May 2002.

Icron, Technology Sheet: USB Innovation—Icron's Extended Range USB Technology, 1999, 1 page.

Icron, Technology Sheet, Extended Range USB Technology, PC-To-Remote Peripheral USB Extension, 1999, 3 pgs.

PCT ISR dated Aug. 9, 2001.

Universal Serial Bus Specification, Compaq, Intel, Microsoft, NEC, Revision 1.1, Sep. 23, 1998.

USB Innovation—Icron's Extended Range USB Technology Sheet, 1999, Icron Systems, Inc., Delta, BC, Canada.

FM RDS PnP radio receiver by Glazar, B; Jankovec, M.: Topic, M. (abstract only) Publication Date: Sep. 22-24, 2003.

Design and features of an intelligent PC-based DAB receiver by Nathan, D.; Sputh, B.; Faust, O.; Chua Beng Koon (abstract only) Publication Date: May 2002.

\* cited by examiner

XOHUB FUNCTIONAL BLOCKS, SIMPLIFIED

QUAD-SIMPLEX COMMUNICATION

DUAL-DUPLEX COMMUNICATION

SINGLE - DUPLEX COMMUNICATION

QUAD-SIMPLEX SIGNATURE, WITH WAVEFORMS EXAMPLE

DUAL-DUPLEX UTILIZING SIMULTANEOUS BI-DIRECTIONAL SIGNALING, WITH CERTAIN ASPECTS OF ANALOG CIRCUITRY RELATED THERETO SHOWN

FIG. 13 DUAL-SIMPLEX THREE-LEVEL SIGNALING, WITH EXAMPLE WAVEFORM

ALTERNATE THREE-LEVEL SIGNALING EXAMPLE

FOUR-LEVEL SIGNALING EXAMPLE

THREE-LEVEL PULSE SIGNALING EXAMPLE, WITH EXAMPLE WAVEFORM AND INTERPRETATION

SINGLE-DUPLEX, UTILIZING SIMULTANEOUS BI-DIRECTIONAL SIGNALING, WITH CERTAIN ASPECTS OF ANALOG CIRCUITRY RELATED THERE-TO SHOWN

FIG. 19    FAR-END EXTENDER UNIT WITH EMBEDDED HUB

NEAR-END EXTENDER UNIT WITH EMBEDDED HUB

Near- and Far-end UUTs accomplishing extension of multiple low-speed devices through use of near-end embedded hub, near-end multiplexing circuitry, extension cable and far-end demultiplexing circuitry.

Extensions with all units residing on the extension.

FIG-39  Extensions connected to its own USB system.

Extension wherein non-extended units' traffic occurs on the extension.

COMBINED 2.0- AND 1.1-TYPE EXTENSION.

METHOD AND APPARATUS FOR A HUB CAPABLE OF BEING SELF-POWERED FOR USE IN A USB-COMPLIANT SYSTEM

RELATED APPLICATION DATA

This application claims priority from U.S. provisional patent applications, Ser. Nos. 60/131,941, filed Apr. 30, 1999, and 60/134,769, filed May 18, 1999.

1. OVERVIEW

This invention relates to the interconnection of computers and peripherals, and more particularly to interconnections compliant with the Universal Serial Bus (USB) standard. USB is a relatively recently-developed standard defining the connection of personal computers (PCs) and peripheral devices, and is formally presented in the *Universal Serial Bus Specification. Revision* 1.1, dated Sep. 23, 1998, incorporated herein by reference, as well the *Universal Serial Bus Specification. Revision* 2.0, dated Apr. 27, 2000, incorporated herein by reference. References in the text below to Sections, Figures and Tables refer to items in the USB specification, while references to FIGs are to figures specific to this application.

This section presents an overview of relevant features of the USB.

1.1 BUS TOPOLOGY 1.1.1 Minimum Configuration

In the simplest case, the PC may provide two USB ports, allowing attachment of two devices (one to each port). A USB cable is used to connect a device to a USB port; the cable may be permanently attached to the device (a "captive" cable), or the device may allow a detachable cable to be used to connect it to the USB port.

The USB specification defines the physical characteristics of the USB connectors used, as well as the physical and electrical characteristics of the types of cable that can be used.

1.1.2 Expansion Via Hubs

In order to allow for the connection of more than just two devices, USB hubs can be used. The hub is a device which connects to a USB port (such as that of the PC) on one end (the "upstream" end, the end logically closer to the PC), and provides a set of USB ports for attachment of devices and/or other hubs (on the "downstream" end, the end logically farther away from the PC). The hub, then, acts as an expansion-faciltating unit (refer to FIGS. 4-1, 4-3 and 4-4).

Commercially available hubs may provide two, four or as many as seven downstream ports.

1.1.3 Number of Devices

Each device in the USB system is assigned an address via which the controlling PC (host) uses to communicate with the devices. A maximum of 127 addresses is supported in any USB system.

Note that the host communicates with the hubs as if they were, devices for the purpose of controlling them, and thus each hub has assigned to it an address also.

1.1.4 Number of Levels of Hubs

The USB system supports a bus topology in which the number of levels of hubs is a maximum of five. This means for instance that in moving from the host outward (downstream), through any hubs and then arriving finally at a device, the number of hubs encountered can be five or less.

This limit should not be confused with the total number of hubs (or devices, or addresses) in a USB system, which is 127 (as defined above).

Note that it is the operating system (OS) of the PC which enforces this limit; if it is attempted to attach a sixth hub in line then the OS, upon determining that it is a hub which is being connected, will not enable that hub to function.

1.1.5 Number of USB Systems

Although typically the PC will have a single USB system (with two ports) implemented (usually in the chip-set of the computer's motherboard), PCs with PCI bus capability can make use of commercially available add-on PCI cards to implement additional USB systems (each additional system having two USB ports).

1.1.6 Root Hub

At the root of the USB system in the PC is a USB host controller, the hardware means n of sending and receiving information over the externally-connected collection of hubs and devices. The host controller works in conjunction with a root hub (implemented with the host controller in the PC) having two downstream ports; this is the means by which the PC is able to provide two "root ports" for connection of hubs and devices (refer again to FIGS. 4-1).

Note that the five-hub-level limit is exclusive of the root hub; the limit relates just to the externally-connected hubs in the system.

1.2 DEVICE POWERING

Devices may supply the power they need to operate (e.g., obtain power from the AC power mains (usually via an intermediary AC-powered DC power supply, located either within (part of the device, or located externally), independent of USB: "self-powered" (refer to FIGS. 7-36)), or they can use power provided by the USB system ("bus-powered;" refer to FIGS. 7-34 and 7-35).

Like devices, there are also two versions of hubs: self-powered and bus-powered (refer to FIGS. 7-33 and 7-32 respectively).

Bus-powered devices which are "low-power" can use up to 100 mA of the 5 Volt power current on its USB segment; "high-power" devices can use up to 500 mA.

Devices and hubs are required to reduce their power current to 500 uA during the suspend condition (described below), although units configured to perform remote wakeup signaling can utilize a higher level of average power current consumption (refer to FIGS. 7-38).

1.3 DEVICE SPEEDS

Two types of devices are provided for by the USB specification, a full-speed device and a low-speed device. Most devices are full-speed type; some low-cost devices (such as mice and keyboards) are low-speed. The "device portion" of a hub (that portion of the hub which is controlled by the host) acts as a full-speed device.

The low-speed devices send and receive information at a lower data rate than do full-speed devices (one-eighth (12.5%) of the full-speed rate).

1.4 CONNECTORS

The USB specification provides for two types of connectors at the upstream and downstream ports of hubs and at the upstream ports of devices. Type "A" jacks (connectors) are used at downstream ports, while type "B" jacks (connectors) are used at upstream ports (refer to FIGS. 6-1).

Use of two physically-different types of connectors, along with the cabling defined by the USB specification (described below), means that configuring systems with illegal topologies (such as the connection of two downstream hub ports together) cannot be accomplished.

1.5 CABLING

1.5.1 Plugs

Detachable USB cables are defined to have a type "A" plug at one (upstream) end, and a type "B" plug at the other (downstream) end. A captive cable permanently attached to a device (or to the upstream port of a hub) has a type "A" plug at the free end. (Note that low-speed devices are required to employ a captive cable).

1.5.2 Signals

Four signals are present in the USB cable of any USB bus segment: Vbus; D+, D− and Gnd. Vbus carries +5 Volt power; D+ and D− are the USB signals proper (refer to FIGS. 4-2).

For cabling used with full-speed devices (whether detachable or captive), the wires in the cable transporting D+ and D− constitute a twisted pair, with a surrounding shield also present in the cable (refer to FIGS. 6-11).

For cabling used with low-speed devices (always captive), the twisted pair and shield are not required.

1.5.3 Length

Full-speed cabling for any USB bus segment can be up to five meters long, with USB detachable cables of lengths of 1, 2, 3, 4 or 5 meters commercially available. The longer-length cables must employ larger diameter (smaller gauge) Vbus and Gnd wires in the cable in order to minimize the voltage drop on Gnd (and Vbus) (refer to Section 6.4.2). A captive low-speed cable can be a maximum of three meters in length.

One principal reason for the limitation of five meters for the maximum length of a USB cable is due to the reflective signaling employed during full-speed information transfer on the bus segment (refer to FIGS. 7-4). (The signal is reflected back at the receiving end of the cable, and is required to return to the sending end again before the next bit transition occurs; this results in a maximum of 26 ns for the one-way propagation delay of a cable, which in turn determines the maximum cable length.)

Another principal reason for the five-meter limitation is to ensure that the power voltage delivered down the bus segment is within its proper range (refer to Section 7.2.2).

1.6 POWER DISTRIBUTION

1.6.1 Root Ports

The host computer provides power on the USB bus segment connected to it via the Vbus wire; a bus-powered device or hub connected to a root port of the host can utilize the power provided by the computer to function.

The host usually provides 500 mA of +5 Volt power current at each of its root ports (some laptop hosts may provide only 100 mA).

Hubs also play a role in power distribution, as discussed next.

1.6.2 Self-Powered Hubs

At each of its downstream ports, a self-powered hub provides 500 mA of USB power current.

1.6.3 Bus-Powered Hubs

At each of its downstream ports, a bus-powered hub provides 100 mA of USB power current. This implies a limit of four downstream ports for any bus-powered hub.

This also is the reason for the topological restriction that only a low-power device or a self-powered hub can be connected to the downstream port of a bus-powered hub; a high-power device or a bus-powered hub cannot be connected to the downstream port of a bus-powered hub. These constraints are enforced by the OS.

1.7 INFORMATION TRANSFER

1.7.1 Bus Ownership

The USB is actually not a conventional bus, in the sense that generally it does not allow for anything on the bus other than the host controller to be in charge of what is communicated on the bus. The host controller is always in charge of its USB system, and commands the devices and hubs in the system to take data from it or to provide it with data.

The devices and hubs have no way to become masters of the bus; there is no "peer-to-peer" communication, and the devices and hubs cannot even issue interrupt requests to the host (the host polls devices and hubs to determine whether anything of interest has happened). (Note that Devices and Hubs can Issue "Remote Wakeup" Requests to the Host.)

1.7.2 Frames

Information transfer is segregated into time periods of 1 ms each, termed "frames".

1.7.3 Electrical Signaling

The D+ and D− lines are most often employed to send a serial information stream differentially along the cable of the bus segment. The D+ and D− lines can be set either electrically high or low; this allows basic binary information ("J" and "K" states) to be communicated (refer to FIGS. 7-4 and 7-5).

The signaling protocol does define situations in which a third signaling state is required, the single-ended zero (SEZ); this is achieved by setting both D+ and D− low (refer to FIGS. 7-20).

1.7.4 Serial Bit Rate

Information is usually communicated using the full-speed bit rate of 12 Mb/s (1.5 MB/s). Information sent at the low-speed data rate occurs at 1.5 Mb/s (0.19 MB/s) (refer to Section 7.1.11).

1.7.5 Basic Bus States

A "reset" condition may be signaled by an upstream port; this is indicated by an extended SEZ on the bus segment. A similar condition can occur when no device or hub is connected on the segment (a "disconnect") (refer to FIGS. 7-15 and 7-18).

The presence of a device or hub results in a "connect", a period of J signaling following a reset. This is similar to an "idle" condition, when a connected device or hub is present but no information transfer is occurring at the moment (refer to FIGS. 7-16 and 7-17).

A message may be communicated (either from upstream to downstream, or downstream to upstream (half-duplex communication)) by a set of J and K differential signaling changes on the bus segment. The differential signaling level changes are interpreted as a stream of serial bits, which in turn are interpreted as a set of fields in the message (as described below) (refer again to FIGS. 7-20).

The message (or "packet") is ended by the sending of a SEZ (the end of packet ("EOP")), during which time the bus signaling is no longer differential. Following the EOP a return to the idle condition occurs (refer again to FIGS. 7-20).

Other bus states include the "suspend" condition, which occurs after no bus activity (an extended idle) of 3 ms, as well as the "resume" condition, which acts to end the suspend state. Devices and hubs can be configured to end the suspend state by the means of a "remote wakeup".

1.7.6 Bit Encoding

The bits of the fields of the packet are encoded in an NRZI manner, such that a J-to-K or a K-to-J differential transition indicates a logical 0 bit, whereas no differential transition indicates a logical 1 bit (refer to FIGS. 7-21). At the serial bit rate of the packet (either 12 Mb/s or 1.5 Mb/s), either a transition or no transition (a 0 or a 1) occurs in each bit time.

"Bit stuffing" is employed in the serial bit stream to limit the duration on the bus segment during which no transition occurs to a maximum of six bit times; following a series of six logical 1s, a logical 0 stuff bit (level change) occurs (refer to FIGS. 7-22). This allows level-transition-tracking circuitry to stay synchronized with the serial stream.

1.7.7 Packet Fields

1.7.7.1 Sync Field—

The first field of the packet is the "Sync" field, consisting of a fixed pattern of seven logical 0s and a final logical 1 (refer to FIGS. 7-25). This pattern is provided to enable the level-transition-tracking circuitry to initially become synchronized with the serial stream.

1.7.7.2 PID Field—

The second field of the packet is the "PID" (packet ID) field, the first four bits of which specify the type of the packet: OUT, IN, SOF, SETUP ("token" type packets); DATA0, DATA1 ("data" type packets); ACK, NAK, STALL ("handshake" type packets); PRE ("special" type packet) (refer to FIGS. 8-1 and Table 8-1).

The final four bits of the PID field provide a binary-complement check on the first four bits.

Note that no further fields follow the PID field in the case of the ACK, NAK and STALL handshake type packets, as well as for the PRE special type packet. (The PRE packet is different from the other packets in that it does not have an immediately-following EOP; the PRE packet is the pre-amble to a low-speed message being communicated from the host via hub(s) to a low-speed device. Refer to FIGS. 8-19)

1.7.7.3 Address/Endpoint Field—

Following the PID field the OUT, IN and SETUP token type packets have an eleven bit Address/Endpoint field, which specifies the address of the unit being communicated with (seven bits), as well as an "endpoint" sub-address value (four bits) (refer to FIGS. 8-2 and 8-3).

The seven bit address-field allows for the specification of 128 addresses, 127 of which may be assigned uniquely to the various units (devices and hubs) in the system. Address value 0 is reserved for communicating with devices, each in turn, before they have been assigned a unique (non-zero) address.

1.7.7.4 Frame Number Field—

The SOF token type packet employs an eleven bit field following the PID field to indicate the number of the current frame (refer to FIGS. 8-6). The SOF packet is produced by the host and sent to all devices and hubs in the system (except low-speed devices) to indicate the start of frame (hubs to which a low-speed device is connected issue a "keep-alive" SEZ (EOP) to such devices for the same purpose).

1.7.7.5 CRC5 Field—

A five bit cyclic redundancy check (CRC) field follows the address/endpoint field of the OUT, IN and SETUP token type packets; a similar field follows the frame number field of the SOF token type packet (refer to FIGS. 8-5).

1.7.7.6 Data Field—

The DATA0 and DATA1 data type packets have a Data field following the PID field (refer to FIGS. 8-7). The data field consists of an unspecified number of data bytes, from 2 to 1025 bytes. The last two bytes are utilized as a 16-bit CRC field (see below), so that the actual number of information bytes transferred is 0 to 1023.

1.7.7.7 CRC16 Field—

The last two data bytes of a DATA0 or DATA1 packet constitute a 16-bit CRC field (as described above).

1.7.8 Transactions

Packets communicated between the host and the device or hub constitute various types of transactions. Transactions are generally of the form token-data-handshake, token-handshake or token-data. The various types of transactions are employed by the host system-level software for different aspects of USB system communication and control.

1.7.8.1 Bulk Transactions—

In an OUT bulk transaction the host first issues an OUT packet, specifying the unit (address and endpoint) involved (refer to FIGS. 8-9). The host then sends a DATA0 (or DATA1) packet containing the data to be communicated. The addressed unit then responds with either an ACK packet (data received properly), a NAK packet (data could not be accepted, but the host should try again later), or a STALL packet (a fundamental problem exists with the unit, and this and other similar transactions can no longer be accepted). If the OUT or DATA packets received by the unit were corrupted, no handshake response is returned by the unit.

In an IN bulk transaction the host first issues an IN packet, again specifying the unit involved. The addressed unit then responds with a DATA0 (or DATA1) packet containing the data. The host then responds with an ACK packet (data received properly), else no handshake response is returned by the host.

1.7.8.2 Interrupt Transactions—

The OUT interrupt transaction and the IN interrupt transaction are carried out in the same manner as are OUT bulk and IN bulk transactions; there are no differences at the bus protocol level (refer to FIGS. 8-13).

1.7.8.3 Setup Transactions—

A SETUP transaction is similar to an OUT transaction, except the host initially sends a SETUP packet, followed by a DATA0 packet (refer to FIGS. 8-11). The addressed unit then responds with an ACK packet (data received properly), else with no handshake response. The unit is not permitted to return a NAK or a STALL handshake in response to a SETUP transaction.

1.7.8.4 Isochronous Transactions—

In an OUT isochronous transaction the host first issues an OUT packet, specifying the unit involved (refer to FIGS. 8-14). The host then sends a DATA0 packet containing the data to be communicated. The addressed unit provides no handshake response back to the host.

In an IN isochronous transaction the host first issues an IN packet, specifying the unit involved. The addressed unit responds with a DATA0 packet, containing the data to be communicated. The addressed unit provides no handshake response back to the host.

1.7.9 Signaling Constraints

1.7.9.1 Transaction Timeouts

For those transaction types which involve communication of a handshake packet (bulk, interrupt and setup (not isochronous)), the host or the device (or hub) insures that a response is received within a timeout period of 16 to 18 bit times (refer to Section 8.7.2). If within the timeout period the host does not see a data or handshake response from the device or hub, or if the device or hub does not see a handshake from the host, the transaction is retried (a total of three attempts is made).

1.7.9.2 Response Delay

The amount of time taken for a response to be received back is partly determined by how long it took the responding unit to formulate the response. The responding unit has 6.5 to 7.5 bit times in which to provide the response (refer to Section 7.1.18).

1.7.9.3 Network Delay

The amount of time taken for the response to be received back is also partly determined by how long the response packet was in transit over the bus (i.e., along the bus segments and through the intermediary hubs). Each tier (hub plus cable) can delay the signal by up to 70 ns (refer to FIGS. 7-31). This delay is a principal reason why the number of hubs that packet messages move through between host and device is limited to five.

1.8 PHYSICAL SEPARATION

The maximum distance that can separate a device from the host when the device is connected directly to the host, is determined by the length of the interconnecting cable; the cable can be a maximum of five meters.

FIGS. 4-1 and 7-31 imply that greater physical distance between the device and the host can be achieved through the use of intermediary hubs. Under a maximum of five hubs, each connected using a 5 meter cable the maximum distance can be 25 meters. This is the distance from the host to where the device can attach at a downstream port of the last hub.

The device may have a captive cable, in which case the total distance is increased by the length of that cable. If the device utilizes a detachable cable, the maximum total distance achievable is 30 meters.

Note that a minimum of two of the hubs used must be self-powered, since two bus-powered hubs cannot be connected in series (refer again to FIGS. 7-31). If the device is a high-power device, then a minimum of three of hubs (hubs #5, #3 and #1 in FIGS. 7-31) must be self-powered. This generally requires provision of AC mains-power to be available at points along the way between the host and the device, in order that the self-powered hubs be powered.

1.9 EXTENSION ISSUES

1.9.1 Local Extension

A user of a PC may have a mouse, keyboard or other desktop USB device with a captive cable of relatively short length (perhaps one meter), and may desire to be able to locate it farther from the host or hub to which it is attached, e.g., farther away from the computer, but still located on the desktop.

1.9.2 Incremental Extension

Computer users may desire or benefit from a "growth path," where just local extension is the initial concern. Support for additional, incrementally-added extension would then allow other desktop USB devices (such as printers and scanners) to be placed more remotely from the computer later, when desired.

1.9.2 Distance Extension

A user of a PC may have a video camera, a set of speakers or some other USB device, and may desire to be able to locate it at a relatively far distance from the host, e.g., in another room of the building or in another building.

1.9.3 Existing Solutions

1.9.3.1 Hubs—

The USB specification makes no provision for extension of the bus in any manner, except for the use of hubs.

Local extension of the bus may be accomplished through the use of a commercially available hub, although this approach is not likely to be maximally cost-effective. This is because commonly available hubs provide more than the single downstream port that an extension-optimized hub would provide.

More importantly, while hubs would provide an incrementally-expandable solution, sooner or later as the hub-chain depth is increased, the need for AC mains power (required to be available away from the immediate vicinity of the computer, to power the inevitable self-powered hub) would be felt.

These issues are even more significant in the case of distance extension of the bus, where the cost of the hubs and the requirement for AC power become more important as the extension distance increases. Additional issues here are the fact that a single, continuous cable cannot be employed to connect the host and device, as well as the 25 to 30 meter total separation distance limitation.

1.9.3.2 Passive Extension Cables—

Commercially available "passive extension cables," providing an A-to-A type connection (rather than the A-to-B type defined in the specification), may allow local extension of the bus to be achieved, but likely under conditions of marginal reliability.

The passive extension approach has the significant disadvantage of compromising signal quality, as well as adversely affecting the USB power voltage drop margins for the unit receiving power from the bus segment. Unlike the USB system defined in the USB specification, use of passive extension cables can lead to systems which do not function properly, or which may function marginally. Note for instance that there is nothing to prevent an arbitrary number of passive extenders from being placed in series on any one bus segment.

Since the signaling mechanism employed on the USB segment limits the cable propagation delay and hence the length of the cable, the passive extension approach is clearly not viable for any sort of distance extension of the bus.

1.9.3.3 Active Repeaters—

Commercially available active repeaters, providing circuitry which buffers the bus segment signals, may allow local extension of the bus to be achieved, but with a similar disadvantage as with passive extension cables of allowing a non- or marginally-functional system to be configured.

The active repeater approach addresses the five-meter cable length limitation issue involving the reflective signaling used on the bus segments, by repeatering the bus signals as the repeater circuitry of a hub would do. The approach however is not the same as the use of actual hubs, since the repeater circuitry is invisible to the OS (in the sense that the OS does not know the repeater is present), and hence the OS cannot regulate the number of repeaters used along the signal path (due also to the fact that the repeater is not controllable by the OS).

A further issue involving the repeater approach is that commercially available repeaters "steal" current from the bus in order to power themselves; the result is that the USB power voltage and/or current available to a device at the far end of a series of repeaters may be marginal.

A yet further issue involving the repeater approach is that commercially available repeaters are implemented using standard USB cabling, which is inadequate to deliver USB power voltage within specification to a device at the far end of a series of repeaters. (Note, by way of contrast, that in "legal" USB systems USB power voltage is delivered over a maximum of two bus segments, before a self-powered hub is required to be present to supply "fresh" (AC mains-derived) power to the following bus segment.)

Additionally, as with passive extension cables there is nothing to prevent an arbitrary number of repeaters from being placed in series on any one bus segment, allowing systems to be configured which are not able to function, or which can function only marginally.

Accordingly, a need remains for a better way to extend a USB-compliant bus.

1.10 SUMMARY OF INVENTION

One aspect of the invention is a method and apparatus for extending power to self-powered hubs, not from Vbus of the USB cable, but from an auxiliary power line carrying power from hub to hub alongside the USB cable or incorporated with the USB cable. These hubs remain USB-compliant but are extension-optimized (XOHubs).

Another aspect of the invention is a long haul extension of a USB system using a single point-to-point cable, with active circuitry at the ends of the cable implementing a terminated (non-reflective) signaling means so that a cable of a relatively long length, at least much longer than the 5-meter length limit under USB, can be used. This aspect of the invention includes transforming the information being relayed from the USB domain, performing the distance extension (i.e., transmitting the transformed information over a distance greater than USB-compliant signaling permits), and retransforming the information back to the USB domain. The signal paths can be uni- or bi-directional, including over the relay extension. The logic of control of signaling follows the information flow, to know if and when to enable drivers. Other kinds of signaling beyond the messages proper, such as single-ended zero signaling (SEZ) and resume signaling, can be handled through the extension. The preferred signaling is differential over the extension. Simultaneous bidirectional communications over a single path can be used, or unidirectional communications can be alternated in direction over a single path. When two-path signaling is used, means can be included for determining relative skew between paths, which path is faster, and selecting which path will transmit data and EOP information. Alternatively, the relay extension can be implemented using fiber optic communications.

1.11 BRIEF DESCRIPTION OF THE DRAWINGS

2. HUB-BASED EXTENSION

This section describes a means of achieving extension of the USB through the use of hubs designed specifically to facilitate extension, with reference to accompanying FIGS. 1 through 4.

2.1 USE OF CONVENTIONAL HUBS

As discussed previously the use of conventional hubs is not optimal, even for just local extension of the bus, for two principal reasons: commercially-available hubs typically provide several downstream ports, making them less than optimally cost-effective (since a single port would suffice for extension purposes); and the use of self-powered hubs is usually required (for at least some of the hubs employed in the extension), with the concomitant requirement of having external power available along the way for those hubs.

2.2 ISSUES ADDRESSED

The first of the issues mentioned can be addressed simply by providing a hub which has a single downstream port, thereby permitting maximum cost-effectiveness. Such devices are not currently commercially available, since the function of hubs is generally always perceived to provide support for connection of additional devices into the USB system.

The crux of the second of the issues mentioned can be expressed as follows: the use of self-powered hubs is required by the system (for at least some of the hubs, given the extension distance to be sufficiently large), yet maximum user ease of use is achieved only when all of the hubs are bus-powered (that is, when they do not require external power).

This issue can be addressed by providing a means to allow a hub to function as a self-powered unit and yet not require external power. This however cannot be accomplished under the means outlined by the USB specification, where a self-powered hub is not allowed to obtain power from Vbus of its incoming bus segment, since the unit could not obtain enough power by doing so to power itself and its downstream port(s) anyway.

2.3 SOLUTION IDENTIFIED

Figure 1:
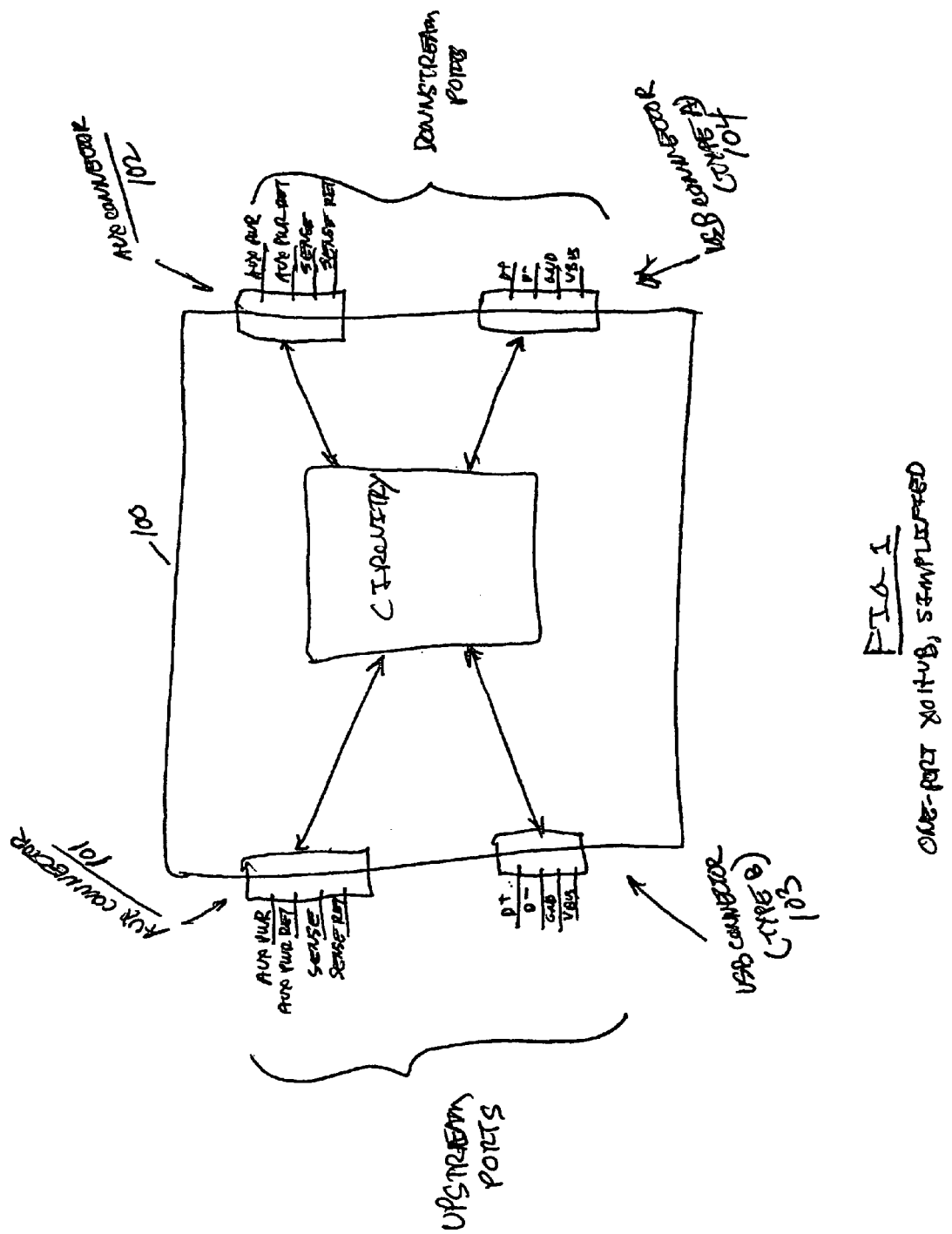
FIG. 1 is a simplified schematic diagram of a one-port XOHub according to the invention.

A solution to this is to enable the self-powered hub to obtain power, not from Vbus of the USB cable, but from additional wire(s) communicating power from hub to hub; those wires would exist in addition to the basic USB signals (Vbus, D+, D− and Gnd) defined by the USB specification. Such a unit may be termed an "extension-optimized hub" (XOHub). Refer to FIG. 1.

2.3.1 Connectors Utilized

The XOHub can utilize completely new (i.e., "non-USB") types of connectors, due to the additional signals involved. In order to permit connection of existing, standard USB hubs or USB devices at the end of the extension, converter-adapters are required (adapting between the XOHub connectors and standard USB connectors).

Alternatively, there is an advantage in having the XOHub 100 retain use of conventional USB connectors 103 and 104. This allows for connection of USB hubs and devices without the need for converter-adapters, which may affect mechanical reliability, and also electrical reliability by degrading signal quality and power voltage margins. In this case additional (non-USB) connectors 101 and 102 are also present on the XOHub to handle the extension-specific signals.

It is assumed in the following that USB type connectors are present on the XOHubs.

2.3.2 Cabling

The cabling used to interconnect the XOHubs can be completely new ("non-USB"), in which case the cable has two plugs at each end: a standard USB "A" (or "B") type plug, as well as a plug to mate to the extension-specific connector of the XOHub.

Alternatively, existing types of cable may be used to interconnect the XOHubs (105, 106, 107, 108 and 109). One type would be the standard USB cable (110, 111, 112, 113, 114, 115), a second type could be commercially available local area network (LAN) type cable (116, 117, 118, 119, 120, 121), such as Category 3.(CAT 3) or Category 5 (CAT 5) type cabling. The USB cable and the other cable used can be bound together, effectively forming a single physical cable, benefiting ease of use; the combination cable (121) may be termed an "XOCable".

In the case that LAN cabling is used, the additional connectors utilized (101, 102) may be standard LAN-type connectors (jacks), such as RJ-45 or other commercially-available connectors. The extension-specific (LAN) cabling may be termed the "Auxiliary" (Aux) cable, and the connectors on the XOHub to which that cable attaches may likewise be termed the Aux ports.

Allowable lengths of cabling are determined by the requirements of the USB specification, constrained mainly by the maximum propagation delay allowed. Since bus extension is the principal goal, a length of five meters is appropriate. Additionally, a shorter length of extension cable, perhaps 2, 2.5 or 3 meters is also useful. (Note that the maximum length of the cable used could be somewhat in excess of five meters, if cable having an appropriately fast velocity of propagation were utilized.)

As with conventional hubs, the XOHub can be designed on its upstream and downstream ports to accept detachable XOCables. Alternatively, the XOHub can be designed with captive cable(s) on the upstream side.

2.4 SYSTEM CONFIGURATION

Figure 2:
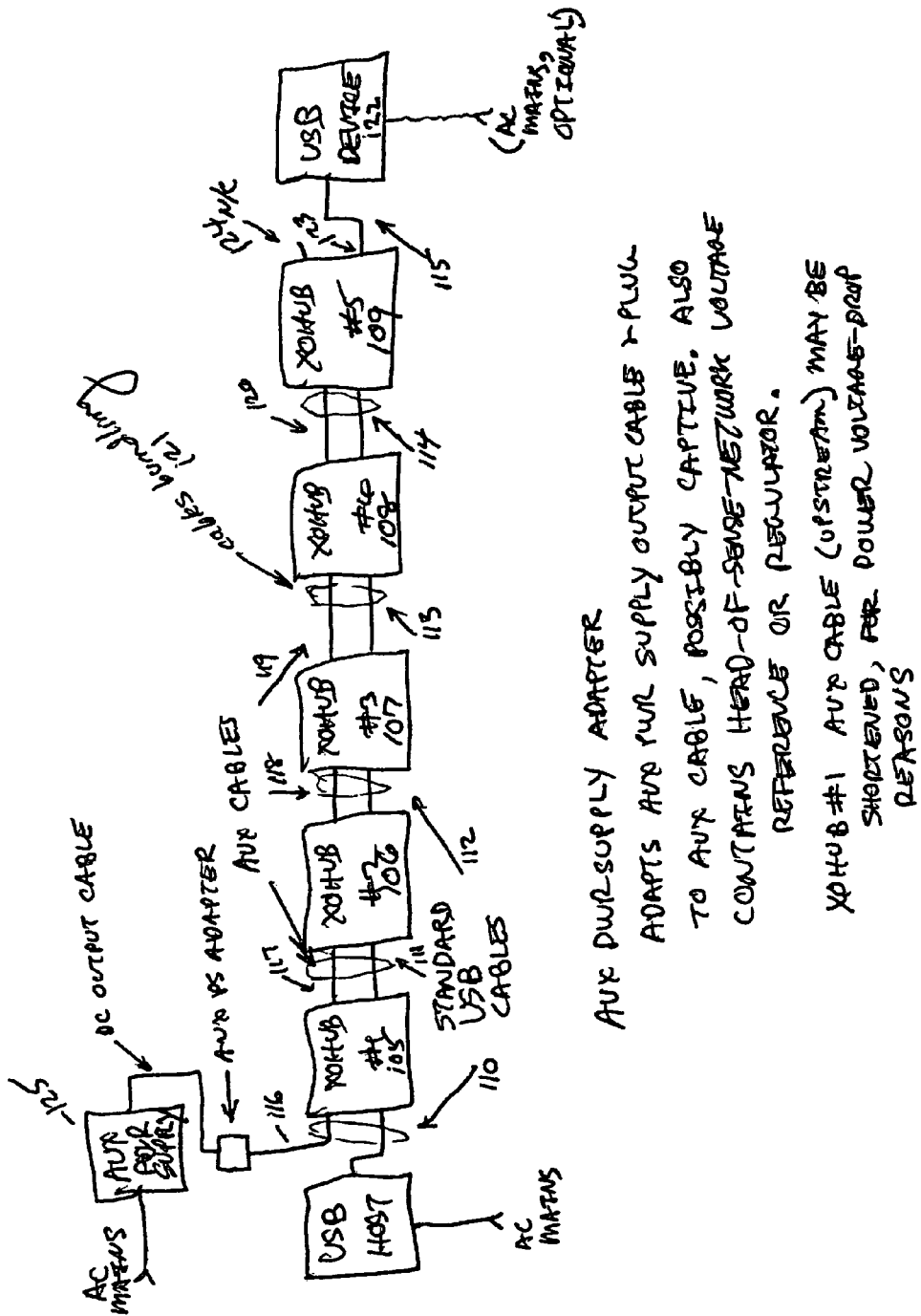
FIG. 2 is a schematic diagram of a series of the XOHubs of FIG. 1 extending from a USB Host to a USB Device.

Bus extension can be achieved by setting up a string of XOHubs in series, with XOCables interconnecting the units. At the far end of the string, the device or (regular) hub being extended (122) is plugged into the downstream USB port (123) of the last XOHub; no connection is made to that hub's downstream Aux port (124). Refer to FIG. 2. (In one variation some or all of the XOHubs can employ captive cables on both the upstream and downstream sides, resulting in essentially a cable extension means with clumps of circuitry integrally present along its length.)

An AC mains-powered (or another type of) DC power supply (the "Aux power supply" (125)) provides power to operate the first (most-upstream) XOHub (105) in the series, with that unit in turn passing the power along the Aux cable (111) to the XOHubs farther down the line. Voltage regulation circuitry of the XOHub transforms the Aux power voltage to a voltage usable by the remainder of the XOHub's circuitry. (In alternative implementations, AC power of suitable voltage could be communicated down the Aux cable instead, being converted to DC and regulated at each XOHub.)

In this situation essentially all of the power being transferred along the extension is carried by the Aux cable wiring, and essentially none of the power is transferred along Vbus of the USB cable. Of course, Vbus of the downstream port (123) of the last XOHub (109) will provide the power for any bus-powered USB unit connected at the far end of the extension.

A slightly different alternative is possible, wherein the circuitry of the portion of the XOHub that deals with information communication along the USB (the "hub silicon") receives its low-power allotment of current via Vbus from the USB port of the unit just upstream of itself (another XOHub, or the host itself); the remainder of the power used by the XOHub is obtained from the Aux port. In this case, most of the power being transferred along the extension is carried by the Aux cable wiring, with the remainder of the power transferred along Vbus of the USB cables.

2.5 MULTIPLE-PORTS VERSION

Figure 3:
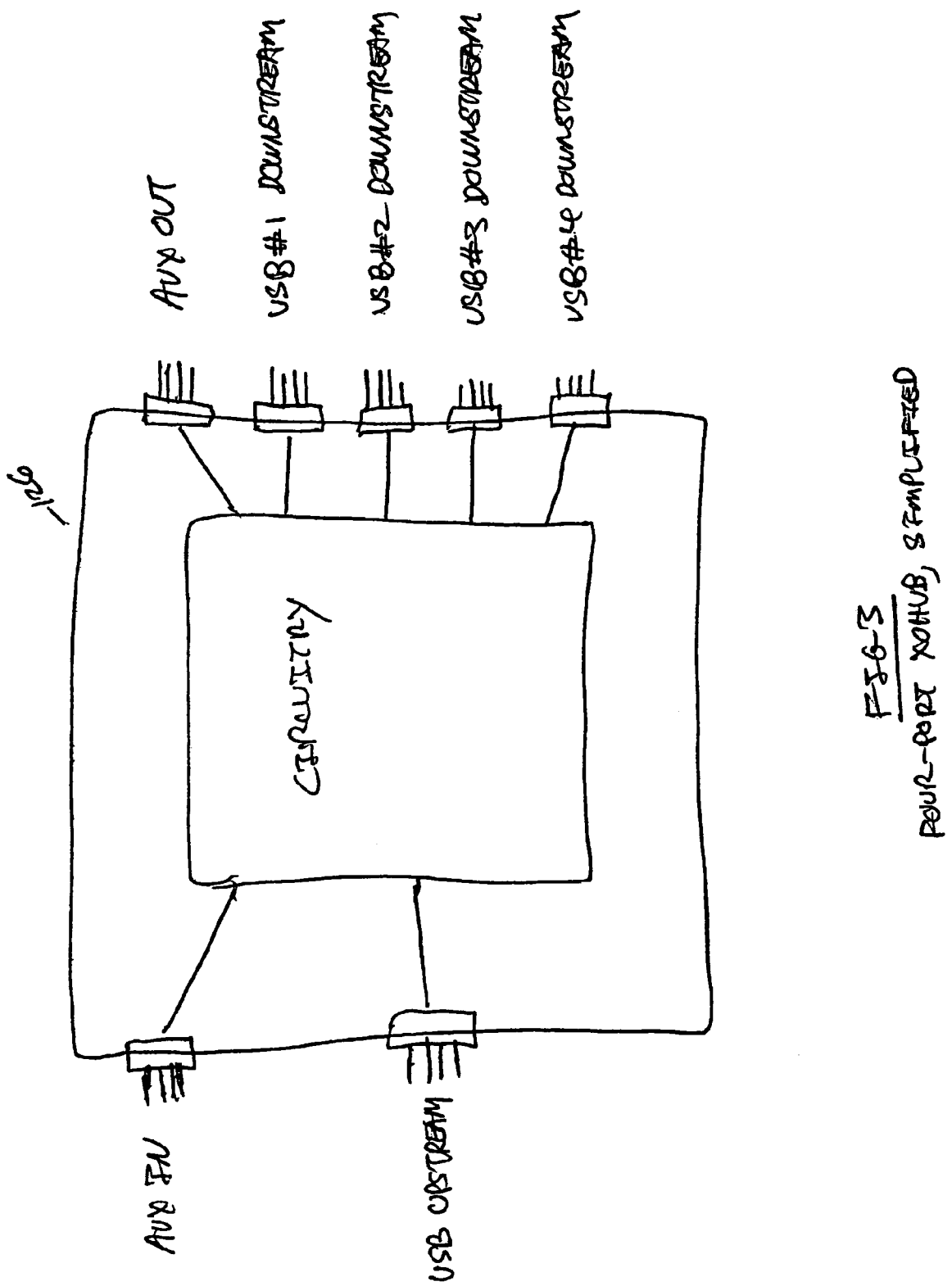
FIG. 3 is a simplified schematic diagram of a four-port XOHub according to the invention.
Figure 4:
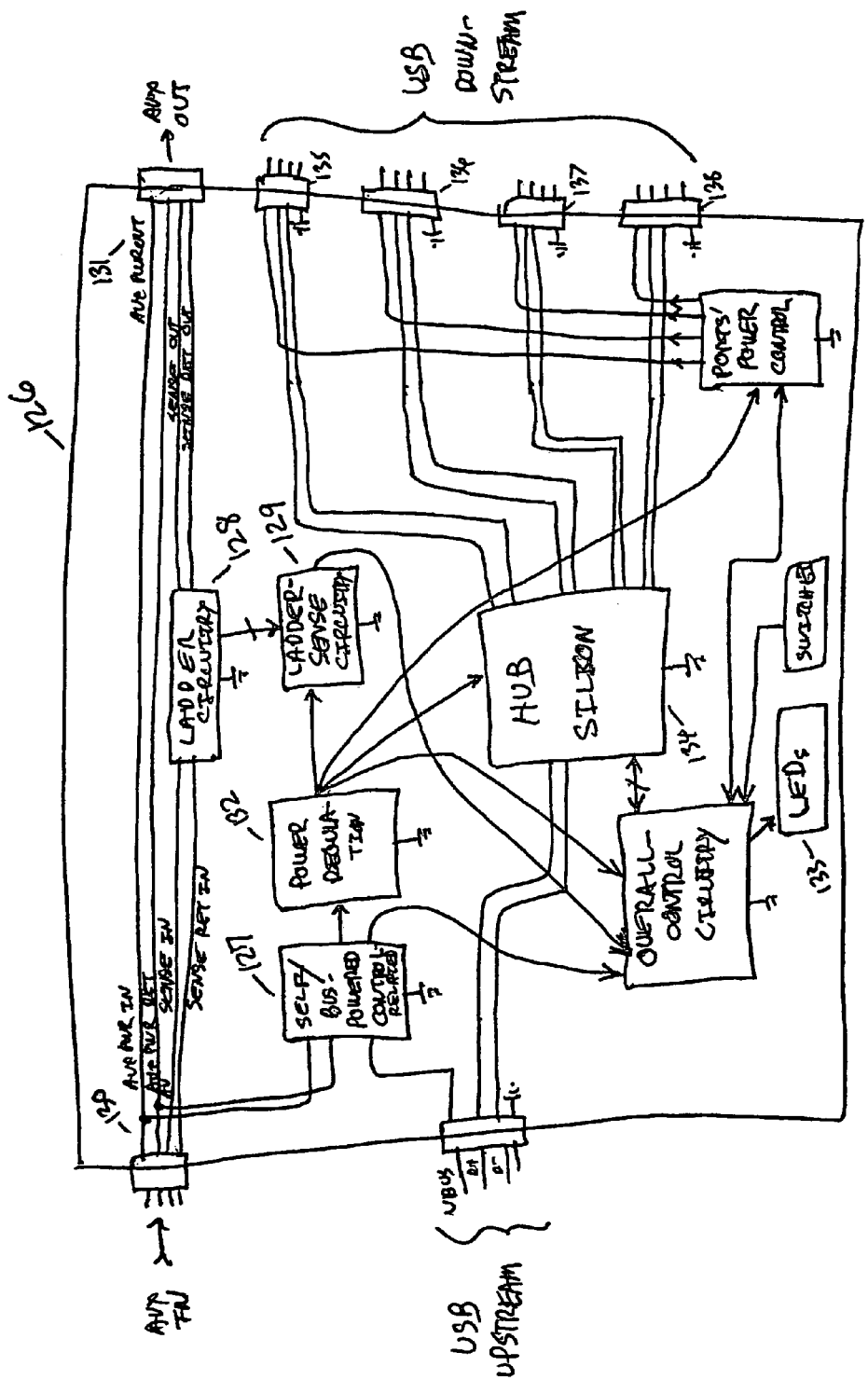
FIG. 4 is a functional block diagram of the circuitry of FIG. 3.

By the means described above, extension of a USB device can be accomplished in a manner which is cost-effective and easy to use. A single self-powered unit can be extended, and a bus-powered low- or high-power unit can be extended given that the XOCabling and the XOHubs are engineered to deliver sufficient current at a voltage in the appropriate range (as outlined in the USB specification). Refer to FIG. 3.

In the case of needing to extend more than a single USB unit, a conventional hub can be employed at the far end of the extension (effectively being the unit extended), with several USB devices able to be connected to its downstream ports. Such devices could be either self-powered or low-power bus-powered. Connection of high-power bus-powered units would require the hub to be a self-powered unit, with the concomitant requirement of providing external (i.e., AC mains) power.

This situation may be addressed by providing, in addition to the one-port XOHub described above ("XOHub-1"), a multiple-port (e.g., four-port) XOHub ("XOHub-4") (126). Such a unit appears to the OS, and functions as, a four-port self-powered hub. Extension of up to (e.g.) four USB devices, whether self-powered, or low- or high-power bus-powered units, can then be accomplished using a string of XOHubs, the most of which can be XOHub-1 units, and the last being an XOHub-4.

Since the configuration of hubs employed by the user should not and cannot be controlled, the XOHubs are designed to allow their various versions to be intermixed along the extension route. As already illustrated, this can involve a configuration wherein all units but the last have one port, while the last has four ports. Other configurations are possible, including both the first and last XOHubs having four ports (allowing for both local and distance extension simultaneously), as well as all XOHubs being of the multiple-port variety.

2.6 POWER DISTRIBUTION ISSUES

Assuming a sufficiently large (in terms of current output capability) Aux power supply, together with Aux cabling and connectors having sufficiently low voltage drop, and/or an Aux power supply having a sufficiently high output voltage, powering a string of as many as five four-port XOHubs can be conceived. With one of the downstream ports of each XOHub utilized for the purpose of extension, three ports of each unit remain available for connection of USB devices. In the worst-case (power) scenario, each device could be a high-power bus-powered device. Such devices would altogether require of one XOHub a current of 1.5 A; the total for all five XOHubs, similarly loaded, would then be 8 A, with a total of approximately 8.5 A when the requirements of powering the hub silicon are included. Such a system is possible to engineer (e.g., with the use of isolating DC-DC switching power converters), but can be non-optimally cost-effective. It is clear that such a configuration, although possible, would likely find few practical applications anyway.

An alternative involving less total power being distributed along the extension, is to constrain the XOHubs to function as simple one-port hubs for the middle portion of the extension string, regardless of the number of ports physically implemented in any unit. That is, only the first and last XOHubs would be able to function as multiple-port hubs (and then of course only if they actually implemented multiple ports). This approach still allows for both local and distance extension. The total power current here is approximately 4 A, a significant reduction. Such a system, although feasible, may still be insufficiently cost-effective.

Another alternative is to further constrain the XOHubs, such that only the first unit in the string (the one closest to the Aux power supply) can possibly function as a multiple-port hub, while all remaining units function as one-port hubs (again, regardless of the number of ports physically implemented). This configuration is more cost-effective than the previous configurations described due to the reduced level of power transmitted (a total power current of approximately 2.5 A). It does however permit connection of only a single device (whether self-powered, or low- or high-power bus-powered) at the end of the extension (even if the last XOHub were a multiple-port unit).

2.7 SELF-/BUS-POWERED FLEXIBILITY

It is beneficial to allow the last XOHub in the chain to function as either a self-powered unit (with each functional downstream port provided 500 mA of power current) with just a single functional port (power current of 500 mA plus 100 mA for the hub silicon: 600 mA total), or as a bus-powered unit (with each functional downstream port provided only 100 mA of power current) with multiple (e.g., four) ports (power current of 400 mA plus 100 mA for the hub silicon: 500 mA total). The former case allows attachment of a single device of any type, while the latter allows attachment of multiple low-powered bus-powered (or self-powered) devices.

A means is required to indicate to the XOHub whether to function in self-powered mode or bus-powered mode. One means for doing this is to employ an auto-detect function as is done in some commercially available hubs, wherein the unit functions as a self-powered hub if external power is available, otherwise as a bus-powered unit.

The XOHub then is connected as described previously, with both Aux and USB cabling connected to its upstream ports, when it is desired to have the XOHub function (127) in the usual self-powered mode. By simply disconnecting the Aux cable at the upstream port, the XOHub functions in bus-powered mode, the same as a conventional bus-powered hub does.

Given a string of XOHubs it is generally useful to have only the last unit (if any) function as a bus-powered hub. If extension is to continue beyond an XOHub functioning in bus-powered mode, another Aux power supply would be required to power that later portion of the extension.

For some simple local extension situations, a single bus-powered four-port XOHub can be used alone. Even a single-port XOHub functioning in bus-powered mode can provide cost-effective local extension when used alone. In these cases no Aux power supply need be utilized, of course.

For XOHub implementations wherein a combination USB and Aux connector (and cable) are used, disconnection of Aux power to signal self- versus bus-power mode is not feasible. Some other means (such as a user-setable switch on the unit) can then be employed; the switch can act to either remove actual Aux power from the unit (and thus also from downstream units), or simply affect the unit's functionality without necessarily affecting Aux power availability.

2.8 IMPLEMENTATION ISSUES

The realization of the above-discussed functionality can be as now described. Self-/bus-powered auto-detect functionality (127) can be implemented as has already been shown, e.g., as in published hub silicon application notes. Constraining Aux-powered XOHubs (except for the first) in a string to provide no more than just a single high-powered port requires a means for the XOHubs to determine their relative location along the string. (Refer to FIG. 4.)

Such can also facilitate a means of preventing marginal functionality due to series connection of more than the allowed maximum number of hubs. The user might attempt to connect more than that number of XOHubs in series. Although the excess hubs would not be enabled by the OS, an unexpected additional load would be placed on the Aux power supply (due to the power required for the hub silicon of each XOHub), possibly rendering the functioning of the "legal" units marginal. This situation can be made less likely to result in marginal system behavior by having XOHubs beyond the fifth not even attempt to perform connection into the USB system, and to utilize no more than a minimum amount of Aux power.

One way of achieving means for determining position along the XOHub chain is to utilize an impedance ladder (128) for example a resistive ladder, and specifically an R-2R resistor ladder (as are employed in analog-to-digital (A/D) converters). A signal (which may be termed "Sense") may be provided for in the Aux cabling and connectors for this purpose. Because of the ladder topology, the Sense signal of each cable segment has a unique voltage and/or impedance.

With a known voltage or current provided by, or derived from, the Aux power supply and presented at the upstream Aux port of the first XOHub, each XOHub of the chain is able to employ circuitry (129) to determine, by measuring the voltage and/or current and/or impedance of its incoming (upstream) and/or outgoing (downstream) Sense signal, where in the chain it is located. Specifically, a determination can be made as to whether the XOHub is in position number one (the first XOHub) and whether it is in position number six or greater.

Furthermore, a determination can also be made as to whether the Aux port(s) of an XOHub are connected properly. One aspect of the use of LAN-type cabling for Aux purposes is that the same type of plug is used at both ends of the cable, which means that it is possible to physically connect the downstream Aux port of one XOHub to the downstream port of a following XOHub. Depending upon the details of XOHub implementation, that second XOHub might still be able to function (i.e., as a self-powered hub). By determining whether both sets of upstream and downstream Sense voltage/current/impedance values are appropriate, the XOHub can be prevented from functioning under such a configuration (including reducing its Aux power consumption to a low level), as well as possibly giving an indication of the fact of the improper connection.

Note that alternative means to facilitate position determination may involve use of voltage references and/or current sources of constant, known value in each XOHub, in addition to, or instead of, use of an impedance ladder.

2.9 IMPLEMENTATION DETAILS 2.9.1 Sense Return

In order to allow for sufficient accuracy in measuring the Sense voltage and/or current and/or impedance, a second related signal can be provided for in the Aux cabling and connectors. Such a signal (which may be termed "Sense Return") provides a return path independent of Gnd and allows the Sense measurement to be relatively unaffected by voltage drops along Gnd due to USB signaling and/or Aux power return current flow. Ladder impedance may be present between the incoming and outgoing Aux port Sense Return signals (as can be the case with Sense), or there may be a direct connection between the incoming and outgoing Aux port Sense Return signals.

2.9.1 Aux Signals

The Aux signals (130, 131) then may include: Sense, Sense Return, Aux Power and Aux Power Return. In some implementations Aux Power Return may be separate from the USB Gnd signal; in other implementations it may be a (redundant) Gnd connection itself.

With CAT 3 or CAT 5 LAN cabling used as the Aux cabling, a total of four twisted pairs of wires (generally 24 gauge) are available, with the four Aux signals allocated among the available wires. The Sense and Sense Return lines may be conducted via one of the twisted pairs. The Aux Power and Aux Power Return lines can be conducted using the remaining wires available. The allocation can be based upon minimizing either the Aux Power voltage drop along the extension, or minimizing the Aux Power Return voltage drop, or both.

If the Aux Power Return is essentially distinct from Gnd, it may be appropriate to allocate both Aux Power and Aux Power Return to the two wires of each of the three remaining pairs, in order to take advantage of the impedance (and hence noise-reduction) characteristics of the twisted pair. If the Aux Power Return is not essentially distinct from Gnd, it may be appropriate to have both wires of a pair handle either Aux Power or Aux Power Return, in order to reduce the signal (noise) coupling between Aux Power and Gnd. For example, in minimizing the Gnd voltage drop, it may be appropriate to have one of the pairs carry Aux Power, and the remaining two pairs carry Aux Power Return.

2.9.2 Voltage Regulation

In implementations supporting the transfer of a relatively large amount of power along the extension, the Aux Power voltage drop may be significant. In such situations the XOHubs may employ isolating DC-DC switching power converters, with Aux Power Return being essentially distinct from Gnd (again due to the significant Aux Power Return voltage drop).

In more cost-effective situations where a smaller amount of power is being transferred (as discussed previously), the voltage drop along Aux Power Return may be low enough that the total Gnd voltage drop does not necessitate the use of isolating power converters. Here Aux Power Return may be a redundant Gnd connection itself, and the XOHubs can employ inexpensive low dropout (LDO) voltage linear voltage regulators (132).

2.9.3 Aux Power Supply Voltage

Because the power-handling capabilities of a LDO regulator may be limited, the voltage applied to the Aux Power network by the Aux Power Supply (125) may be chosen with some deliberation. The constraints on the voltage are such that it must be sufficient so that the last XOHub in the chain obtains at least the minimum voltage it requires, while not being so great that the power required to be dissipated by any XOHub is too great.

Intermediate XOHubs along the chain only provide a single port, into which the next XOHub connects, so their power requirements (and hence the power that may need to be dissipated) are relatively small.

The last XOHub in the chain provides either a single high-power port, or multiple (e.g., four) low-power ports, with a maximum total power current requirement of no more than about 0.6 A.

The first XOHub in the chain can provide multiple (e.g., four) high-power ports, into one of which the next XOHub in the chain connects. The maximum total power current required is about 1.6 A, plus the current required by all downstream XOHubs, a maximum of about 0.9 A; the maximum total power current required is thus about 2.5 A.

For especially this last case it is desirable to minimize the Aux Power Voltage that the XOHub's LDO regulator sees, in order to minimize the total power that the regulator may have to dissipate. Taking into account the output voltage tolerance and the minimum dropout voltage of the LDO regulator, the resistance of all of the Aux cabling and associated connectors, as well as the tolerance of the output voltage of the Aux power supply, a determination may be made of what the minimum Aux Power voltage as provided by the Aux power supply can be. For example in some implementations this voltage may be approximately 7 volts, while still ensuring that all XOHubs' downstream power voltages are within the USB specification.

Of course, switching power converters, which need not be isolating, can be employed alternatively in the XOHubs, rather than LDO regulators.

2.9.4 Hot Attach And Detach

The USB specification provides for connection and disconnection of devices (including hubs) with Vbus power present (termed respectively "hot attach" and "hot detach"). The XOHub implementation addresses these issues, in acting to ensure that XOHub will not be damaged and will continue to function properly following hot attach and detach. The Aux signals are therefore capacitively bypassed as appropriate at the XOHub, with circuitry also present to deal with related electrostatic discharge (ESD) occurrences.

2.9.5 Visual Indicators

Since the XOHub can function in a number of modes, it is beneficial to provide feedback to the user (e.g., through the use of light-emitting diodes (LEDs) (133) and/or other visual indicators, and/or audible indicators) to indicate what mode(s) the XOHub is functioning in and/or to provide information about the functioning of the hub silicon (134) and/or the USB system itself. For example, a single bicolor LED may be used for each downstream port (135, 136, 137, 138) for indication purposes.

The XOHub may indicate the following: self-/bus-powered functioning; port enabled or disabled (possibly including whether a power over-current condition has occurred at the port); unsupported (illegal) connection (sixth or greater XOHub in the chain, or Aux power connected in reverse). Additionally, the LEDs can be used to signal whether the hub silicon has determined that a USB suspend condition is underway.

2.9.6 Alternative Aux Power Transmission

The discussion above implies that the XOHub's upstream and downstream Aux Power signals are connected together in the XOHub (no intervening impedance present), as likewise are the upstream and downstream Aux Power Return are connected together. In an alternative implementation the XOHub can receive in Aux power and actively retransmit it down the line. This can involve the use of isolating DC-DC power converters. In this case the Aux Power upstream and downstream signals are no longer identical (they are not connected together in the XOHub), and the Aux Power Return upstream and downstream signals also may not be identical.

3. LONG-HAUL EXTENSION

This section describes a means of achieving extension of the USB through the use of a single, point-to-point cable, with active circuitry located only at both ends of the extension, with reference to accompanying FIGS. 5 through 37.

3.1 USE OF HUBS AS EXTENSION BASIS

The use of hubs, whether conventional hubs or XOHubs, is subject to two principal restrictions. One is that incremental extension of the USB is achieved through the use of a hub-cable combination. Since any one cable can be a maximum of five meters, a single cable cannot be utilized to achieve distance extension and active circuitry must be present along the extension route.

The other restriction is that an enforced limit of a topology extension depth of five hubs exists, thereby limiting the achievable physical extension distance to 25 to 30 meters. This results in only a limited-distance, non-optimally cost-effective means of bus extension.

3.2 ISSUE ADDRESSED

The key issue in achieving longer-distance USB extension is to overcome the five meter cable-length restriction. With the cable-length restriction overcome, the need for a relatively large number of active units (hubs) can be dispensed with, resulting in a more cost-effective approach.

The cable-length restriction is due principally to the reflective signaling employed for full-speed message communication (discussed earlier). The reflective signaling is a result of an apparent desire to conserve the amount of signaling energy (power) required in sending messages along the USB bus segment. The reduced energy goal is achieved by having the USB unit receiving the message present a high impedance to the bus segment. A result of the high impedance at the destination end of the cable is that each bit transition of the message is reflected back toward the source end of the cable. The two-way propagation delay of the cable (52 ns maximum) is then required to be substantially less than the full-speed bit period (nominally 83.3 ns) in order that reliable signaling be achieved.

If information were communicated only unidirectionally along the USB bus segment, it is conceivable that installation of appropriate termination at the destination end of the cable could suffice to eliminate the signal reflections. In order to not disturb the DC signaling conditions on the bus segment, an AC termination means (a series combination of resistance and capacitance) could be employed.

Unfortunately, the effect of the source impedance at the sending end of the cable together with the far-end termination would result in non-standard voltage levels on the bus-segment. The approach is not feasible for the additional reason that information is actually communicated along the bus segment in a half-duplex manner; terminations thus required at both ends of the cable would result in yet lower-amplitude, non-standard signal voltages on the bus.

3.3 SOLUTION IDENTIFIED

Figure 5:
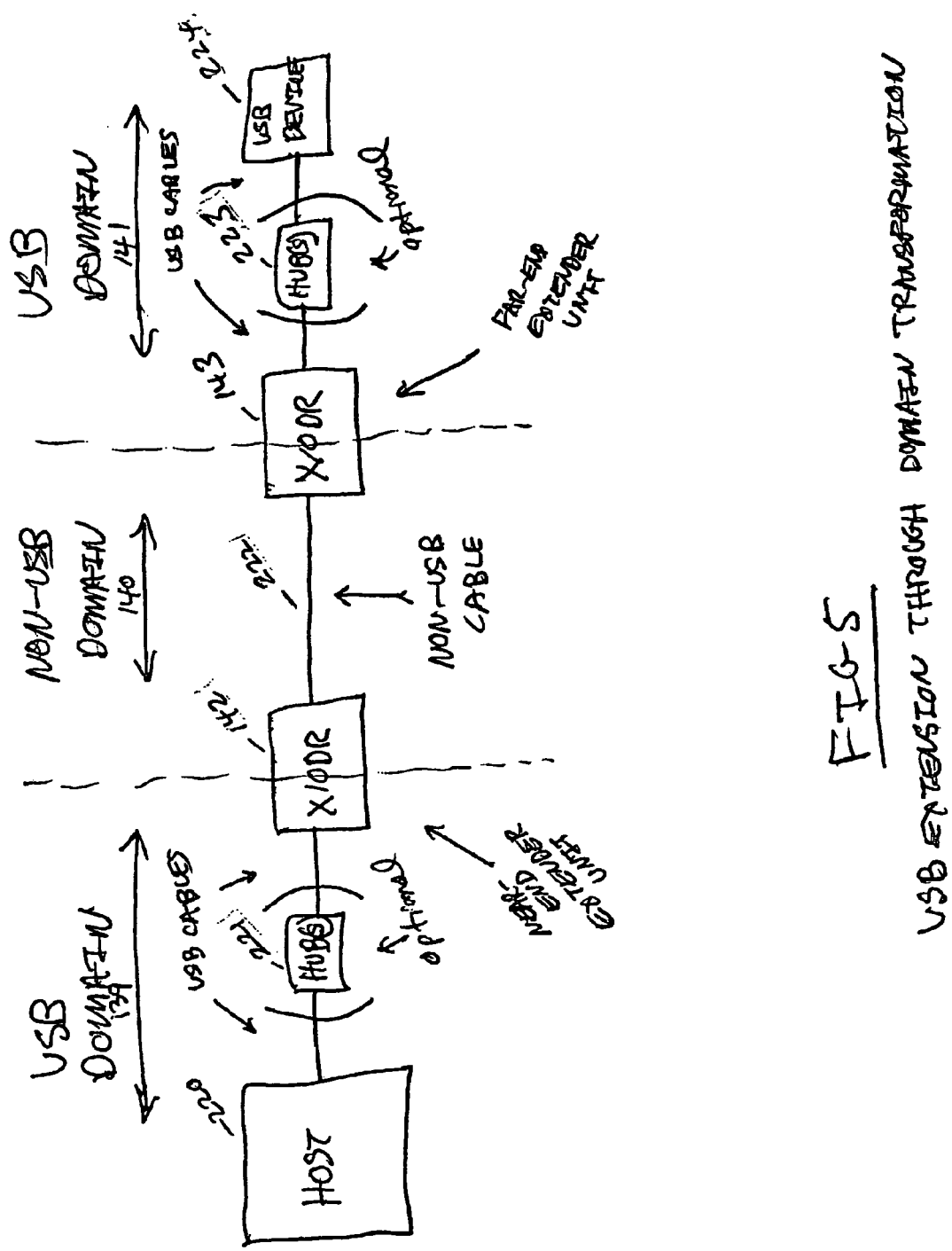
FIG. 5 is a block diagram of a system for extension of USB communications signal distance through domain transformation according to the invention.

A solution to the reflective-signaling distance constraint is to employ a non-reflective-signaling means so that a cable of relatively long length can be utilized. Since such an approach is not supported under the USB specification, the extension may be accomplished by transforming the information out of the USB domain proper (139, 141), performing the distance extension (140), and then retransforming the information back into the USB domain. Refer to FIG. 5, in which the USB host (220) is connected via an optional hub (221) to a USB compliant near-end link (142), which in turn is connected via a cable (222) to a USB compliant far-end link (143), which far-end link in turn is connected via an optional hub (223) to a USB device (224).

An example of this approach employs circuitry (142) at the near end which takes incoming USB signals from the downstream port of the host or hub and can drive a derived set of signals over an appropriately-terminated cable; companion circuitry (143) at the far end accepts the incoming cable signals and turns them back into related USB signals for delivery at the upstream port of a device or hub at the far end of the extension. Since USB communication is half-duplex, the near- and far-end units are capable of sending and receiving in both directions.

Note that this type of approach is different from that of using active repeaters as discussed previously. The repeater approach uses standard USB signaling and standard USB cabling. Since reflective signaling is utilized, the repeater approach is subject to the usual five meter maximum cable length restriction, just as hub-based extension is.

This method is also to be distinguished from conventional network-related approaches to moving information wherein an emphasis may be placed on maximizing transmission bandwidth, with transmission delay time not a primary focus; the propagation-delay constraints imposed by the USB specification (discussed below) require that transmission delay time not be given secondary consideration.

3.4 EXTENSION DISTANCE LIMITATION

The USB specification makes allowance for each hub-cable tier of the USB system to delay the propagation of information by up to 70 ns as discussed previously (refer again to FIGS. 7-31). This results in a maximum extension delay limit of 350 ns, with this amount of time relating to the propagation of information between the host and the upstream end of the cable through which the far-end device connects. (An additional 26 ns is allocated for the maximum delay through that cable; however that delay is irrelevant here since the device may employ a captive cable. In any case, the actual overall physical extension distance is increased by whatever length of USB cable connects the device.)

The total delay budget for extension (350 ns) is allocated between the propagation delay through the near- and far-end extension circuitry, as well as the delay along the signal path itself. Assuming a circuitry delay at either end of approximately 25 ns, about 300 ns is left for the cable delay itself. Assuming a nominal velocity of propagation of 0.67 ft/ns (0.2 m/ns), an extension distance (cable length) of about 200 ft (60 m) is feasible.

Since commercially available cabling (such as LAN cabling) may have a tolerance in its actual velocity of propagation of perhaps +/−15%, a more conservative distance estimate is 170 ft (50 m). Of course, in certain situations it may be possible to employ cable with tighter manufacturing tolerances, and/or to test the delay characteristics of the cable before possibly using it. Also, use of premium cable which has an inherently higher velocity of propagation is possible.

Note that, strictly speaking, the 350 ns value is determined by the hub-and-cable 70 ns maximum delay specification. The actual amount of time available for signal propagation delay is determined by the transaction timeout specification value of 16 bit times as well as the maximum allowed device response time of 7.5 bit times (as discussed previously). This 8.5 bit times time-period is allotted to both the downstream and upstream propagation times, leaving 4.25 bit times as the maximum allowed one-way propagation delay. For full-speed signaling, this works at to essentially the same value as quoted above (354 ns assuming a nominal bit period of 83.33 ns).

Since the host timeout and the device response times are specified in terms of the bit period relevant for the type of message (full-speed or low-speed) being communicated, this implies that a far greater extension distance than 170 to 200 feet may be possible in certain situations wherein extension of a low-speed device needs to be accomplished. This is discussed in more detail below.

3.5 EXTENSION SIGNAL PATH

As discussed, the signaling employed must support the existence of multiple bit transitions along the length of the extension (that is, in order that single-cable lengths greater than about five meters be viable). This implies a terminated (non-reflective) signaling means. Termination is present at the receiving end of the signal path at least; termination may also be present at the sending end in order to minimize the effects of termination impedance mismatches.

A half-duplex approach, similar to that employed by the USB, can be utilized. With information flowing in either direction, both ends of the signal path are terminated. Alternatively, a simplex approach can be used, wherein a signal path communicates information in one direction only.

Here, twice the number of signal paths may be required, with signal termination required only at the receiving end of each signal path.

In order to maximize the signal transmission reliability, each signal path may be implemented using a twisted pair of wires. Use may be made of CAT 5 LAN cabling, providing four twisted pairs. Each pair can optionally be individually shielded, and/or the entire set of twisted pairs can be shielded.

3.6 TRACKING INFORMATION FLOW

The circuitry of the near- and far-end units functions basically to buffer the signals being sent over the extension. The signals are driven with enough strength to be reliably communicated down the extension in the face of terminations at possibly both ends of the signal path. The circuitry also acts to receive the possibly reduced-amplitude signals coming in from the extension, regenerating them into standard logic level signals.

Figure 6:
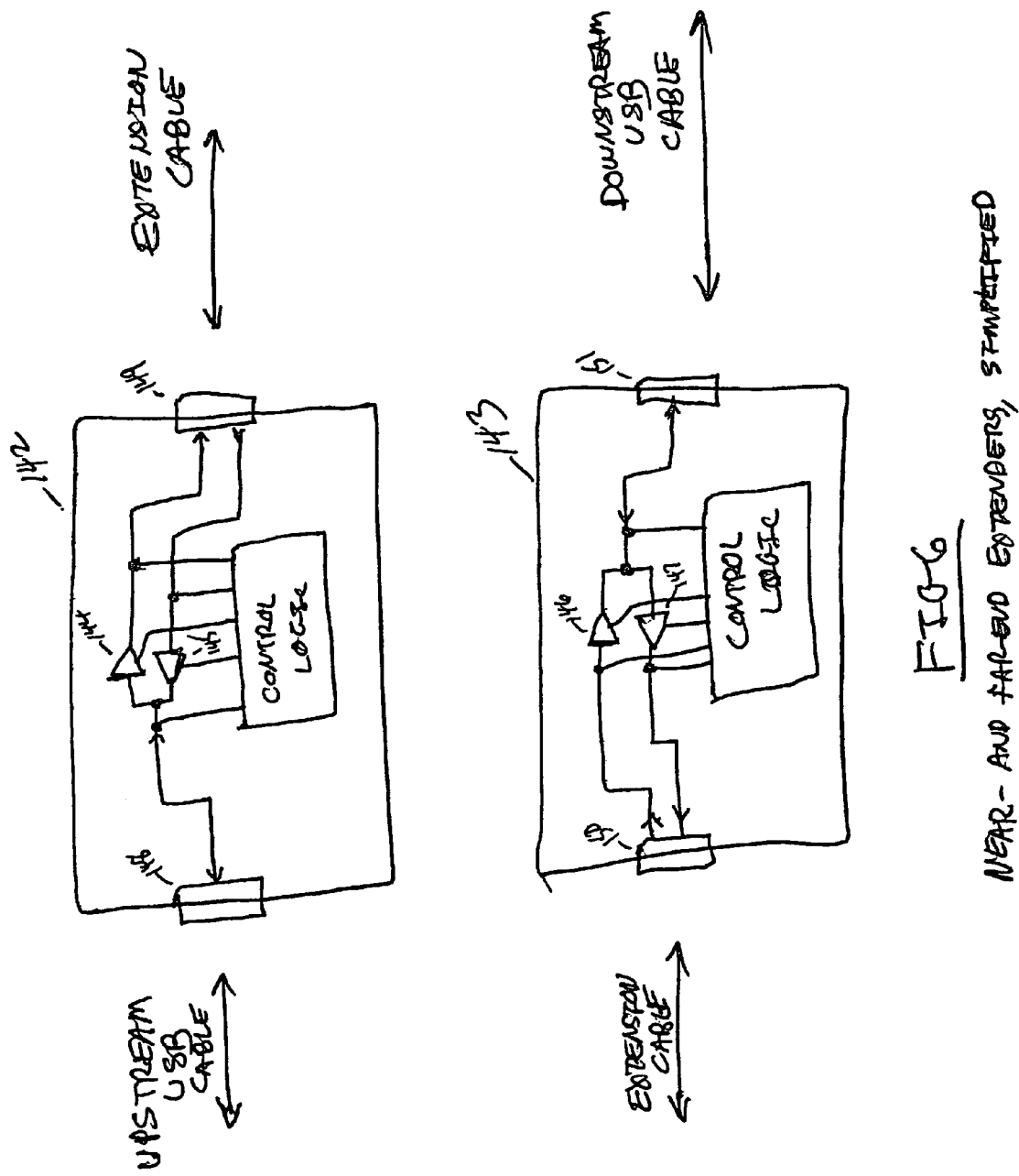
FIG. 6 is a simplified schematic diagram of near-end and far-end extenders used in the system of FIG. 5.

Regardless of whether the signal paths are simplex or half-duplex (or even full-duplex) in nature, because the USB operates in a half-duplex manner, the units' buffering circuitry must be appropriately enabled and disabled to cause buffering to occur in the proper direction and at the proper time, based on the flow of information that is to occur. Refer to FIG. 6.

Initially, the unit will have its buffering (144, 145, 146, 147) disabled, waiting for the start of a message (or other signaling event) to occur, either at its USB port (148, 151) or at its cable port (149, 150). Upon seeing the start of a message, the unit begins buffering the message through, and continues to function in that mode until the end of the message has occurred.

3.6.1 Handling Message Events

For example, the upstream unit may see a K being signaled in on its USB port (connected to the downstream port of the host or a hub). Taking that to indicate the start of a message, the unit "locks" itself into the mode where the incoming USB signal activity consisting of further following J and K states is (translated (to the extent necessary or desirable) and then) sent out on the extension. The mode remains in force until the unit sees an SEZ of sufficient duration at least to qualify as being an EOP; following the end of the EOP the unit returns to its nominal state of buffering being disabled.

In this situation the far-end unit sees signal activity present on the extension, and locks itself into the mode where the incoming extension signal activity is (translated (to the extent necessary or desirable) and then) sent out to the device or hub connected to its USB port. The mode remains in force until the unit sees an SEZ of sufficient duration at least to qualify as being an EOP; following the end of the EOP the unit returns to its nominal state of buffering being disabled.

In the opposite case, where a message (or other signaling event) is signaled by the device or hub connected to the far-end unit, the two units lock themselves into the mode where the information is buffered (from the device or hub, through the far-end unit, along the extension, through the near-end unit, and out to the upstream host or hub). The mode remains in force until the units see an SEZ of sufficient duration at least to qualify as being an EOP; following the end of the EOP the units return to their nominal state of buffering being disabled.

3.6.2 Handling Other Events

Given that the no-buffering mode of the units corresponds with the idle USB signaling condition, then the idle, connect and suspend USB events are readily handled. Of the other non-message signaling events, disconnect and reset both involve the SEZ bus state, which the units can communicate in a manner similar to the way it communicates message J and K states. The resume event involves message-like signaling, communication of which has already been discussed.

One version of the resume event requires special consideration. This is the remote wakeup, wherein in order to end a suspend condition a device or hub may signal a resume (K signaling) upstream, with the upstream hub (or host) responding with the same K signaling back downstream. In such a situation both downstream and upstream USB units are signaling at the same time. Eventually the downstream source of the resume finishes signaling the K, while the upstream source continues to signal. Finally, the upstream-sourced K is ended and is followed with an EOP, thereby preparing the way for normal message traffic to follow.

Proper handling of the remote wakeup resume event requires that the near-end unit detect that a resume condition is being signaled by the far-end unit over the extension. Since the downstream K source sends for at least 1 ms and the upstream K source may take up to 100 us to begin signaling back (refer to Section 7.1.7.5), the near-end unit can watch for a signal duration in from the extension of nominally 550 us. Upon detecting this the near-end unit switches modes from that of buffering the extension signal out to its USB port, to buffering the signal present on its USB port out to the extension. Eventually the upstream-sourced K is followed by an EOP, which the near-end unit responds to (as usual) by returning to idle mode.

3.7 EXTENSION SIGNALING

Use of the same signaling scheme as is defined by the USB specification may be employed, especially as that would apparently tend to reduce the complexity of the near-end and far-end extension circuitry. This approach would require use of a single twisted pair, with information transmitted in a half-duplex fashion.

Since the USB signaling, although generally differential in nature, does also make use of a third, non-differential signal state (SEZ), the noise-immunity characteristics of this type of signaling may be non-optimal, especially in extension situations where the physical length of the cable is relatively great. (Note that the issue here is not so much the use of a third signaling state (with both the D+ and D− signals at the same voltage level), as it is the single-ended interpretation of D+ and D− (wherein the signals are compared against reference voltage levels, rather than against each other). Since this constitutes non-differential (common-mode) signaling, immunity to extraneous common-mode signals (noise) is affected.

Alternative approaches may be employed, wherein the signaling on any twisted pair is always completely differential. Such approaches may be expected to be inherently more reliable since they are likely to exhibit superior noise-immunity characteristics.

In some implementations it may be beneficial to set aside one or more of the possible signal states to represent unusual conditions, so that such conditions may be readily communicated between the extension circuitry located at either end of the extension. For example, in implementations wherein binary differential signaling is used to communicate normal message information, a third non-differential state can be used to signal that circuitry at one end has not completed its power-up initialization, or even has no power. Such a condition can be signaled for example when both of the normally-differential signal pair lines are electrically low. (Such an approach may be contrasted against the type of signaling defined in the USB specification; both use common-mode signaling, but the first approach makes use of such signaling in a manner where it is relatively easy to guard against system reliability being affected by noise (e.g., through the use of low-pass filtering.))

3.7.1 Summary Of Some Signaling Approaches

Figure 7:
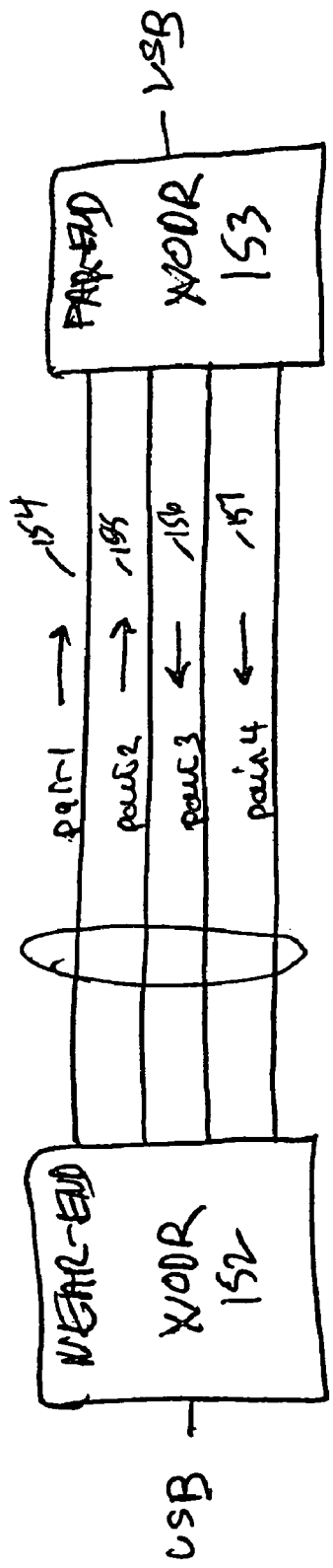
FIG. 7 is a block diagram showing quad-simplex communication using the extenders of FIG. 6.

In a first implementation (which may be termed the "quad-simplex" approach), two twisted pairs (154, 155) are utilized for communicating information downstream along the extension, with another two pairs (156, 157)-used for communicating information upstream. Here each pair functions in a simplex fashion; information is communicated digitally, in one direction only. Refer to FIG. 7.

Figure 8:
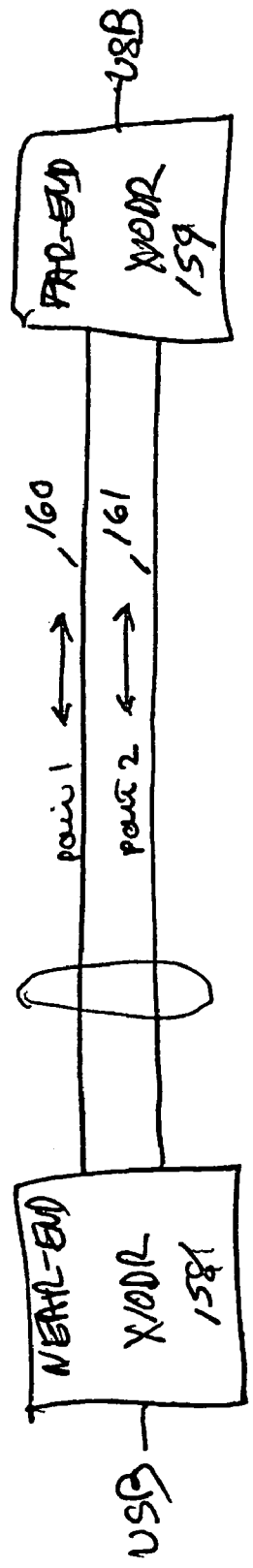
FIG. 8 is a block diagram showing dual-duplex communication using the extenders of FIG. 6.

In a second implementation (which may be termed the "dual-duplex" approach), two twisted pairs (160, 161) are utilized for communicating information both downstream and upstream. Here each pair employs bidirectional signaling; information is communicated in both directions, with digital and/or analog signaling employed. This is a variation of the first implementation. Refer to FIG. 8.

Figure 9:
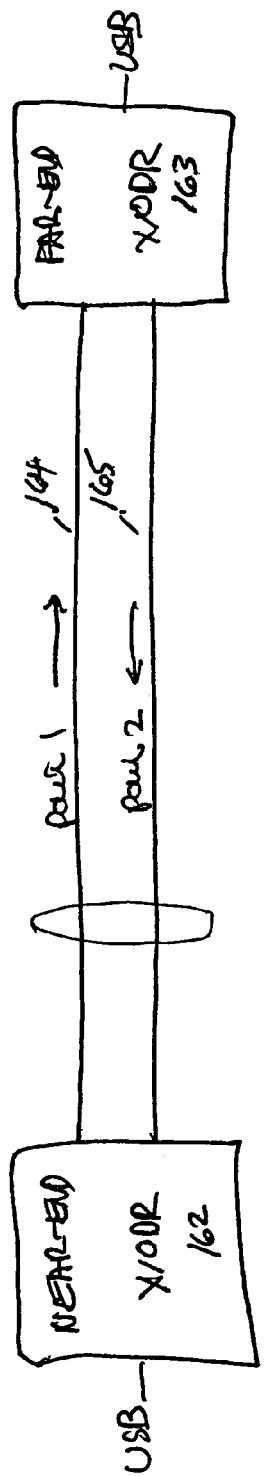
FIG. 9 is a block diagram showing dual-simplex communication using the extenders of FIG. 6.

In a third implementation (which may be termed the "dual-simplex" approach), one twisted pair (164) is utilized for communicating information downstream along the extension, with another pair (165) used for communicating information upstream. Here each pair functions in a simplex fashion; information is communicated in one direction only. Multilevel signaling is employed. Two signaling versions of this approach may be implemented: the first employs level signaling, the second employs pulse signaling. Refer to FIG. 9.

Figure 10:
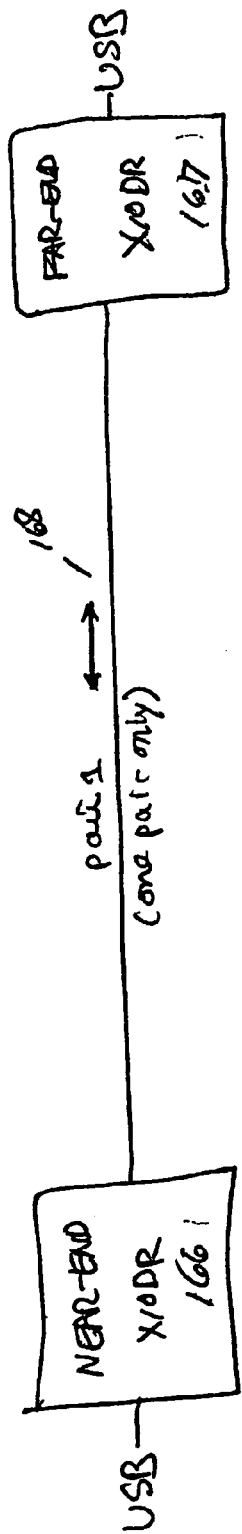
FIG. 10 is a block diagram showing single-duplex communication using the extenders of FIG. 6.

In a fourth implementation (which may be termed the "single-duplex" approach), one twisted pair (168) is utilized for communicating information both downstream and upstream. The pair employs bidirectional signaling; information is communicated in both directions, with multilevel digital and/or analog signaling employed. This is a variation of the third implementation, and likewise has two signaling versions: level signaling and pulse signaling. Refer to FIG. 10.

Each of the implementations mentioned trades off the number of signal paths (twisted wire pairs) required for differing levels of extension signaling circuit complexity. Note that other signaling approaches are possible.

3.7.2 Quad-Simplex Approach

In the first implementation mentioned above, four twisted pairs (154, 155, 156, 157) are used with each pair communicating information digitally, in one direction. With binary signaling used, two pairs are required to communicate all possible bus states (J, K and SEZ) along the extension. Note that in the context of utilizing CAT 5 LAN (or similar) cabling with only four twisted pairs present, any power required at the far end (e.g., to power the far-end extension circuitry or the far-end device) must be arranged for using other means (e.g., power communicated along the extension via a separate cable, and/or the use of AC mains power at the far-end). Likewise, connection together of the grounds of the circuitry at either end, whether through low-DC-impedance means (via direct connection), or AC-coupled means (via capacitors, possibly with shunting resistors), must be accomplished with the use of other wiring and/or any shield present in the extension cable.

Figure 11:
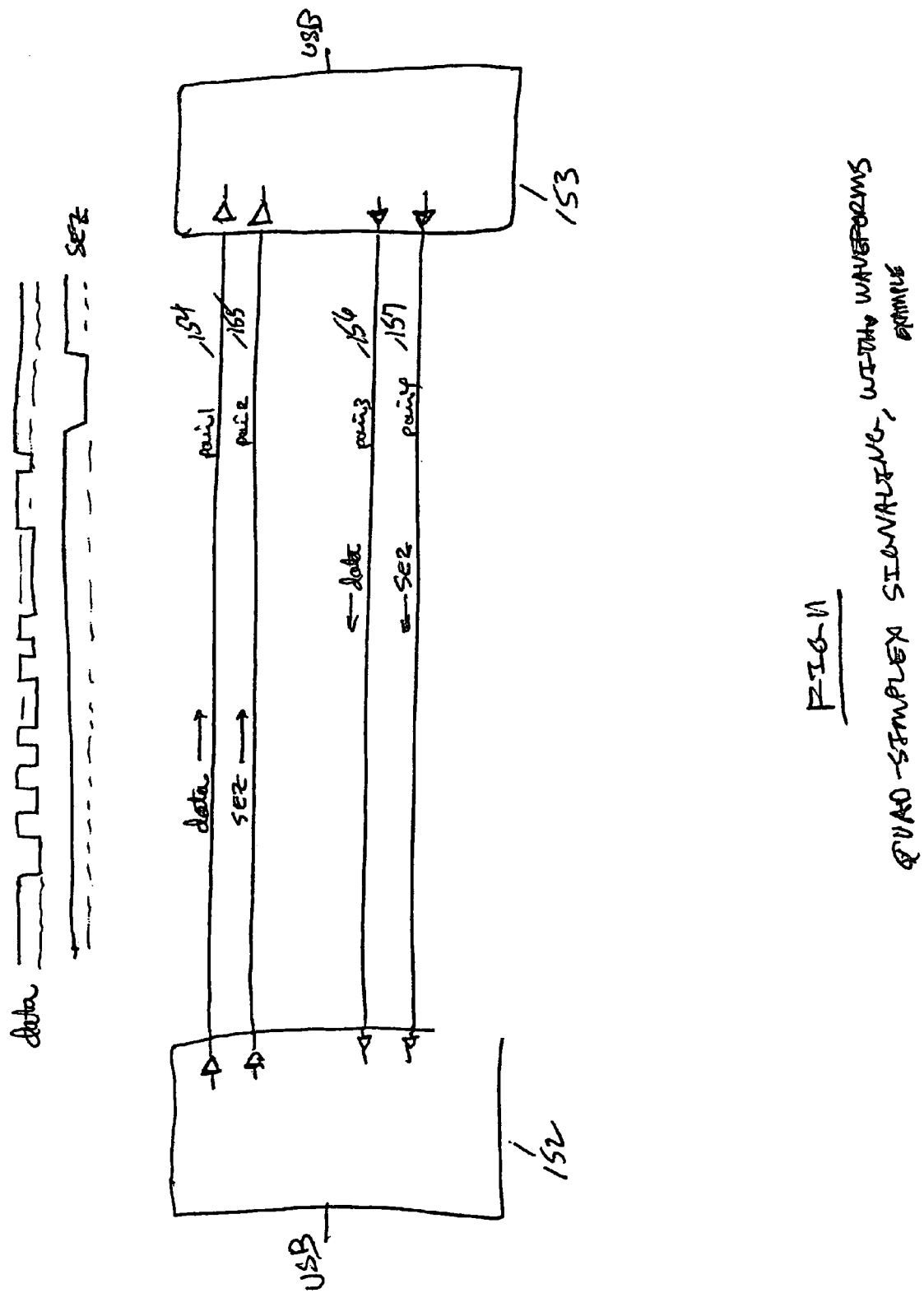
FIG. 11 is a block diagram showing quad-simplex communication as in FIG. 7, with example waveforms.

In this approach one of the signal path pairs can be used to communicate message data (that is, the differential J and K bit transitions comprising a USB packet), while the other can be used to communicate SEZ events (i.e., the EOP signal which ends a message, as well as reset/disconnect events). A principal job of the extension circuitry then, is to translate incoming USB J/K/SEZ signaling into outgoing extension data/SEZ signaling, and likewise to translate incoming extension data/SEZ signaling into outgoing USB J/K/SEZ signaling. Refer to FIG. 11.

Conventional differential digital signaling may be used to transmit information over a signal path, with conventional differential digital reception (e.g., use of a comparator) to receive the signal.

3.7.2.1 Signal Skew—

Since independent pairs are used to signal along the extension, an important issue with this approach is the signal skew that can be present along one path relative to the other. Assuming a +/−15% worst-case matching in relative signal propagation delays for the different twisted pairs of the cable, the skew for a 150 ft (45 m) cable of nominal delay of 225 ns may be expected to be as great as approximately +/−34 ns.

The USB specification allows for the start of the message EOP as received at the distant end to be up to 15 ns late (compared with its timing when originally generated at the other end) for each hub present in the path (refer to Section 7.1.14). Since the specification allows for a depth of up to five hubs, the maximum relative EOP delay tolerated is then 75 ns.

The USB specification however does not allow the EOP to arrive early (compared with its timing when originally generated at the other end) (refer again to Section 7.1.14). Therefore the extension circuitry must be designed to ensure under worst-case signal skew conditions that the EOP signaling does not arrive at the distant end sooner than does the data signaling.

3.7.2.1.1 Utilizing an Intentional Delay—

One method of dealing with this issue is to intentionally delay the EOP signaling relative to the data signaling, based on the worst-case skew expected to be introduced by the signal paths. In the example cited above, an intentional delay of at least 34 ns would be required.

Since it is not known which of the signal pairs actually has the greater propagation delay, it may well be the case that the EOP signal path is already inherently slower than the data path. This means that the actual total EOP delay as seen at the distant end may be much greater than simply the intentional delay introduced at the other end. In the example cited above, the EOP signal path could be as much as 34 ns slower than the data path.

This implies an upper bound on the size of the intentional delay that can be introduced. The total EOP delay cannot be greater than 75 ns, so the sum of the inherent cable skew delay and the intentional delay cannot be greater than that value. This implies that skews up to 37.5 ns can be handled, with a maximum intentional delay of 37.5 ns being utilized.

Since a worst-case skew of +/−15% may actually be overly conservative, it is not expected that the 37.5 ns skew limit is a significant limitation to achieving maximum distance extension using readily available CAT 5 LAN (or other) cabling. And, as already discussed, it may be feasible to employ cable with tighter manufacturing tolerances, and/ or to test the characteristics of the cable before possibly using it.

3.7.2.1.2 Determining Relative Path Delays—

An approach which may be used instead of the intentional delay approach, or to augment that approach, is to have the extension units determine the relative delay of the data and SEZ signal paths. This can be done prior to use of the signal paths for message (and other event) communication purposes, e.g., as part of the extension system initialization procedure.

As the units may be designed to signal their ready-to-function status during or immediately following their local power-up initialization (using one or more of the available signal paths connecting the units), part of the initialization procedure can be a determination of the relative delays of the signal paths.

This may be accomplished by having one unit send signal transitions simultaneously on the signal paths, with the other unit determining the relative time of arrival of the signal transitions. The results can be noted at that end and also communicated back to the other end (through appropriate prearranged, initialization-related signaling conventions). Alternatively, the units can exchange their roles, with the transitions now being sent by the second unit, and the time of arrival being noted by the first unit.

Once the relative time delays of the signal paths are known by both units, the units can assign the communication of the SEZ signaling to the slower of the two signal paths, with the data signaling occurring on the faster signal path.

Since the determination of the relative signal path delays is subject to some margin of error, it may still be possible using strictly this approach to have the overall EOP delay be slightly less than the data delay. Therefore, a small intentional delay can be utilized additionally, to ensure that the EOP signal arrives behind the data signal. This intentional delay need be only somewhat larger than the expected margin of error in determining the relative timing of the data paths.

For example, if the path-delay-determination process is subject to a +/−5 ns uncertainty (i.e., the determination result may be in error if the difference in the paths' delays is no greater than 5 ns), an intentional delay slightly larger than 5 ns (e.g., 10 ns) can be utilized. In this way, even if an incorrect assignment is made (resulting in for example the EOP signal path being 5 ns faster than the data path), the overall delay of the EOP signal will still be greater than that of the data signal (by at least 5 ns).

With the delay values utilized in this example, a maximum cable skew of 65 ns (75 ns less 10 ns) can be tolerated.

3.7.2.1.3 Other Communication Schemes—

Other schemes for achieving the requires information communication in the context of a quad-simplex situation are possible.

3.7.3 Dual-Duplex Approach

In the second implementation mentioned above, two twisted pairs (160, 161) are used. One pair (160) may handle the data signaling communication, and the other pair (161) may handle the SEZ signaling. On either pair information is communicated in both directions. This approach may be regarded as collapsing the four pairs of the quad-simplex approach into half the number of pairs.

The signaling technique used can be of a half-duplex nature, where either one end or the other "has control" of the extension at a time. This approach may appear to be a natural one, following the half-duplex signaling inherent in USB message communication. Such an approach however tends to render the timely communication of other situations that may occur while message transmission is underway (such as reset or disconnect events) more difficult.

Figure 12:
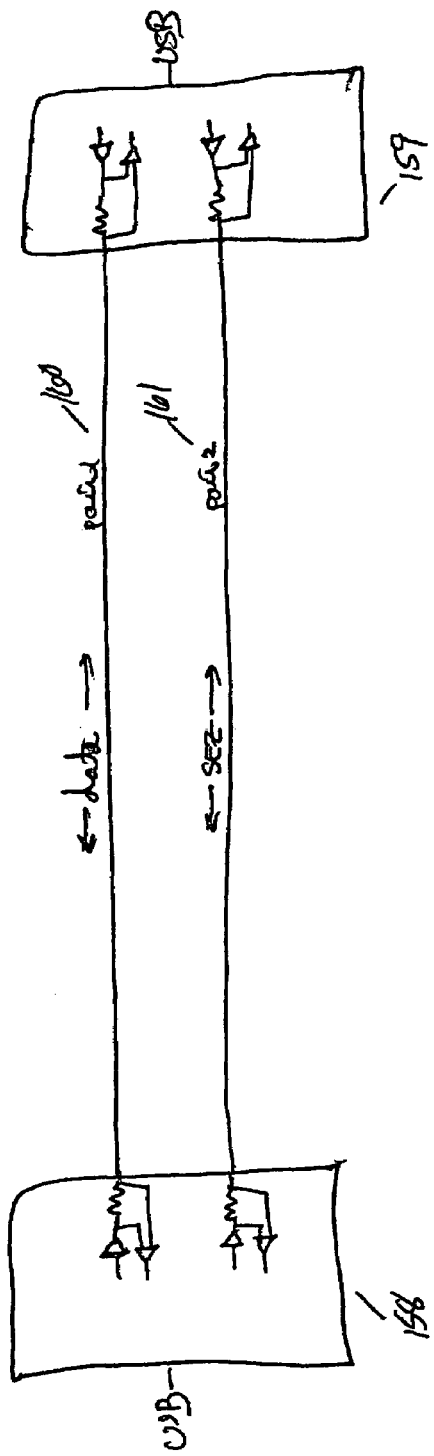
FIG. 12 is a block diagram showing dual-duplex communication as in FIG. 8, with example waveforms.

An alternative is to allow for the same degree of signaling freedom as is present in the quad-simplex approach, by having communication be possible in either direction constantly. Such simultaneous bidirectional communication is possible through the use of conventional differential digital signaling to transmit information over a signal path, with differential analog reception (e.g., use of analog differential amplifiers) to receive the signal. Refer to FIG. 12.

3.7.4 Dual-Simplex Approach

In the third implementation mentioned above, two twisted pairs (164, 165) are used. One pair (164) is utilized for communicating information downstream along the extension, with the other pair (165) used for communicating information upstream.

Compared with the quad-simplex approach, each pair here handles both data and SEZ signaling. Rather than an approach similar to that used by USB (involving common-mode signaling, as discussed previously) in order to communicate the three bus states (J, K and SEZ), a purely differential signaling approach is used. This involves the use of multilevel signaling, which may be regarded as similar to conventional binary digital signaling except that more than just two states are involved.

Generation of multilevel signals may be accomplished through the use of conventional digital (binary) signal levels (e.g., as produced by conventional digital logic), combined using resistor networks, possibly also involving the use of operational amplifiers, in order to achieve the discrete (digital) analog voltages and/or currents required for transmission over the extension. Additionally involved may be analog differential amplifiers with differential outputs.

Reception of multilevel signals may be accomplished through the use of conventional digital comparators (comparing an analog input voltage to a reference analog voltage, and producing a digital logic output). Additionally involved may be analog amplifiers with differential inputs and single-ended outputs.

Two signaling versions of this approach may be implemented: the first employs level signaling, the second employs pulse signaling. Other versions are also possible.

3.7.4.1 Level Signaling—

In order to represent the three USB signal states, the signaling employed on the extension may utilize three signal levels (e.g., three discrete voltages), each corresponding separately to the J, K and SEZ states.

Figure 13:
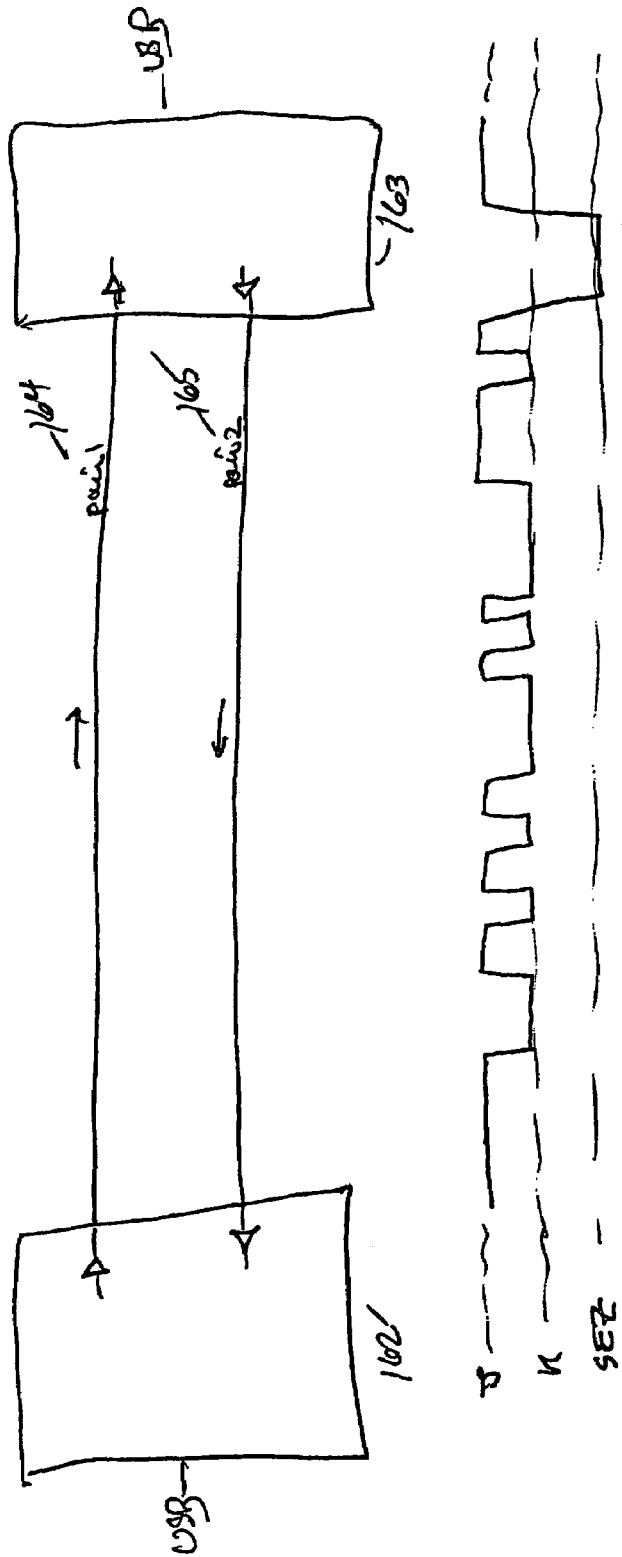
FIG. 13 is a block diagram showing dual-simplex communication, as in FIG. 9, with three-level signaling as shown in example waveform.

In one implementation the voltages assigned to represent these states may arbitrarily be ordered by value in that same, order, with for example J being represented by the most positive voltage level, K being represented by middle voltage level, and SEZ being represented by the most negative voltage level. Refer to FIG. 13.

Assume a usual scenario of an idle condition, followed by a message and EOP, followed by another idle. The voltage waveform on the extension signal path would initially sit at the highest voltage level (J: idle). At the start of the message, the waveform would move to the middle voltage value (K), and thereafter transition back and forth between those two levels. At the end of the message in the case the last level prior to the message-ending EOP were a K, the waveform would move from the middle voltage level to the lowest voltage level (SEZ). Following the end of EOP, the waveform would move back to the highest voltage level (J), and remain there for the duration of the idle condition.

3.7.4.1.1 Glitches Possible—

One potential difficulty with this means of signaling is that the voltage waveform, in transitioning from SEZ to J, moves through the K voltage level. This may be interpreted at the receiving end as a momentary K state (a "glitch"), prior to the following J state.

A further potential difficulty occurs in the case the last level prior to the EOP is a J; now the waveform has to transition through the K voltage level both at the start as well as at the end of the EOP. Similar situations may arise with any scheme employing just three levels.

This issue may be addressed by incorporating delays in the receiving circuitry, to determine for example whether the waveform is simply transitioning through the K level on its way to SEZ or to J, or whether the waveform is remaining at the K level. The use of such a delay-based technique may however increase the effective jitter of the data and SEZ signals introduced during extension.

3.7.4.1.2 Alternative Level Assignments—

Figure 14:
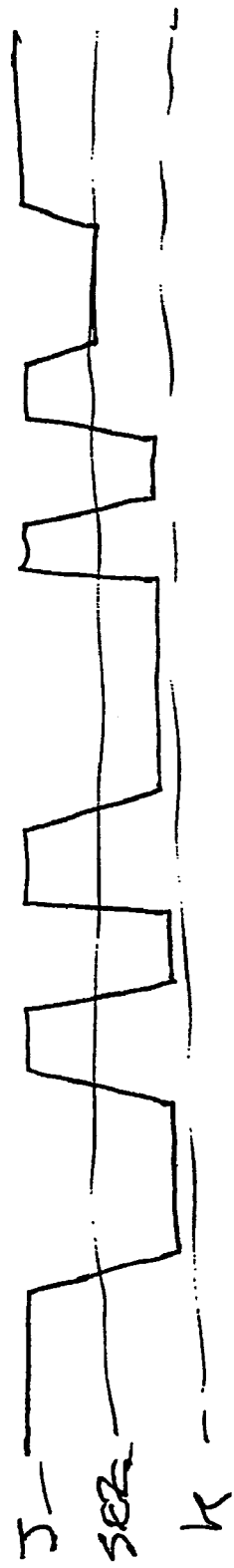
FIG. 14 is an alternate example of three-level signaling in the system of FIG. 13.

An improvement involves changing the arbitrary level assignment, by assigning the middle voltage level to represent SEZ, and (for example) the most positive voltage level to represent J, and the most negative voltage level to represent K. Refer to FIG. 14.

The receiving circuitry still utilizes delays in order to verify whether the SEZ level is transient or not. However there is no asymmetry now regarding the interpretation of the K level verses the J level, as is the case with the first set of level assignments discussed. The result can be less jitter introduced during extension in the USB differential data stream.

Note that other signaling schemes using three levels are possible.

3.7.4.1.3 Use of Four Levels—

Figure 15:
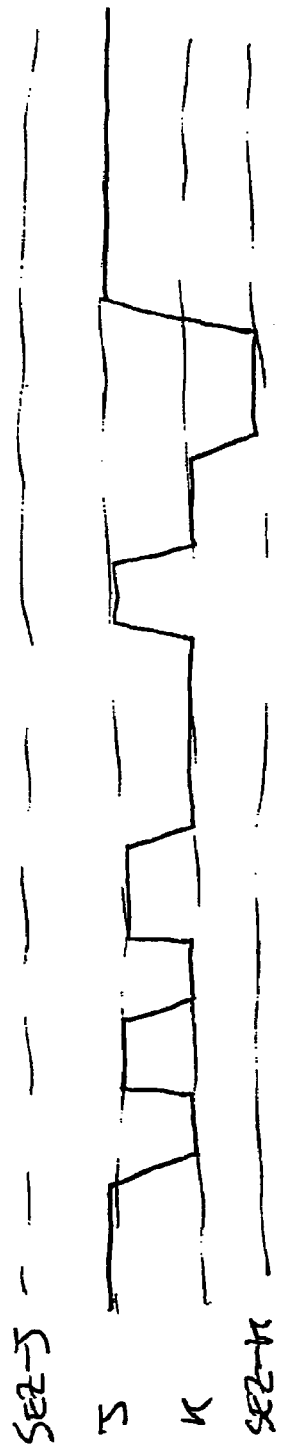
FIG. 15 is an alternate example of four-level signaling in the system of FIG. 13.

An alternative approach involves the use of four voltage levels for extension signaling. Here, the most positive voltage may be assigned to represent a first SEZ level (which may be termed SEZ-J); the next lower level may represent J, the next lower level may represent K, and the lowest voltage level may be assigned to represent a second SEZ level (which may be termed SEZ-K). Refer to FIG. 15.

Under the same scenario and described above, the idle and message signaling result in the waveform moving from its initial J level, back and forth between there and the K level. Again assuming that the last level prior to the message-ending EOP is a K, the waveform would move from the K level to the SEZ-K level, and remain there for the duration of the EOP. Thereafter, the waveform moves back to the J level, transitioning through the K level in the process.

The receiving unit has no difficulty, without the requirement for utilization of delays, in determining that the signal is not to be interpreted as being (even momentarily) in the K state, since the waveform had just been at the SEZ-K level. The receiving unit, once seeing SEZ-K, can wait for the J level to be achieved, and can ignore any other apparent signaling state changes (e.g., to K) in the meantime.

In the case the last level prior to the EOP is a J; the waveform simply moves from J to SEZ-J, and then back to J (idle).

An advantage of this approach is that since the J and K levels are electrically adjacent and are assigned the middle voltage levels, and since there are an even number of levels used, the change from J to K (and vice versa) can simply and reliably be determined independent of the differential voltage magnitude by examining just the sign (positive or negative) of the differential voltage.

Also, like the alternative three-level approach discussed above, the apparent time of occurrence of the start of EOP as seen at the receiving end is unaffected by whether a J or a K is present at the end of the message (with the result that apparent differential-to-EOP skew is reduced).

3.7.4.1.4 Four Levels Variation—

Figure 16:
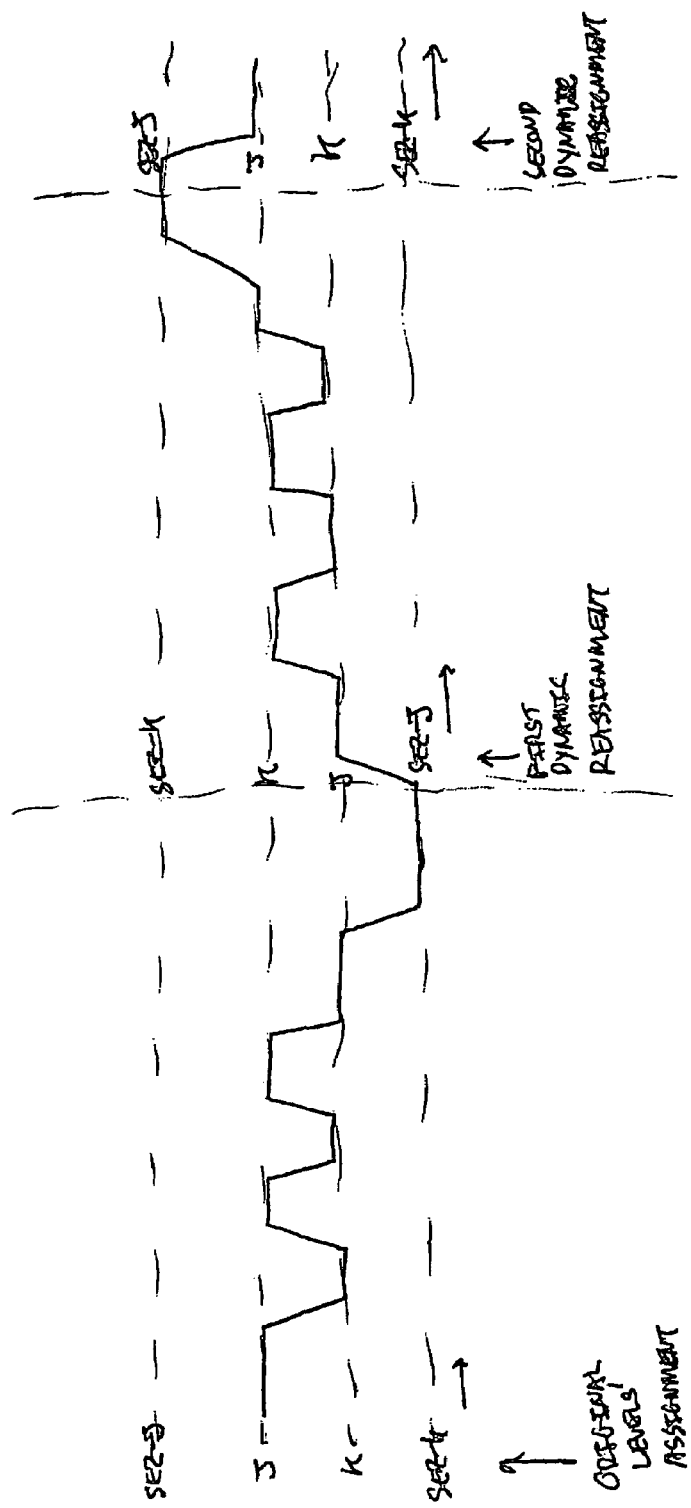
FIG. 16 is an alternate example of four-level signaling as in FIG. 15, showing dynamic reassignment of levels.

A variation on the four levels approach discussed above involves reassigning the levels dynamically. In such an approach the waveform moves back following SEZ to the nearer inner level, which is then (re)defined as J, and the other (farther-away) inner level is (re)defined as K. Refer to FIG. 16.

Such an approach has the advantage that: no reception-discrimination delays need be employed (which can slow the transfer of information and/or increase jitter); all possible transitions (J to K, K to J, J to SEZ, K to SEZ and SEZ to J,) involve only a single-level change (which is quickest to signal and most reliable to interpret), and all possible transitions (as enumerated) are performed in the same amount of time, so that the timing characteristics of the data and SEZ streams are preserved to the maximum degree possible during extension.

Note that other signaling schemes using four levels are possible, and that signaling schemes using more than four levels are possible.

3.7.4.2 Pulse Signaling—

An alternative to level signaling is the use of pulse signaling. Level signaling as described above maintains signal levels on the extension in accord with the duration of USB bus signal states that are occurring. This requires the transmission circuitry, the extension media, and the reception circuitry to be "DC coupled", that is, to be able to process with fidelity signals whose frequency components extend down to DC. (This is so since conditions such as reset or idle can be maintained on the USB for arbitrarily-long periods of time.)

In a pulse signaling approach, signals may be communicated on the extension in response to a change in USB signaling, rather than in direct response to the USB signaling itself. Such an approach may have advantages over level signaling in that less jitter may be introduced in the extension process. Furthermore, such an approach may be desirable or required where the signal path is not DC coupled. This can be the case where electrical isolation is desired or required and necessitates a non-DC-coupled approach (e.g., where transformer isolation or capacitive coupling of the extension signals is utilized). Such an approach also may be required where the reception circuitry is not DC coupled (although the transmission circuitry and the extension media may be, such as in the case of extension via fiber optics).

The pulse signaling approach in turn is more complex than level signaling in that generally a higher bandwidth is required to communicate reliably, since pulses (having larger amplitude high frequency components than do levels) are utilized. Furthermore, there is the possibility of a loss of synchronization, as described below.

3.7.4.2.1 Signaling Defined—

Figure 17:
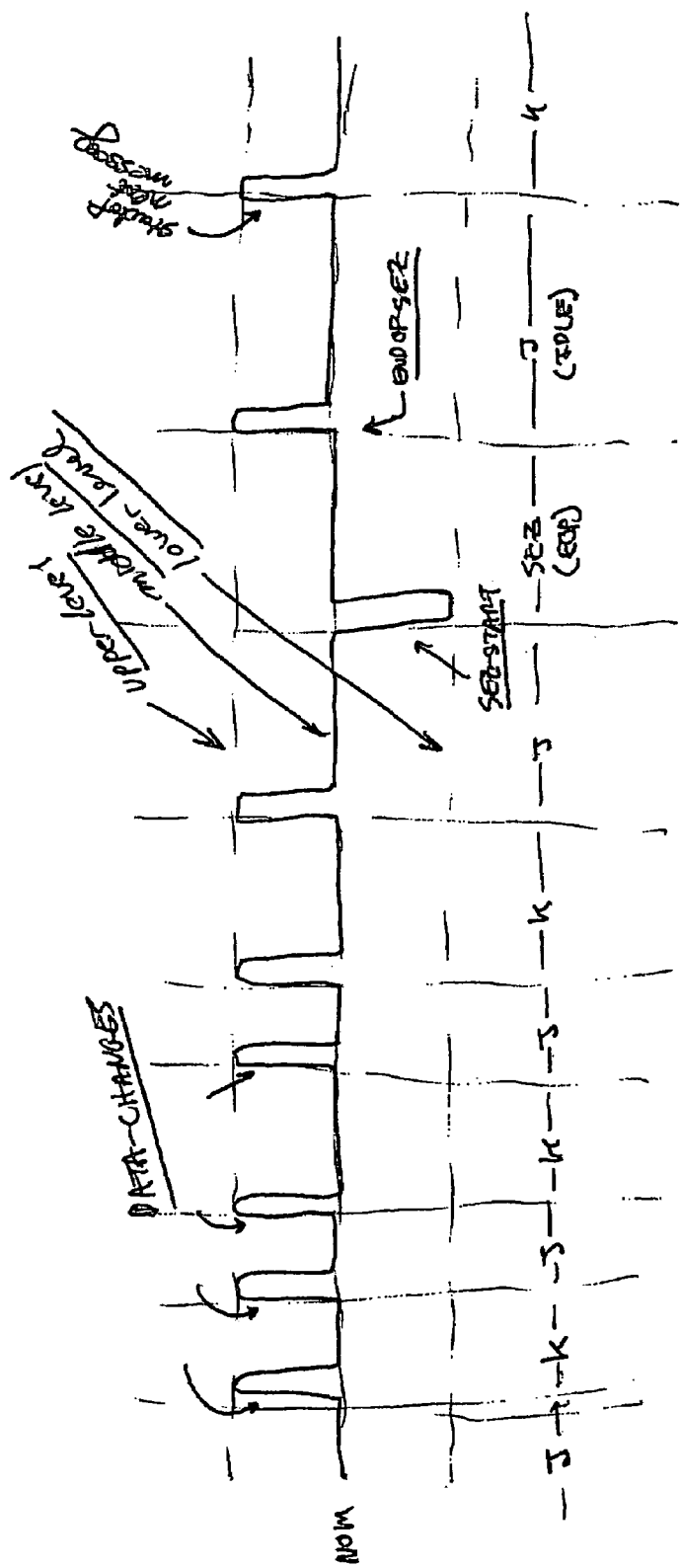
FIG. 17 is an alternate example of three-level pulse signaling in the system of FIG. 13, with example waveform and interpretative notations.

A three-level signaling scheme may be employed. The middle voltage level may be assigned to indicate a nominal condition along the extension of no change in signal state occurring. It may be assumed that initially an unchanging idle USB condition prevails, represented by an unchanging middle voltage level on the extension. Refer to FIG. 17.

A change from the nominal voltage level to the most positive voltage level can represent a differential USB signal change (i.e., a change from J to K, or a change from K to j). That is, such a leading-edge change on the extension represents a USB logical 0 bit transition, and may be termed a "data-change edge". No particular significance is attached to the change back from the most positive level to the nominal level (the trailing edge), which may take place relatively quickly following the leading edge (i.e., as a pulse).

A change from the nominal voltage level to the most negative voltage level can represent the start of an SEZ event and may be termed an "SEZ-start edge"), again with no particular significance attached to the timing of the occurrence of the trailing edge. The end of the SEZ condition is signaled by a following data-change edge, which is taken to mean that a USB idle condition again prevails.

Communication over the extension of other conditions or events (e.g., initialization-related communication such as ready- or not-ready-to-function) can be signaled by variations on the basic pulse signaling outlined. For example, a not-ready-to-function condition can be signaled by a first SEZ-start edge, followed by a second SEZ-start edge (in other words, two negative-going pulses in a row). The eventual ready-to-function condition is signaled by a later data-change edge. (Other variations are possible, including various combinations of both positive-going and negative-going pulses occurring following the initial SEZ-start pulse.)

Note that other pulse signaling schemes using three levels are possible. Pulse signaling schemes using more than three levels are possible.

3.7.4.2.2 Synchronization Issue—

Since the data-change pulse represents a change in the USB differential signaling, it is possible for the receiver to lose synchronization with the transmitter (that is, to confuse which data-change edges represented J-to-K changes, and which represented K-to-J changes). The result would be the garbling of the reception of the then-current message. However, the loss of synchronization would last only until the next SEZ (EOP or reset), which acts to reestablish synchronization (since an idle (J) is known to always follow an SEZ).

3.7.5 Single-Duplex Approach

In the fourth implementation mentioned above, a single twisted pair is used. Information is communicated in both directions. This approach may be regarded as collapsing the two pairs of the dual-simplex approach into a single pair.

Figure 18:
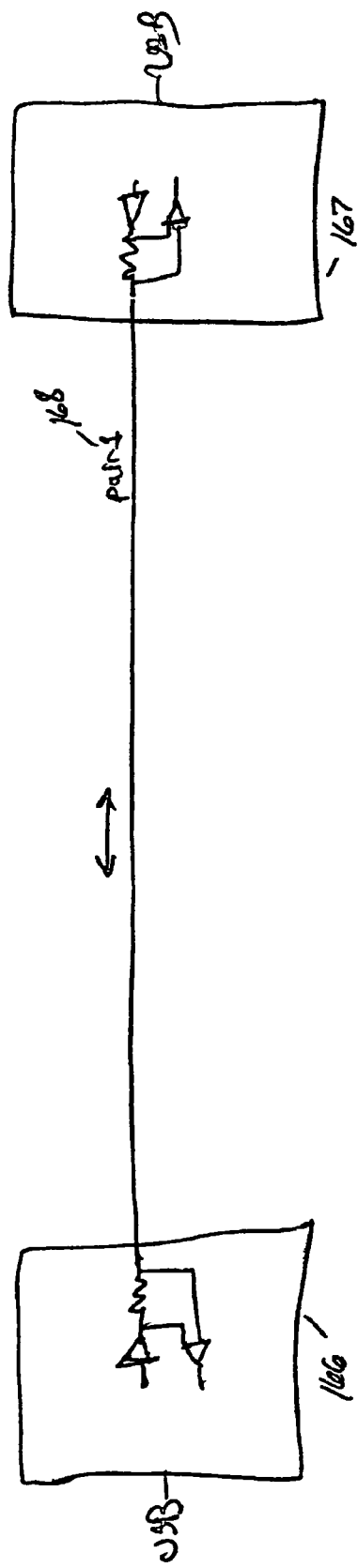
FIG. 18 is a block diagram showing an alternative single-duplex communication using simultaneous bidirectional signaling, with aspects of analog circuitry.

As described above with regard to the dual-duplex approach, the signaling technique used can be of a half-duplex nature, or a simultaneous bidirectional technique can be used. As with the dual-simplex approach, level signaling or pulse signaling may be employed. Refer to FIG. 18.

3.8 FIBER OPTIC EXTENSION

The discussions above have generally assumed or implied use of electrical cabling as the means for bus extension. Use of fiber optic transmitters and receivers (or transceivers) and fiber optic cable is also possible.

3.8.1 Applicability

Because of the relative greater cost of the fiber optic approach compared with more conventional electrical signaling approaches, use of fiber optics is likely to be non-optimally cost effective in situations other than those involving long-haul extension. Fiber optics would appear to be ruled out in other extension situations (such as repeaters and hub-based extension approaches), although it likely could be technically made to function there.

3.8.2 Signaling Utilized

Because of the non-DC-coupled characteristic of commercially-available fiber optic receivers, use of a multilevel pulse signaling technique may be optimum; refer to the discussion concerning the dual-simplex approach above.

Unlike the electrical-signaling case where both positive and negative differential voltages can be communicated, light transmission has no "polarity". Therefore, to achieve multilevel pulse communication (as described previously), the light transmission case corresponding to the middle voltage level (idle) is that of a certain intensity of light: the light transmission case corresponding to the most-positive voltage level is that of a greater intensity of light (e.g., twice the idle intensity); and the light transmission case corresponding to the most-negative voltage level is that of no light.

In the steady state the electrical circuitry accepting the output of the fiber optic receiver assumes an idle condition when no quickly-occurring light level change has been noticed. The first of two relatively quickly-occurring positive-then-negative changes in the intensity of the light received is taken to indicate a data-change edge, while the first of two relatively quickly-occurring negative-then-positive changes in the light intensity is taken to indicate an SEZ-start.

3.9 OTHER EXTENSION MEANS

Other means and/or media may be used, besides electrical and fiber optic cabling, to signal information between the near- and far-end extension units. Examples include infrared (or other light-based) signaling and spread-spectrum (or other radiowave-based) signaling.

As discussed above, the signaling means need not necessarily have a frequency response characteristic which extends down to DC. However, the USB specification requirements concerning signal propagation delay (refer to Section 7.1.19) and signal jitter (refer to Section 7.1.13) may together act to render infeasible various, otherwise-promising signaling approaches.

3.10 EMBEDDED HUBS

An advantage may be gained by embedding hubs in the near- and/or far-end extension units (169, 172) to increase cost-effectiveness. Such hubs are not directly involved with the extension process; from a signal propagation point of view they may be located either upstream of, or downstream of, the extension means proper. Yet, the hubs can physically reside together with the near-end or far-end extension circuitry (170, 174), with the resultant appearance to the user that the extension unit performs a combination extension and hub-expansion function.

3.10.1 Far-End Embedded Hubs

Figure 19:
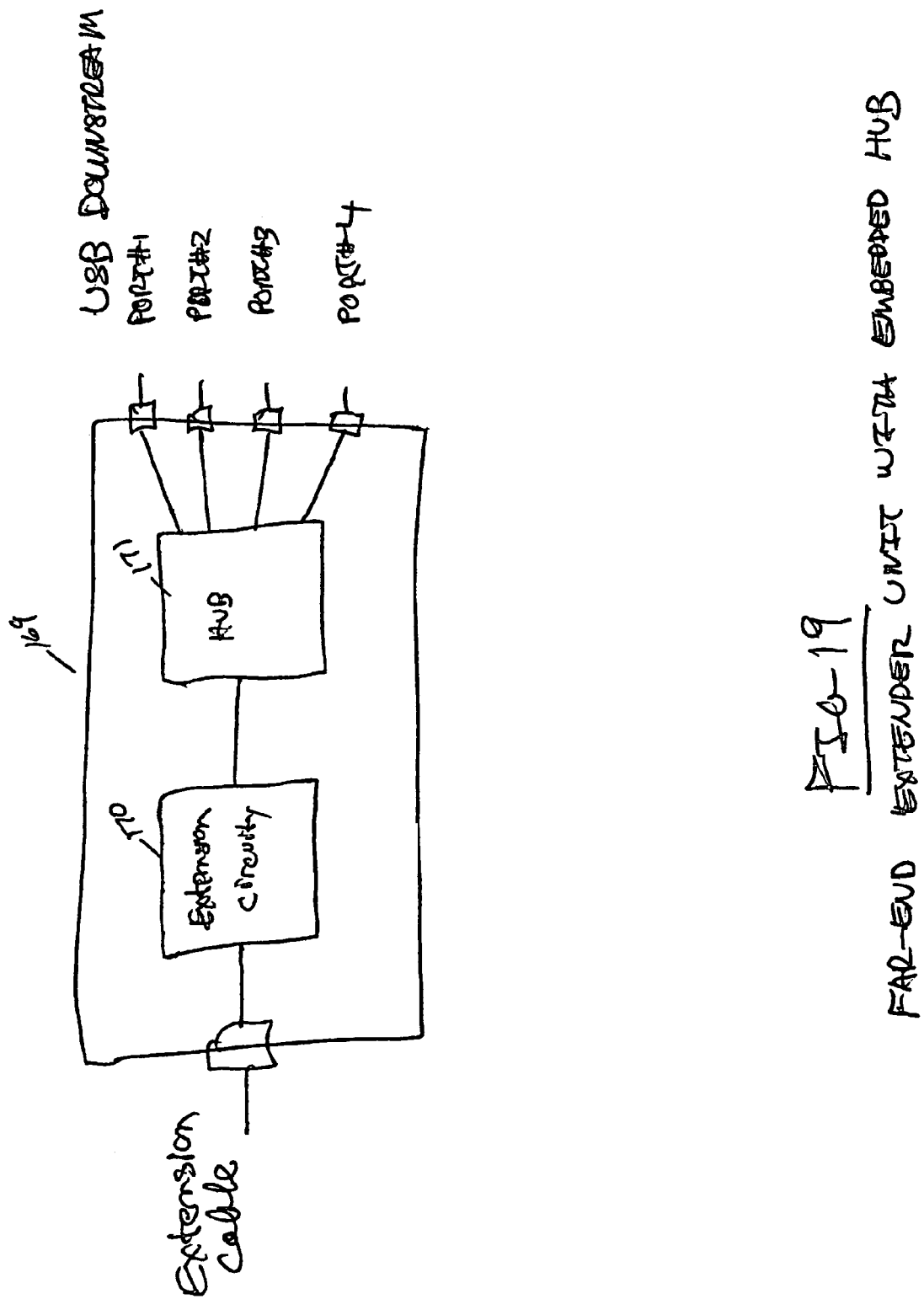
FIG. 19 is a block diagram of a far-end extender unit with embedded hub usable in the system of FIG. 5.

Embedding a hub (171, 173) at the far end of the extension has the benefit of providing potentially multiple extension ports, rather than just one. The tradeoff involved is that some portion of the overall delay which could have been allotted to the extension means proper must now be allocated to the hub as well. Refer to FIG. 19.

The USB specification allows the hub (i.e., the hub silicon) to have a propagation delay of up to 40 ns (with an additional delay of up to 4 ns allowed for outside-the-silicon signal delay, making the total delay specification 44 ns; refer to Section 7.1.14). The equivalent length of extension cable, assuming a nominal velocity of propagation of 0.67 ft/ns (0.2 m/ns), is about 27 ft (8.1 m). In situations where it is cost-effective to trade this amount of extension distance for the benefits of an embedded far-end hub, this approach may be appropriate.

3.10.1.1 Further Benefits—

Unobvious implementation-related advantages may accrue as a result of the existence of an embedded far-end hub. One is that the extension means proper is by definition always connected to that being extended (the hub), so that the requirement for means to be implemented to allow the far-end circuitry to signal to the near-end circuitry regarding the connect/disconnect status of the far-end device may be eliminated.

Another advantage concerns the basic J and K USB signaling. The far-end extension logic must interpret the USB signaling of the extended device based on whether that device is a full- or low-speed device (refer to Table 7-1). Since the extended device is in fact a hub (which functions as a full-speed device from an upstream-signaling point of view), the J/K interpretation is fixed. Similarly, the near-end extension logic always signals a J connection event upstream in just one manner (mimicking the connection behavior of a full-speed device; refer to Section 7.1.7.1). Furthermore, full-speed signaling only is used across the extension, also reducing complexity.

3.10.2 Near-End Embedded Hubs

Figure 20:
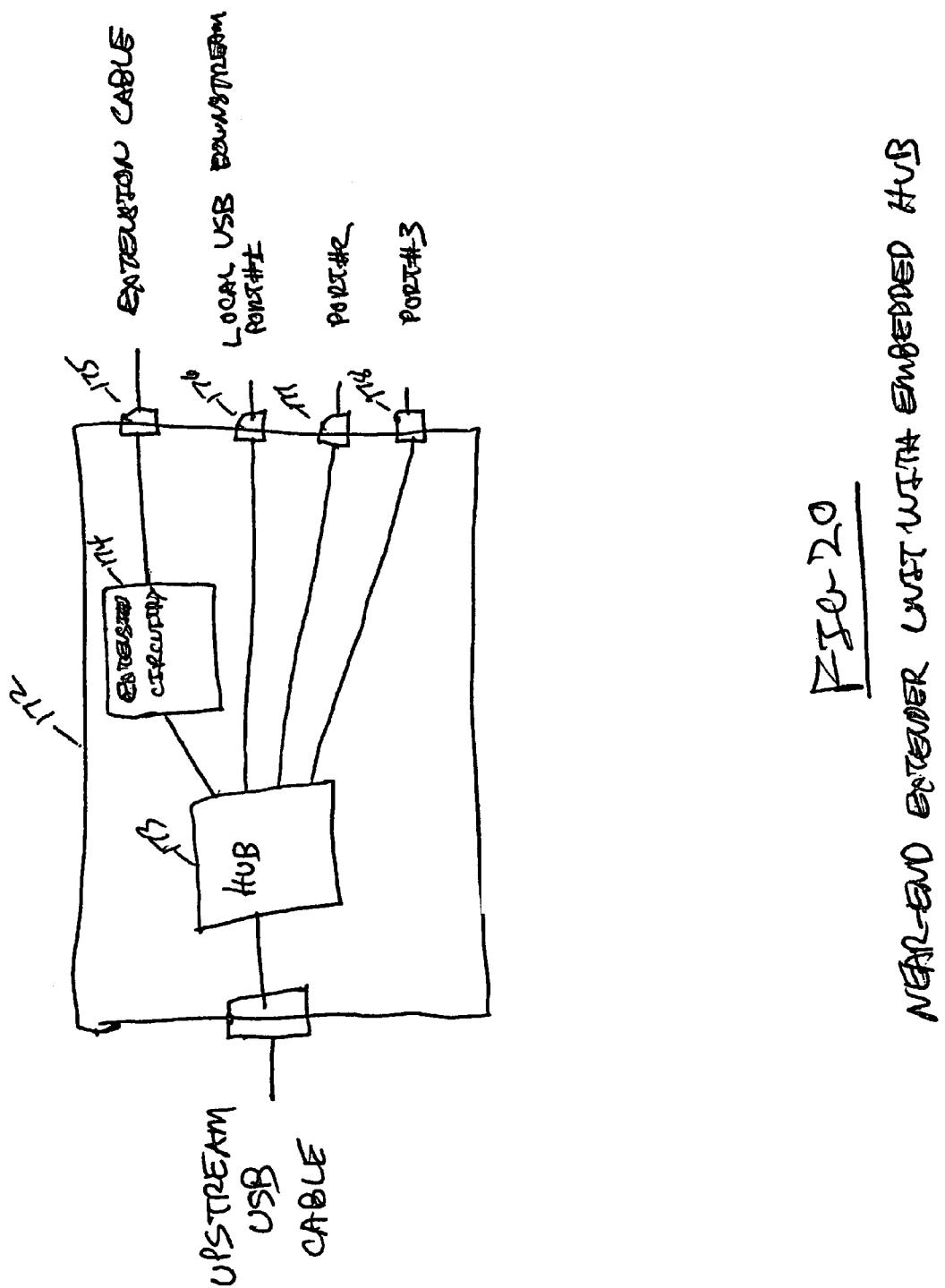
FIG. 20 is a block diagram of a near-end extender unit with embedded hub usable in the system of FIG. 5.

An embedded hub present at the near-end has a similar advantage, namely of providing additional ports for greater ease of use and/or cost-effectiveness. One downstream port (175) may be dedicated for connection of the extension means, while the remaining ports (176, 177, 178) may be made available for external connection of user devices or hubs. Again, the presence of the embedded hub results in less delay time being available for the extension means proper. Refer to FIG. 20.

Implementations in which both near- and far-end embedded hubs are present may also be cost-effective and therefore useful.

3.11 ENSURING RELIABLE SYSTEM BEHAVIOR

It is possible to configure extension systems which may be of marginal reliability or which may not be able to function at all. It is deemed to be of benefit to ensure that such systems provide feedback to the user that they may be unreliable, and to ensure when appropriate that such systems refuse (in a controlled, reliable manner) to function.

Whether an extension system is capable of proper operation is determined principally by the signal propagation delay through the extension (comprised of the delay of the active circuitry at both ends and the delay of the electrical or fiber optic cable), and in particular whether that delay is no greater than the maximum allowed (350 ns, as discussed previously).

Therefore a key means to determine the capability of proper extension operation is to determine the propagation delay though the extension. Assuming the delay through the active circuitry is known to a sufficient degree of accuracy (based on the circuitry design), the issue becomes one of determining the propagation delay through the cable.

3.11.1 Determining Cable Delay

Discussed previously was a means to determine the relative propagation delay of two (or more) signal paths along the cable. That technique can be enhanced to enable determination of the actual signal path delay. Like the first technique, this too can be performed during or immediately after the units' power-up initialization, prior to normal operation of the extension.

For example, the units can configure two simplex paths (or a single duplex path) such that a signal edge will be propagated back and forth along the cable. For example, the first unit can cause a rising signal edge to be sent to the other unit, which can in turn send a rising edge out on the other path. Upon receipt of the incoming rising edge, the first unit can complement its output (send a falling edge); upon receipt of that falling edge, the second unit can then complement its output and send back to the first unit a falling edge in response.

In this manner an oscillation can be setup whose half-period depends on the sum of the propagation delays of the forward and backward signal paths, as well as on the delays of the oscillation-related circuitry at both ends.

Given that one or both units has a means of determining a period of time to sufficient accuracy (e.g., through the use of a crystal oscillator or other means), the oscillation period can be measured. Given that the delay through the oscillation-related circuitry is known to a sufficient degree of accuracy. (based on the circuitry design), the (average) delay of signal paths can be determined.

The delay value can be determined independently by both units, or one unit can make the measurement which it then communicates (signaling via the data path(s)) to the other unit prior to moving to ready-to-function.

3.11.2 Utilizing the Cable Delay Information

As a minimum, a determination can be made of whether the apparent overall extension propagation delay is or is not greater than the allowed maximum. If the delay is too great, the units can act to not permit communication of USB signaling over the extension. Additionally, this condition can be indicated to the user via visual (e.g., LED) and/or audible means.

In this manner the user is given the freedom of utilizing cable of arbitrary length, just so long as the maximum propagation delay is within the allowable limit.

Now, it may be the case that the overall extension propagation delay may be under, but still near to the limit. Consequently, it may be the case that initially the extension system functions properly. Yet, at some other time, the overall propagation delay may have changed slightly (the delay through the active circuitry and/or the cable delay perhaps having been affected by environmental conditions, such as temperature). At that time, the extension system might refuse to function. Such a situation is undesirable; the user may well have the understandable expectation that if the system has functioned once, it should continue to be able to function.

Therefore, it may be beneficial to provide additional information to the user regarding the propagation delay. An indication may be given (e.g., visually, via LEDs and/or seven-segment display or other means) of the actual delay, and/or the extent to which the delay compares to the allowed limit. For example, an indication may be given when the system is capable of operation yet the overall delay is close (e.g., within 5%) to the allowed limit. The user can understand that such a cable delay may work now, but may not work under other environmental conditions. The user can then decide whether to accept such a situation, or perhaps to install a somewhat shorter length of cable instead, one which provides a greater margin against changes in the overall propagation delay.

Likewise, an indication of the actual overall delay can be of benefit when the delay is too great. The user can see by What extent the delay is too great, and reduce the cable length (based on the actual delay) by an amount which will satisfy the delay limit.

3.11.3 The Most General Situation

The approach of measuring the propagation delay allows the maximum propagation delay limit to be respected, at least while there is a single extension means present between the host and some final device.

However, there is nothing that would prevent a user from configuring a system with more than one extension in series, which could thereby cause the 350 ns delay limit to be exceeded. Likewise there is nothing to prevent an extension means from being used where one or more hubs are already in place, thereby again causing the 350 ns delay limit to be exceeded.

3.11.4 Use Of Technology-Enforcement Hubs

Now, the OS is able to exercise control over configurations of USB topology which contain hubs since it recognizes the existence of the hubs and is able to control (enable/disable) them. This suggests that linking hubs (or the perception to the OS of the existence of hubs) to the functioning of the (non-hub-based) extension means may allow the OS to be used to enforce proper application of bus extension.

In other words, if a hub had to be enabled for every 70 ns of extension delay desired, an OS-based means would exist for insuring that the 350 ns maximum signal delay could not be violated under any circumstances.

Since the extension means is not hub-based, the implication is that the extension signal path is essentially hub-free; yet hubs, associated with the extension process (in a manner described below), are present as part of the extension means. The number of hubs (which may be termed "technology-enforcement hubs" TEHubs)) apparently present can be made to be related to the propagation delay of the extension.

3.11.5 TEHub Connection

In the previous discussions, active circuitry to implement the extension means is present at the near end of the extension (perhaps connected to the downstream port of the host) and at the far end of the extension (where the extended device (or conventional hub) connects). A first TEHub (180) may also be present, placed logically in parallel with the near-end extension circuitry (185) and connected also to the host. (Note that the TEHub is implemented physically together with the extension-related circuitry in the near-end unit (179).) Since such a connection is not supported by commercially available hub silicon, the connection is facilitated through additional TEHub-related circuitry (185) in the near-end extension unit.

This type of connection allows USB information sent from upstream (e.g., from the host) to be received in by both the near-end extension-related circuitry as well as by the TEHub. Similarly, both the TEHub and the near-end extension-related circuitry can send USB information back upstream (e.g., to the host).

Connected to a downstream port of the first TEHub (180) may be a second TEHub (181); yet additional TEHubs (182, 183, 184) may also be present, connected in a like manner.

Figure 21:
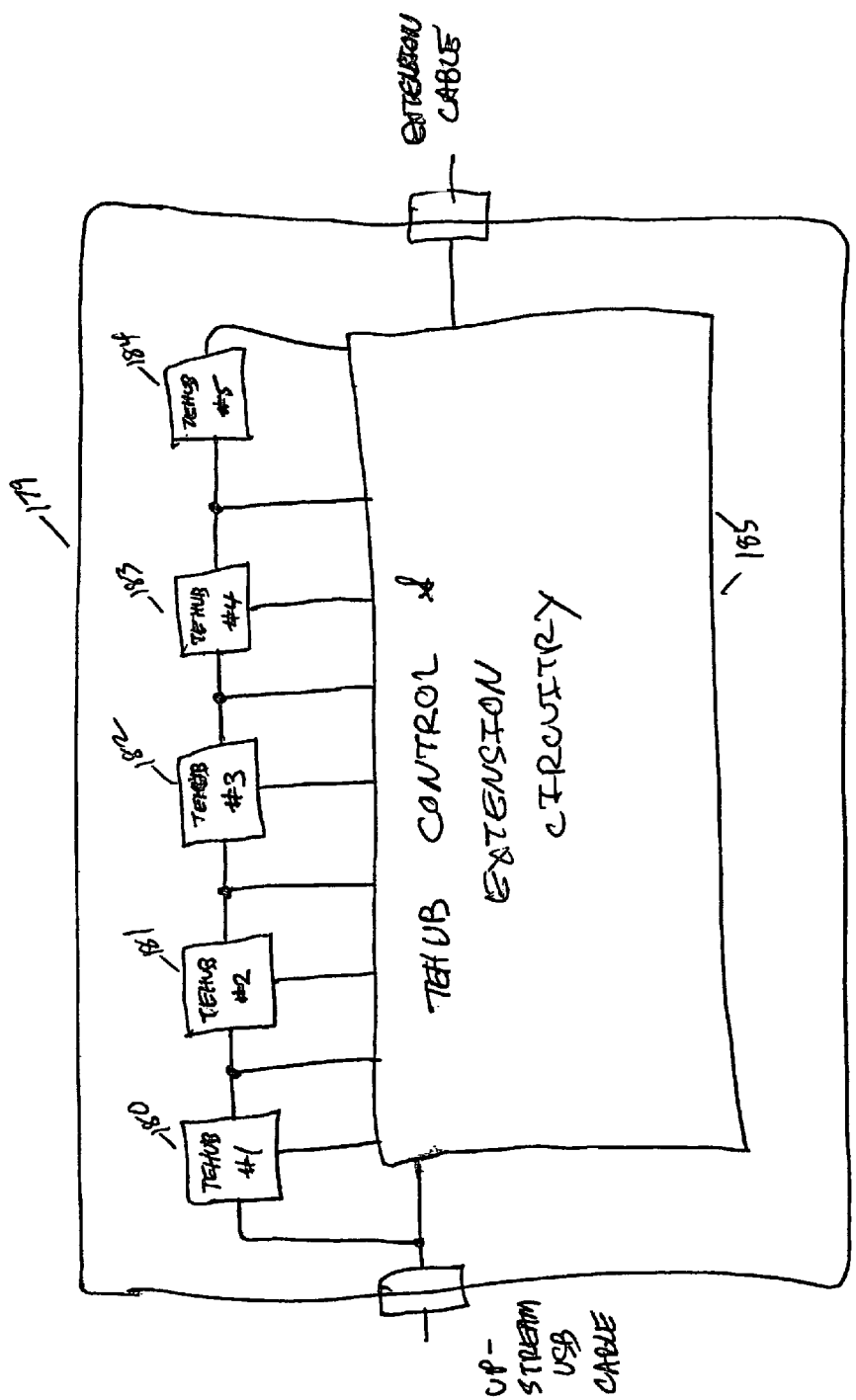
FIG. 21 is a block diagram of a near-end extender unit usable in the system of FIG. 5, incorporating TEHubs and their connections.

The hubs are under control of TEHub-related circuitry (185) in the near-end unit (179), as described below. Refer to FIG. 21.

Note by way of emphasis that the TEHubs are logically in parallel with the extension path, specifically that part of the path which moves through the near-end extension circuitry (185). The TEHubs are connected only at the near end and are physically present only in the near-end unit (179). The TEHubs are able to be present in the system and can be visible to the OS (to the extent of the number required to be present for enforcement-related purposes), yet their connection into the USB system is accomplished in such a manner that their presence does not interfere with or affect the long-haul extension signaling itself.

3.11.6 Example Topology

In one example the extension system may have determined (through means discussed previously) that the overall extension propagation delay is 175 ns. Such a delay corresponds to the delay allowed for three hubs (at 70 ns per hub-cable combination). Therefore, as part of the during- or post-initialization procedure, the near-end unit can attempt to construct a chain of three hubs. If the attempt is successful it is taken as evidence that the USB system is apparently able to tolerate an extension delay of at least 210 ns. In this case the extension system can become ready to communicate USB information along the extension.

If the attempt fails, it is taken as evidence that the USB system is apparently not able to tolerate the desired extension delay. In this case the extension system refuses to communicate USB information along the extension, and can give a visual and/or audible indication of the situation.

3.11.7 Number of Hubs Utilized

As discussed previously, it is possible that the apparent overall delay may be determined to have one value at one point in time, and a different value at some other point in time. The result may be that at one time, a three-hub chain is attempted to be constructed, while at a later time when the overall delay is perhaps shorter, a two-hub chain is constructed. This situation is not likely to cause any problem to the user; since the system by assumption was initially willing to accept three hubs (in addition to any other hubs which already may have been in place ahead of the extension), and thus will work properly with a smaller number of hubs in the chain at the later time.

However, the opposite case is also possible, wherein the later number of hubs attempted is greater than the earlier number of hubs in the chain. In such a case, the additional hub may not be accepted by the OS, or some hub in place downstream of the extension means may now be disallowed by the OS. Such a situation is undesirable since the system should continue to be able to function without change if the system was originally capable of functioning.

Furthermore, such a situation has the extremely undesirable effect of implicating a completely-unrelated unit in the USB system. That is, in the case that it is a downstream hub that the OS blocks from functioning, the appearance is that it is the hub which is somehow faulty, and no indication is provided that the blame lies with the extension means.

As discussed previously, feedback to the user regarding the available "hub margin" may be provided. For example, an overall extension delay of 208 ns could be represented as being equivalent to 2.97 hubs (e.g., through means of a visual display). Such an indication can be interpreted by the user to mean that the length of extension presently configured can be realized at a "cost" (in terms of topology) of two hubs, yet at some later point the cost may rise to three hubs (since there is a margin of only 3%). The user can decide whether to accept such a situation, or perhaps to install a somewhat shorter length of cable instead, one which provides a greater hub margin.

3.11.8 Limiting the Number of Hubs Utilized

In another implementation the user may be required to input to the extension means (e.g. through use of switches or other means) the maximum equivalent number of hubs that the extension should function as.

In an example, the user may first specify three-hub-equivalent extension functionality, hoping to reserve enough "topology depth" to allow connection before and/or after the extension of a total of two (conventional) hubs additionally. With a displayed hub-equivalent delay of, for example, 3.94 hubs, the extension means may decline to function. The user, seeing that four-hub-equivalent functionality is required now, and that five-hub-equivalent functionality may be required at some later time, can set the hub-equivalent switches to correspond to a value of five, sufficient to ensure continued and reliable functioning into the future.

Alternatively, the user can decide to specify a four-equivalent-hubs setting. Such a setting may allow the extension to function, with enough topology depth available to accommodate, for example, one additional (conventional) hub, perhaps located downstream of the extension means. In the future, the extension delay may change to be the equivalent of 4.03 hubs (for example). In this case, the extension refuses to function, and can give indication to that effect.

Note that the acceptance of a user-imposed hub-equivalent topology depth limit (e.g., via the switch means) allows the extension means to decide to be nonfunctional, even though it would perhaps in fact have been successful in constructing a chain of the number of hubs needed per the actual overall extension delay. In other words, if the extension delay is too great, it will be the extension which will not function (in a controlled manner) and which will indicate such; there is not the possibility that some other device in the USB system (such as a downstream hub) may appear to be at fault.

It is seen that this user-specified depth-limit approach guards against too long a propagation delay in the communication of information between the host and the distant device, whether use is made of a single extension or multiple extension means, and no matter where the means are placed (i.e., whether immediately downstream of the host or not). In the process the approach effectively takes into account the presence in the USB system of any non-extension-related hubs which may be present before or after the extension.

3.11.9 Implementation Details

3.11.9.1 Control of TEHubs—

The circuitry of the near-end unit may need to be able to control the TEHubs in a manner not necessarily anticipated nor directly supported by the design of the hub silicon. It will generally be required that only specific instances of all the instances of hub silicon physically present in the near end unit be allowed to attempt to connect into the USB system.

Control of the hubs may be effected through manipulation of the power supplied to the hub silicon, and/or the clock input signal, and/or the reset input signal (if such exists). Additionally, manipulation of the pull-up and/or pull-down resistors (expected to be present at the upstream and downstream ports of the hub (refer to FIGS. 7-10 and 7-11)) may be required. Also required may be gating or other means to optionally connect or disconnect the upstream and downstream ports of the various hubs together per the required connection topology.

Additionally, means for determining whether a hub has successfully connected into the system may be required. Such means may involve monitoring status outputs provided by the hub silicon, and/or monitoring the behavior of the USB signals of the downstream port(s) of the hubs.

The specific TEHubs which are to participate in building the hub chain may be controlled such that they all attempt to become functional at once, or one hub at a time can be enabled to attempt connection to its upstream neighbor.

3.11.9.2 Signal Flow—

Once the required number of TEHubs has been successfully built into a chain, the way is open for signaling communication to take place along the extension. A key issue is that in order to avoid the penalty of the propagation delay overhead associated with the TEHubs, the extension signal path must be separate from (that is, it must go around) the connected TEHubs.

Information to be sent downstream along the extension path must be picked up as far upstream as possible, at the point where the USB signaling enters the near-end unit; that is, at the head of the TEHub chain. Likewise, information to be sent upstream from the extension path must be sent out as far upstream as possible, namely where the head of the TEHub chain connection to the upstream USB port is. In this way the overhead of the propagation delay through the TEHubs is avoided.

From this point of view the TEHubs thus may be thought of as being present principally in order to "make the OS happy", without necessarily participating actively in the extension process.

3.11.9.3 TEHub-Extension Interaction—

It is the case however that the OS may command the downstream ports of any of the TEHubs to enter the suspend condition (a non-system-wide suspend is termed a "selective suspend"; refer to Section 9.1.1.6), or to cause a reset to be issued from the port.

This implies that the near-end logic must monitor the signaling occurring at the head of the TEHub chain (i.e., on the incoming USB port), as well as on the downstream port of the final TEHub. Beyond simply monitoring, it is that final TEHub's port which the near-end logic manipulates in order to inform the USB system (i.e., the OS) that a device (the device being extended) wants initially to connect to (and possibly later disconnect from) the USB system.

Generally, the logic will act to relay the message information coming in from upstream out over the extension, and provide any message response received from over the extension back upstream, but the control of the extension information flow must take into account whether the downstream signaling is also found to be taking place at the downstream port of the final TEHub.

3.11.9.3.1 Initial Behavior—

The near-end logic signals a connect at the downstream port of the final TEHub when the extension system power-up initialization procedure (including determination of signal path propagation delay time, as appropriate) has been completed.

Initially, activity signaled out from the TEHub's port is communicated downstream along the extension path. Such activity may include reset events (sent downstream from the hub), interspersed with connect attempts (sent upstream to the hub). In this first mode of operation, the near end of the extension is connected logically to the end of the TEHub chain.

Eventually, the first packet is sent out from the hub's downstream port; this occurs when the OS directs that a port reset and connect be done on that port. For at least 10 ms following that time, the only traffic sent out by the port are SOF tokens.

When the near-end logic sees that the end of the SOF packet has occurred (i.e., when the associated EOP ends), the near-end logic can switch over to a second mode of operation, wherein the near end of the extension is connected logically to the USB port of the near-end unit.

3.11.9.3.2 General Behavior—

In the second mode, the near-end logic communicates any incoming packet down the extension, and communicates any outgoing response from the extension back upstream.

The near-end logic monitors the signaling activity occurring at the downstream port of the final TEHub. Normally, a delayed version of what is seen incoming from the USB port is expected to be seen at the hub's port. Since the maximum-allowed propagation delay through a hub is about one half of a full-speed bit time, a total delay on the order of several full-speed bit times may be the case.

While relaying an incoming packet, the near-end logic verifies that the signaling activity at the hub's port is an appropriately delayed version of the signaling observed at the USB port of the near-end unit.

3.11.9.3.3 Selective Suspend—

In the case that an incoming message (or other activity) is seen at the head of the TEHub chain, yet even after a few full-speed bit times' wait an idle condition (still) exists at the tail of the TEHub chain, the near-end logic assumes that a selective suspend is underway for that hub port (at least).

The near-end logic can allow the packet, which has already started to propagate down the extension, to continue on. Alternatively, the logic can act to intentionally garble the packet so as to ensure it is unusable by the extended device (since the message should not have been communicated to the suspended device anyway).

Following this, the logic reverts back to the first mode of operation described above, waiting for some (non-suspend) event to happen at the tail of the TEHub chain. The second mode can be reestablished when the next packet(s) are seen at the tail of the TEHub chain, as described above.

3.11.9.3.4 Reset—

In a similar manner, the logic can watch the hub's port for indication of a reset event. In such a situation, the reset can be signaled (immediately) down the extension; any packet in transit at the time will be garbled.

The logic at the same time reverts back to the first mode of operation described above, so that reset (SEZ) continues to be signaled down the extension. The second mode can be reestablished when the next packet(s) are seen at the tail of the TEHub chain, as described above.

3.11.9.3.5 Embedded Hubs Revisited—

Extension systems with embedded hubs, whether near-end, far-end, or both, may benefit implementation-wise from the presence of such hubs. Note for clarity that such embedded hubs, as discussed previously, reside logically upstream or downstream of the extension means, and should not be confused with TEHubs, which may also be present in such systems.

One benefit of embedded hubs is in the reduced number of TEHubs which must be made available for chain-building. Every embedded hub present reduces the number of TEHubs potentially needed. Such embedded hubs may also reduce the total extension distance achievable, of course.

A benefit of having specifically an embedded far-end hub is that the signaling which the TEHub at the end of the chain engages in, in order to (attempt to) communicate with the remote device, is that used for a full-speed device; the J/K signaling is fixed.

Without an embedded far-end hub, in the case the extended device is a low-speed device, the packets sent downstream from the host to the device all have PRE packets prepended (refer to Section 8.6.5). Furthermore, the last hub prior to the low-speed device can now have a much greater propagation delay (as discussed previously)

These two factors suggest that an extension system employing TEHubs may be significantly more complex to implement if no far-end embedded hub is present when extension of both low- and full-speed devices is required (as would be the case generally). Alternatively, use of such a system may require that only full-speed devices be extended.

The implication is that systems employing TEHubs will typically incorporate embedded far-end hubs.

3.11.9.4 Integrated Circuit Implementation—

The hubs used as TEHubs may be realized through the use of commercially available (e.g., conventional-hub type) hub silicon. Alternatively, the TEHub functionality and/or means to effect the necessary topology-enforcement control may be implemented as a custom integrated circuit, including implementing multiple TEHubs together as one custom integrated circuit. This can be extended to include realizing the entire near- and/or far-end collection of circuitry (including TEHubs and any possible embedded hubs) as a single custom integrated circuit.

3.12 FURTHER ISSUES 3.12.1 Transmission of Power

The hub-based extension technique utilizing XOHubs (discussed previously) relies upon handling the issue of transmission of power as a key element in turning hub-based extension as described by the USB specification into a more cost-effective approach.

In contrast, the transmission of power in the context of long-haul extension is not necessarily a key issue. Long-haul extension systems may be implemented without transmission of power to the far end being an integral part of the design. Power may be made available at the far end via use of separate cabling, or via use of AC mains power; even battery or other power means (such as chemical batteries) may be utilized.

The not-necessarily-coupled nature of the transmission of signals and the transmission of power is most evident in extension systems where electrical cabling is not used as the extension medium (such as fiber optic, Infrared and spread-spectrum signaling systems).

3.12.2 Electrical Isolation

Electrical isolation between the near end and the far end is inherent in those extension systems where electrical cabling is not used as the extension medium (such as fiber optic, infrared and spread-spectrum signaling systems).

The issue of electrical isolation is closely allied with the issues of power transmission along the extension and grounding in general.

Extension systems employing electrical cabling for the signaling medium and/or as a means of power transmission may need to be implemented with regard for isolation issues for reasons of user safety and/or reliable system operation.

The possible electrical potential difference that may exist between the local ground connections of two widely-separated locations (e.g., separate rooms of a building) may otherwise result in the presence of hazardous voltages within the extension system, and/or the flow of large-magnitude ground currents along the extension path. Either of such conditions may pose dangers to the user and/or affect system behavior.

Implementations of extension systems in which electrical isolation is required to be achieved and which utilize electrical cabling as the extension means, may possibly utilize isolation techniques such as capacitive coupling, and/or transformer coupling, and/or optical isolation of signals at one or both ends of the extension.

Possible isolation requirements and the electrical isolation techniques to achieve them are not necessarily of principal concern in the functioning of the signaling of the extension system, except in so far as their signal transmission frequency characteristics are concerned. As discussed previously, situations where DC coupling is not possible may require the use of pulse (rather than level) signaling to be employed. (Further concerns, relevant for any extension system, are whether sufficient bandwidth exists for the pulse (or level) signaling employed, and whether the signal transmission can be accomplished without excessive delay and excessive jitter.)

Note that the issue of electrical isolation, particularly in the context of hub-based extension with large physical separation between the host and far-end devices, is not addressed in the USB specification. This implies that long-haul extension systems which have been properly-implemented with respect to the issues of electrical power transmission, grounding and isolation may tend generally be safer for the user and more reliable in operation than hub-based extension approaches. This is because hub-based approaches require (by definition of USB signaling) a common signal grounding line which is non-isolating.

3.13 LOW-SPEED-ONLY EXTENSION

3.13.1 Application

Commercially-available low-speed devices are generally peripherals such as keyboards and mice, requiring only a very low rate of information exchange with the PC. Additionally, such devices are located at the very end of the price spectrum.

Already discussed has been the utility of local extension of such devices. Additionally, there may be a desire to be able to place such devices remotely from a computer, for example as part of a KVM (keyboard-video-mouse) extension means discussed previously). Beyond this, extension of other types of low-speed devices far from the PC may find application in an number of areas, including low data-rate data logging, industrial process control, security monitoring and control, and surveillance using ultra-compressed video.

Development and commercial availability of such devices may come about in a synergistic manner, facilitated by the existence of extension technology, without which their development may well be unjustifiable.

3.13.2 Implementation Advantages

Implementations which are designed to handle connection of only low-speed devices benefit the fact that interpretation of the J and K USB signaling is fixed. Since low-speed signaling only is used across the extension, implementation complexity is reduced for that reason also.

3.13.3 Propagation Delay Limitation

As discussed previously, in situations where extension of (only) a low-speed device is required, the maximum extension distance possible is significantly greater than when both low- and high-speed message traffic must be handled by the extension.

The distance limitation is related to the 4.25 bit times allowed for the maximum one-way propagation delay. For full-speed messages, this amounts to about 350 ns. For low-speed messages, this amounts to about 2.8 us (eight times greater).

Although the extension circuitry required at either end has a finite propagation delay, such delay is expected to be only a percent or so of the total delay time available. Even the propagation delay of a maximally-deep set of hubs (five) is small compared to the total delay time available.

3.13.4 Maximally-Deep Topology Example

For example, in a maximum hub-depth configuration (where up to five hubs are connected to the host, and the low-speed extension means connects the last hub to the extended low-speed device), the maximum one-way propagation delay taken by the hubs and USB cables is about 610 ns. This is about 260 ns greater than the 350 ns value applicable in the case of full-speed message transmission, due to the fact that the last hub in the series can have a greater delay when handling low-speed traffic; refer to Table 7-8.)

Assuming an extension circuitry delay overhead at each end of about 25 ns, about 2.2 us (2.8 us −610 ns −50 ns) is available for low-speed extension signaling (one way). This implies a maximum cable length of about 1450 ft (440 m), assuming a nominal cable velocity of propagation of 0.67 ft/ns (0.2 m/ns).

Achieving such lengthy extension in practice may require particular attention in the implementation to issues such as noise, jitter and signal rise-time degradation with regard to the extension signaling techniques utilized. Generally speaking however, since the low-speed-only extension may be both eight times longer and eight times slower than a full-and-low-speed extension, the signaling circuitry complexity and signaling reliability may be comparable.

3.13.5 No Far-End Embedded Hub

Although it would be desirable to be able to embed a hub at the far end of the low-speed-only extension, such cannot be done since all hubs themselves function as full-speed devices.

3.13.6 Near-End Embedded Hub

However, since the information rate across the extension to support a low-speed device is one-eighth that of the general case (where both full- and low-speed traffic are handled) as discussed previously, it may be possible to communicate the equivalent of a number of low-speed extensions' worth of traffic using signaling media of the same or similar bandwidth as applicable in the case of the full-and-low-speed extension.

In one implementation a hub may be embedded in the near-end unit, logically upstream of the extension. The hub may produce a number (e.g., four) of downstream ports, each one of which the near-end logic connects to.

Figure 22:
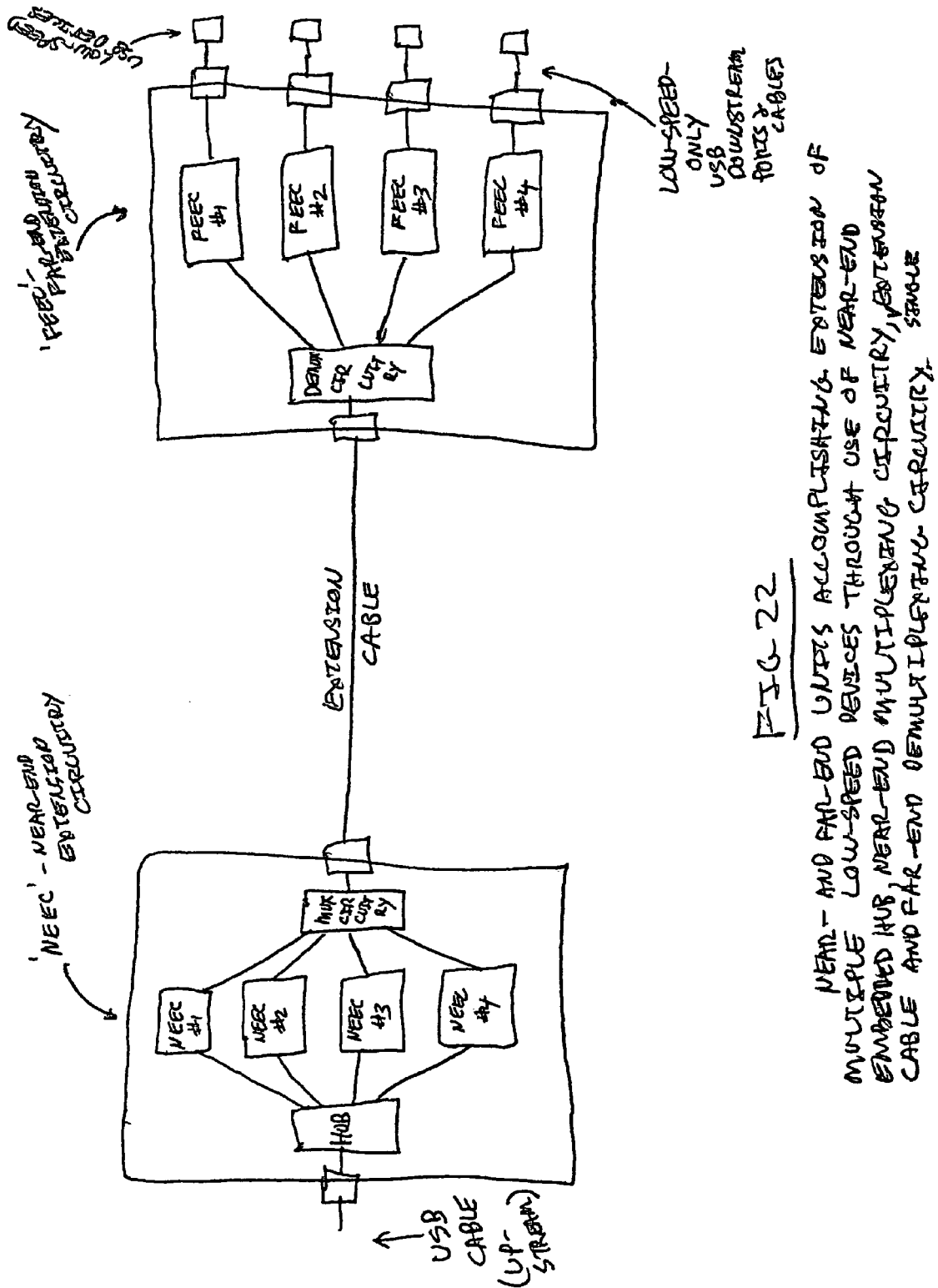
FIG. 22 is a block diagram showing a system elaborating on that of FIG. 5, in which near-end and far-end units accomplish extension of multiple low speed devices though use of a near-end embedded hub, near-end multiplexing circuitry, single extension cable and far-end demultiplexing circuitry.

Each downstream port of the hub sees what looks to it like a direct (albeit low-speed-only) extended connection to the far-end, where a low-speed device can be connected at a corresponding downstream port of the far-end unit. From the point of view of the hub, each Hub port, its apparent extension means and its corresponding far-end port, are logically separate and isolated from the other ports and apparent extension means 3.13.7 Multiplexing Multiple Low-Speed Paths Essentially separate and distinct extension means (including cabling) may in fact be used in the implementation, although with circuitry housed together perhaps at the near and far ends. Alternatively, the transmission of information relating to the several hub ports may be accomplished using a multiplexing technique, wherein the available overall extension bandwidth is shared to accommodate the requirements of the aggregate signaling to be accomplished. Refer to FIG. 22.

In order to achieve great distance extension while simultaneously supporting a large bandwidth (as would be the case when implementing multiplexing), particular attention may be required in the implementation to issues such as noise, jitter and signal rise-time degradation with regard to the extension signaling techniques utilized. These issues imply that use of fiber optic signaling may be most cost-effective in multiplexing implementations (likely also in the case of low-speed extensions where multiplexing is not utilized).

3.13.8 Topology Enforcement

Implementations incorporating TEHubs in conjunction with low-speed-only extension paths may be possible, but may be non-optimally cost-effective. This is due in part to the possible increased implementation complexity related to the low-speed signaling issues discussed previously. Additionally, topology enforcement, although important in business and home-use environments, may be of more questionable cost-benefit in industrial and commercial situations.

3.14 EXAMPLE IMPLEMENTATION

Figure 23:
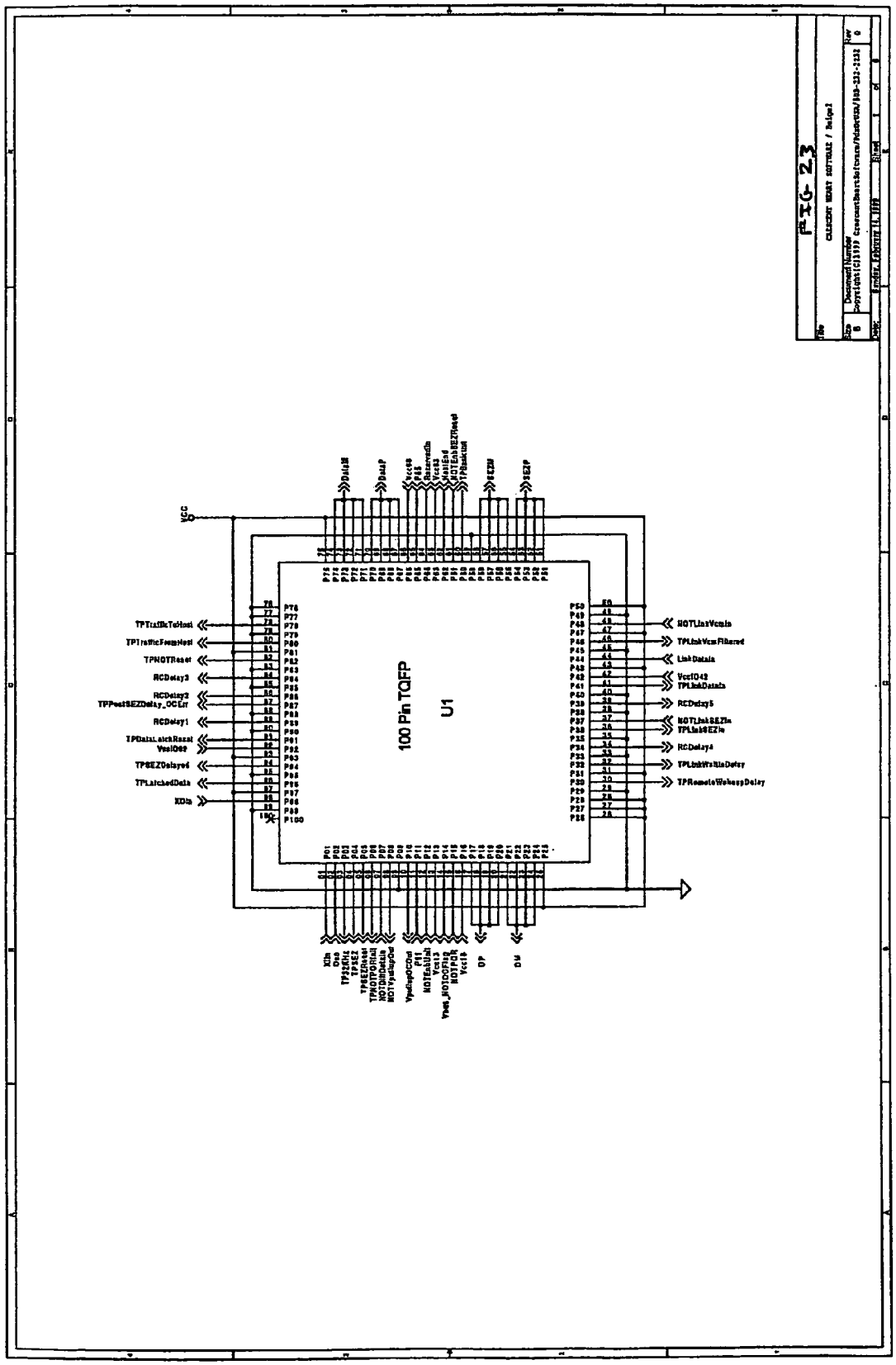
FIG. 23 is a schematic symbol and connection diagram of an FPGA circuit for a combined near-end/far-end communications extender circuit as an example embodiment of FIG. 6, showing pin signal names.
Figure 24:
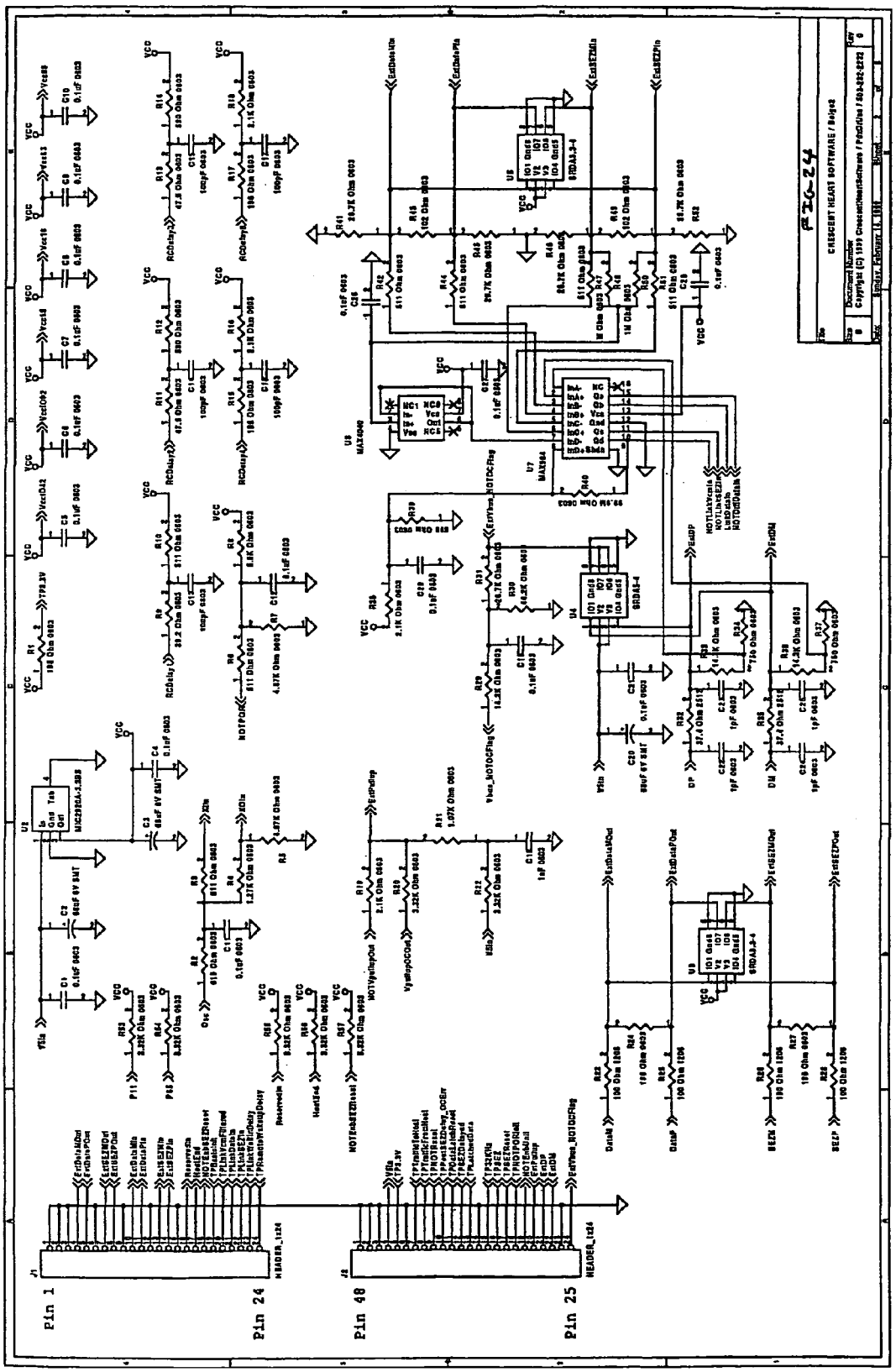
FIG. 24 is a circuit diagram showing an example of the circuitry used in conjunction with the FPGA of FIG. 23 to implement a near-end/far-end extender module.
Figure 25:
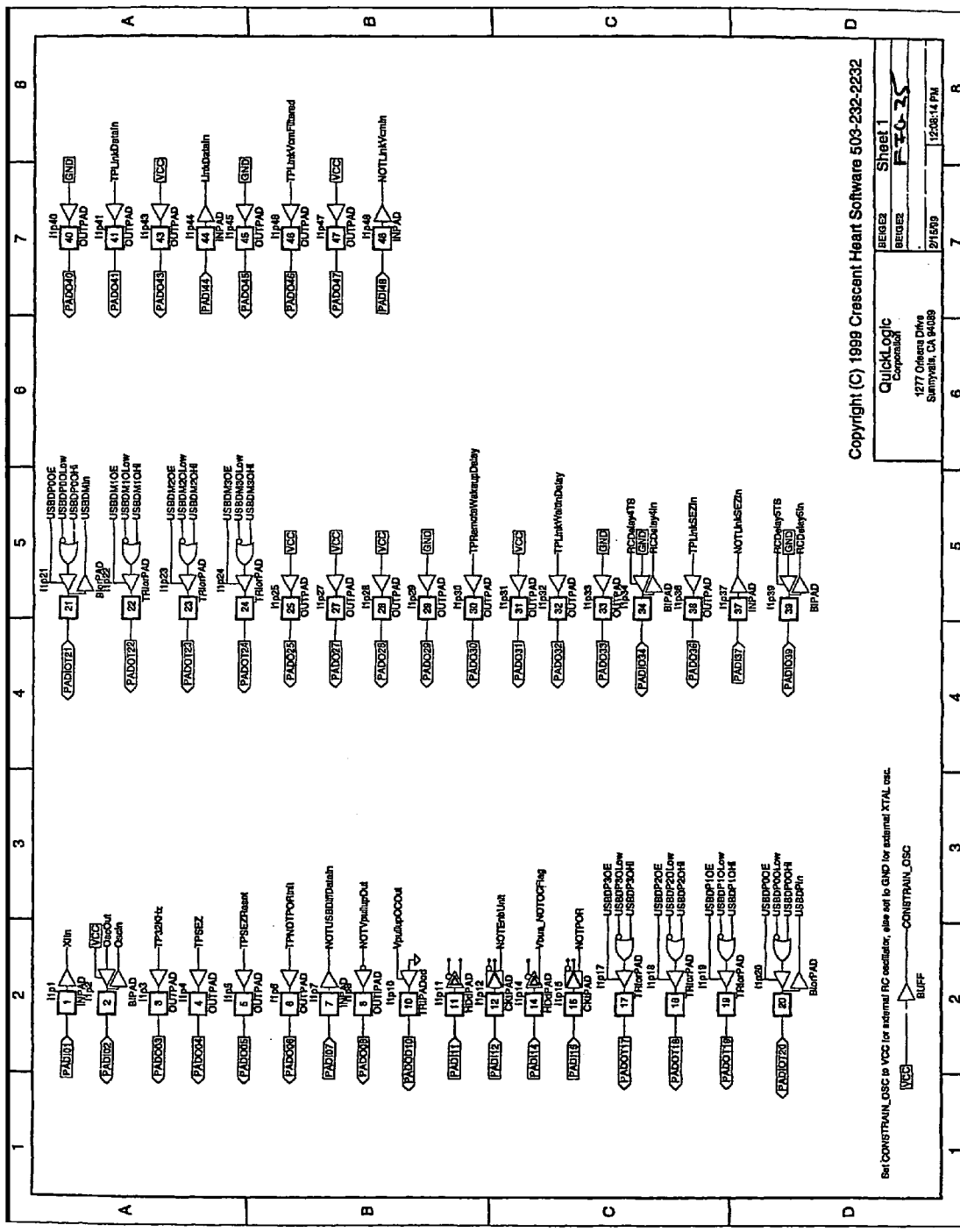
FIGS. 25-33 are circuit diagrams showing an example of the circuitry used to implement the circuit of FIG. 23.
Figure 26:
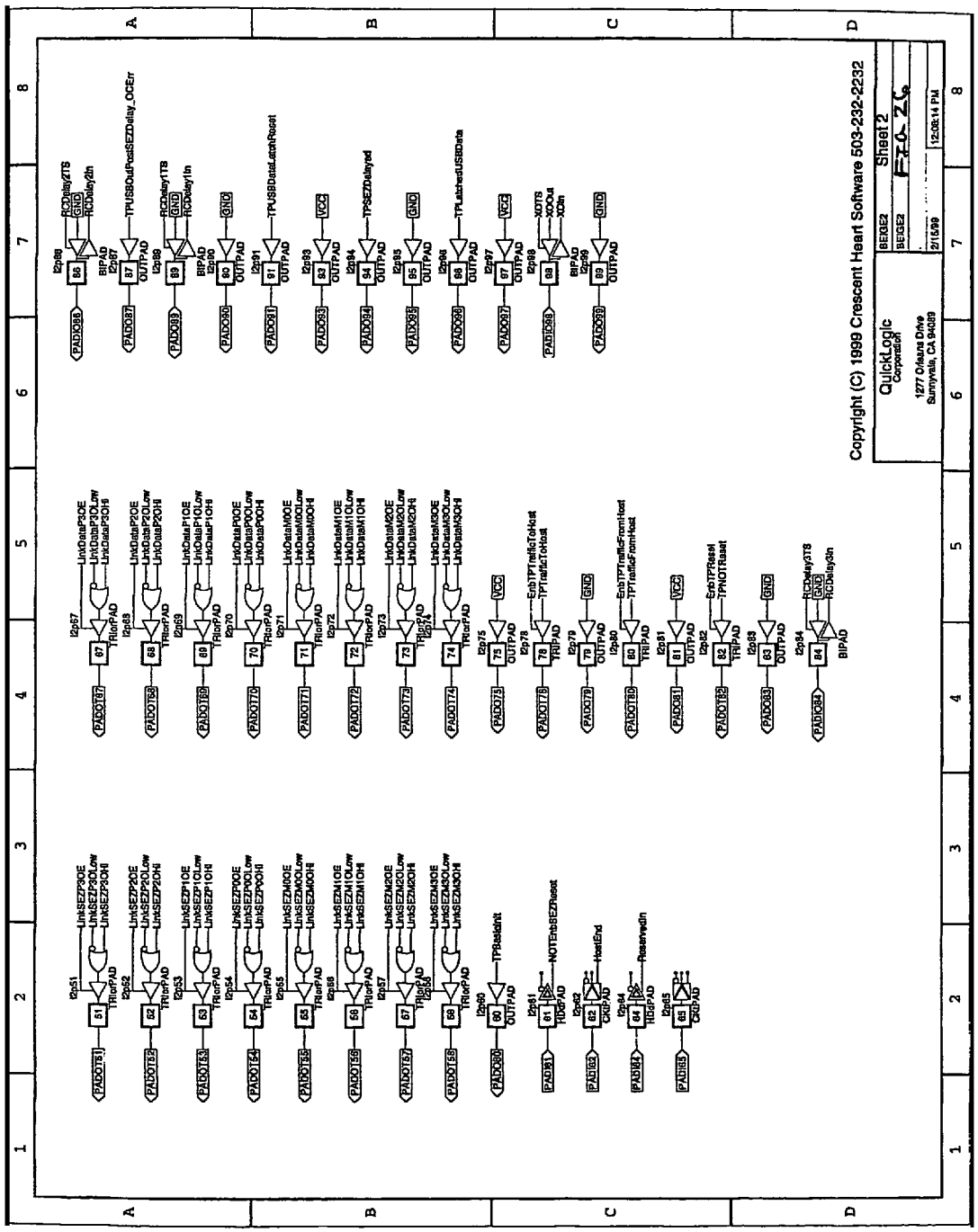
Figure 27:
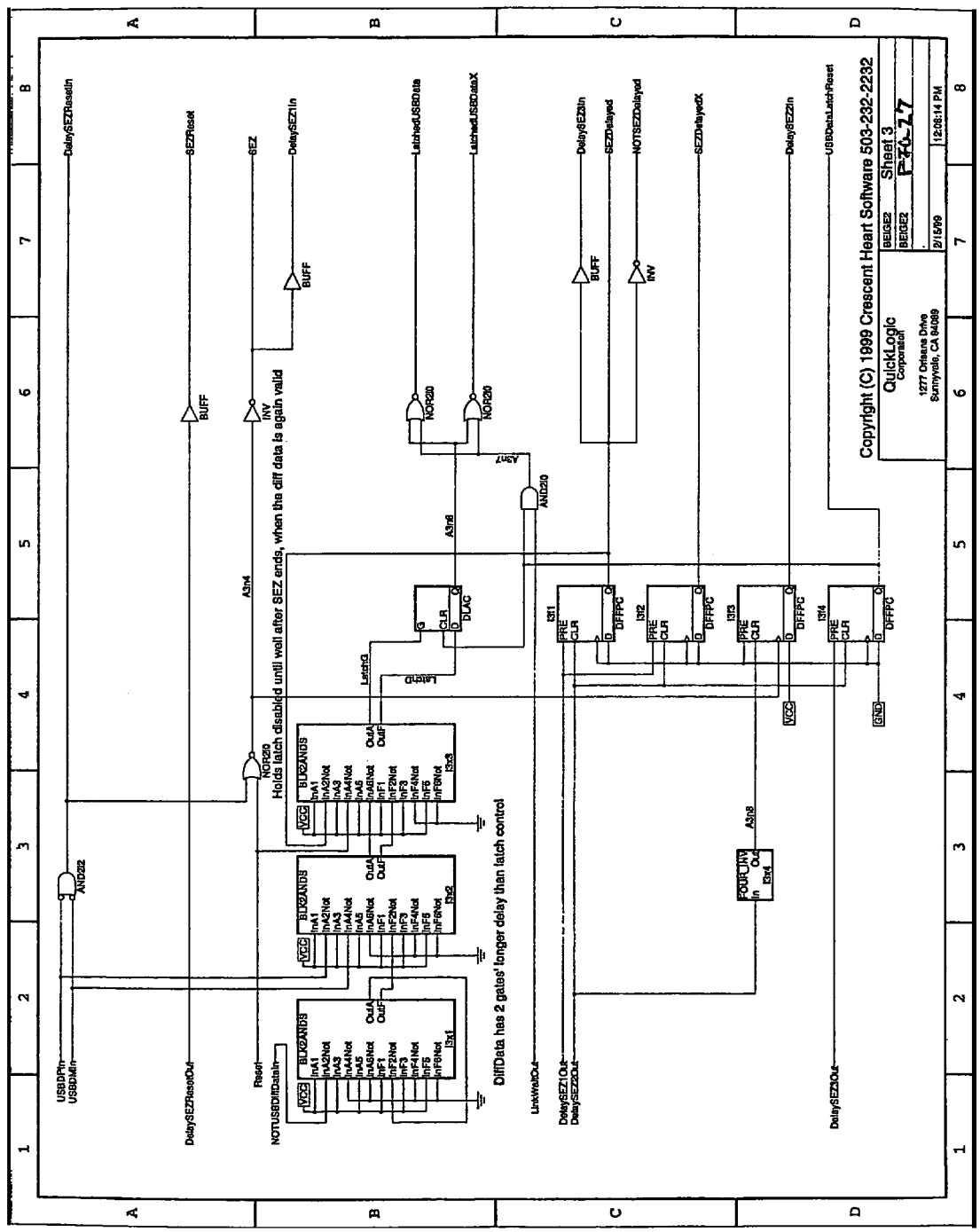
Figure 28:
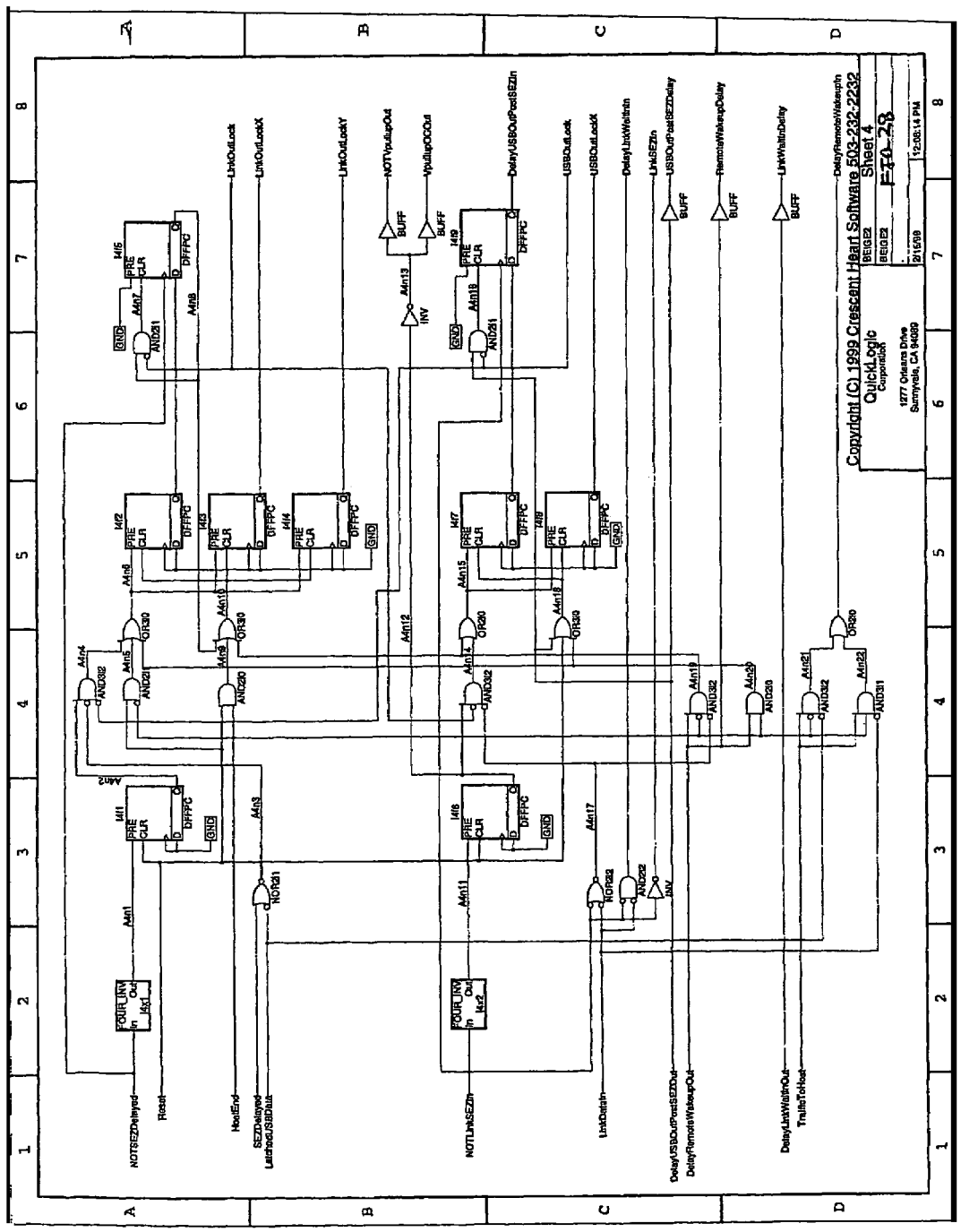
Figure 29:
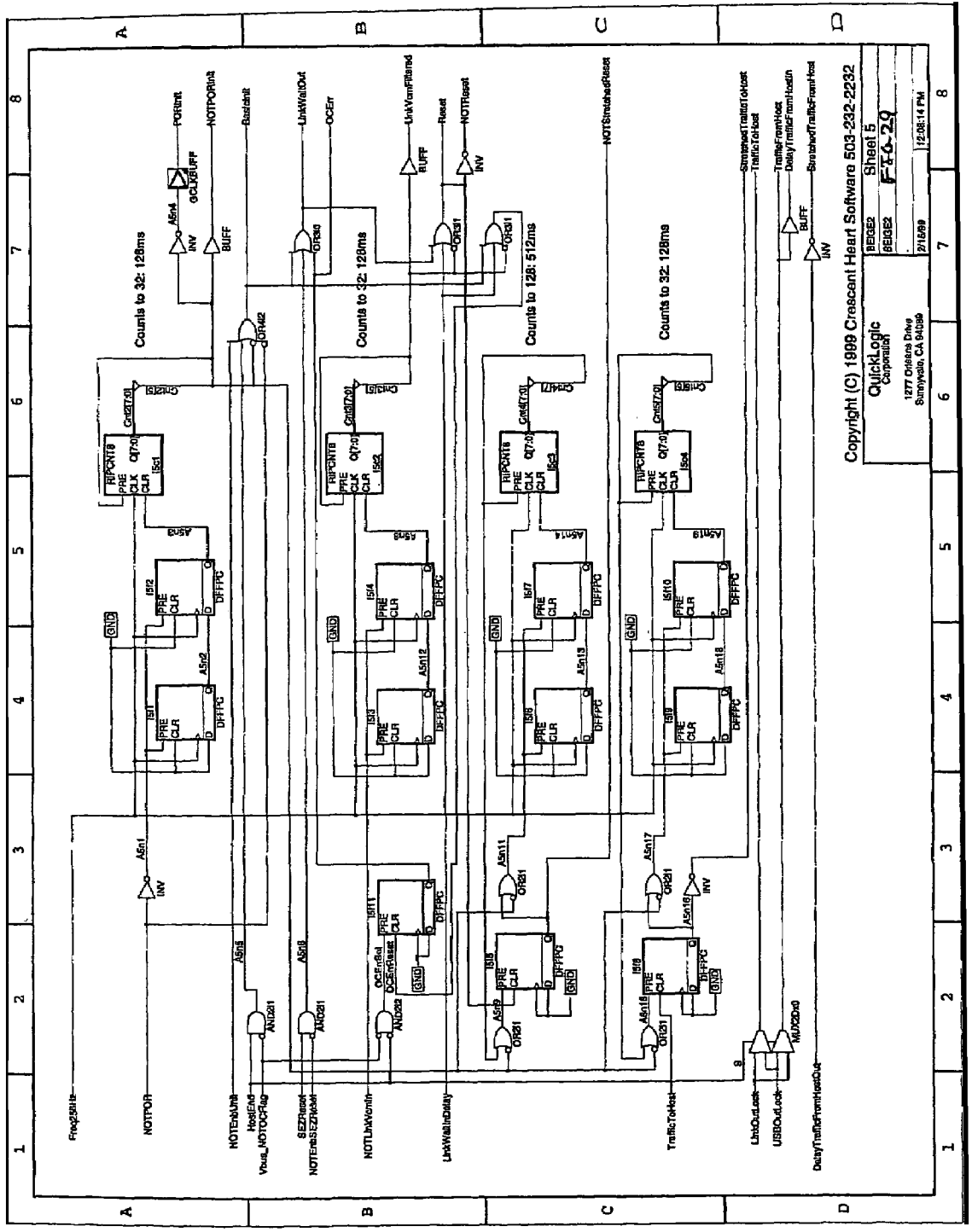
Figure 30:
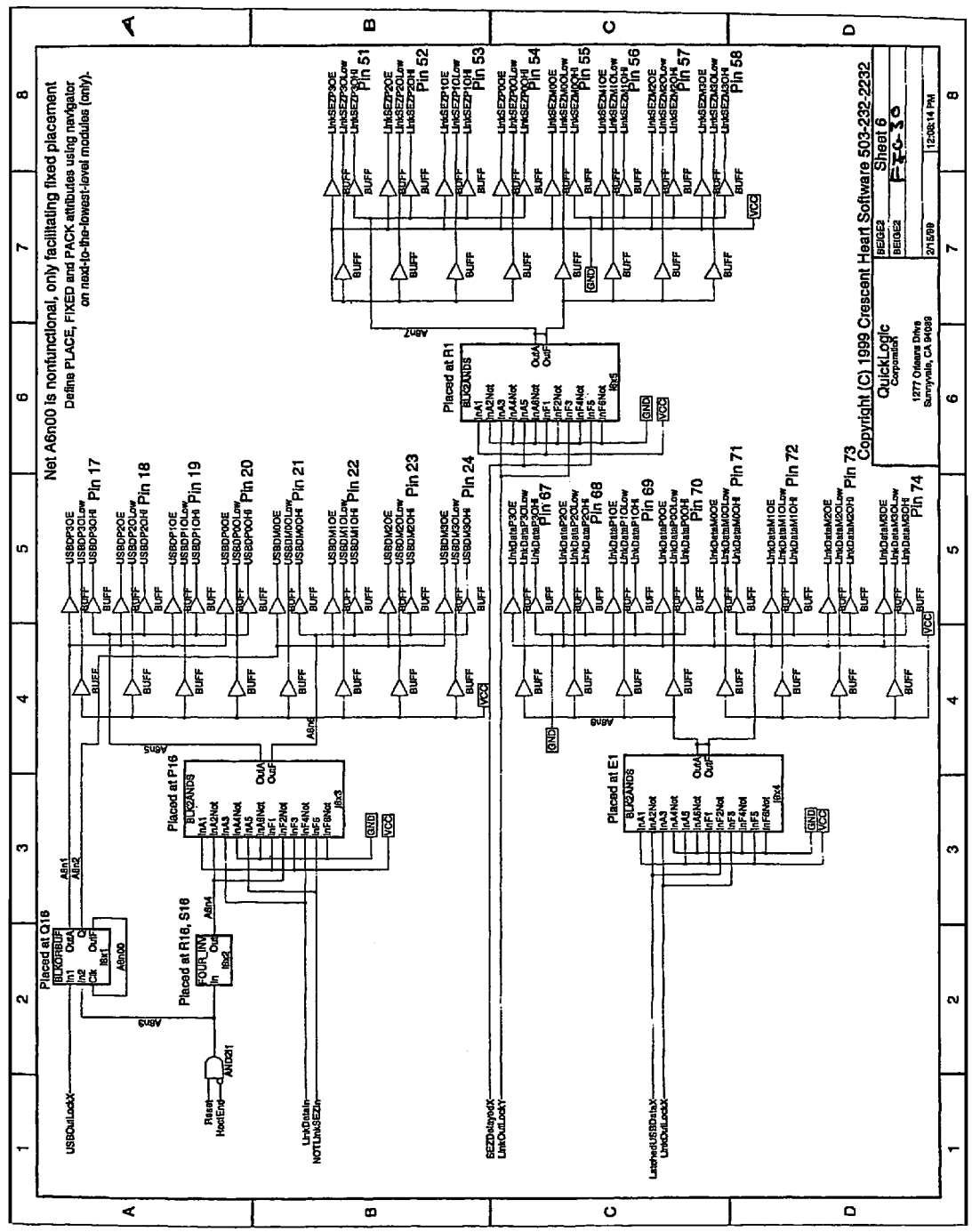
Figure 31:
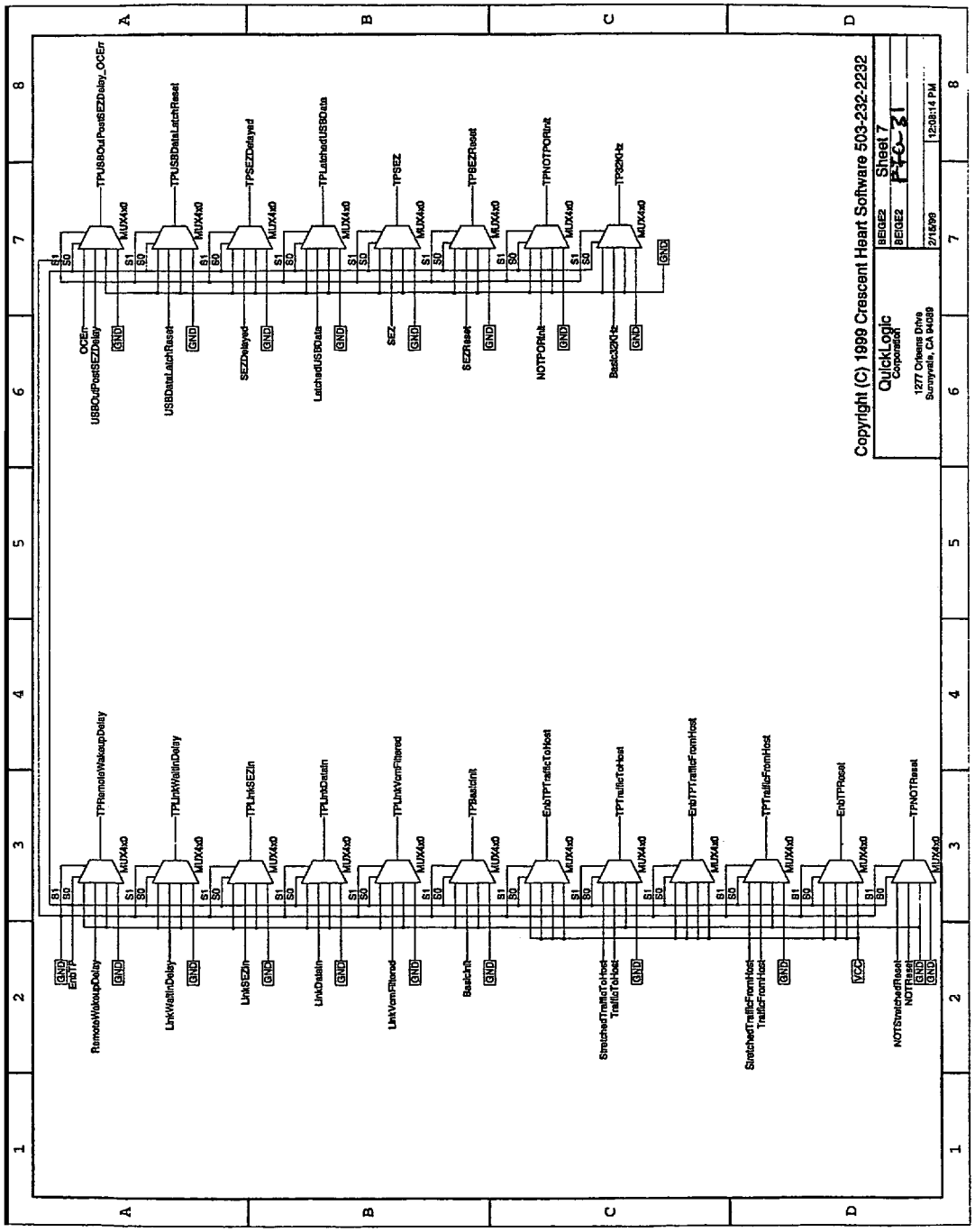
Figure 32:
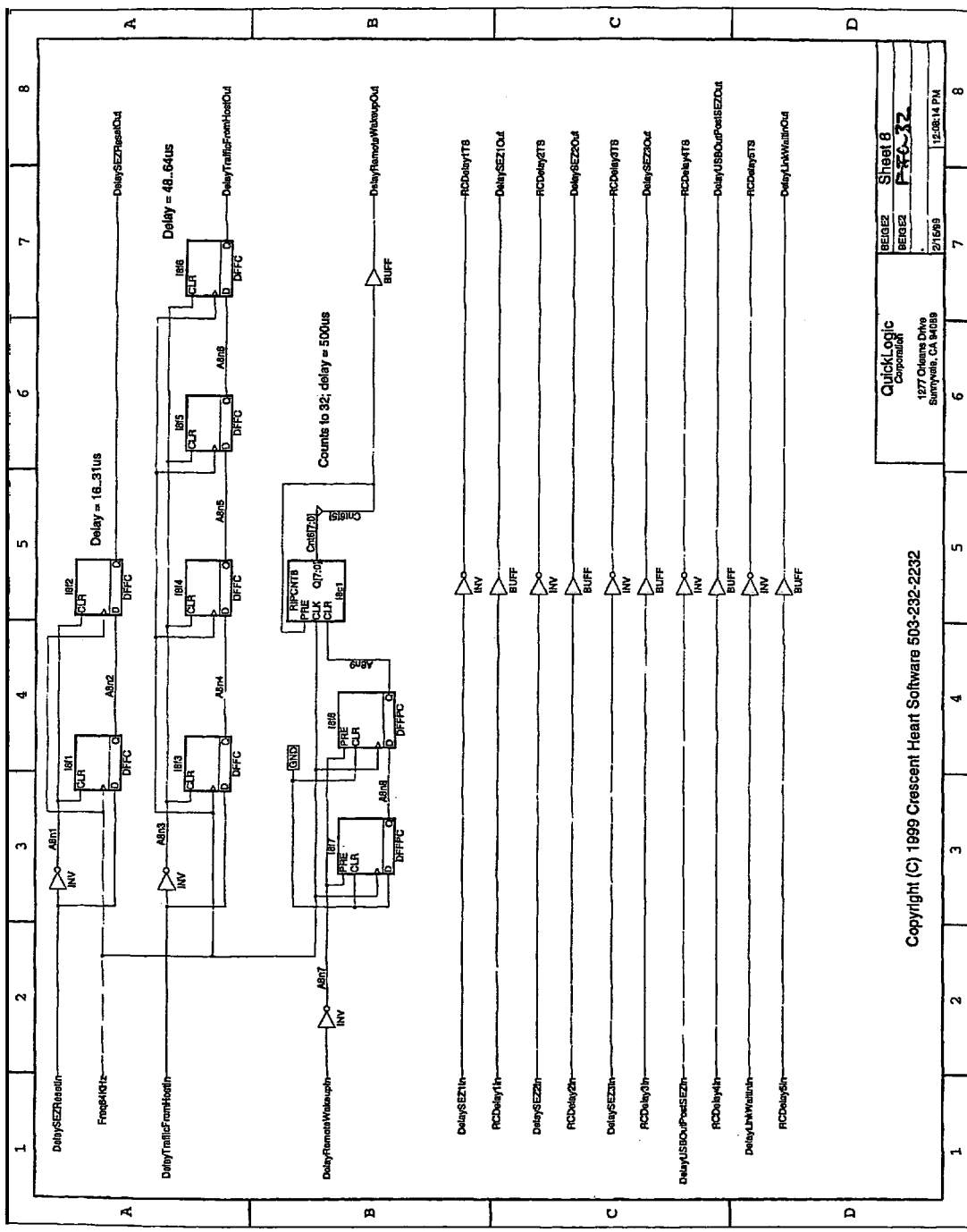
Figure 33:
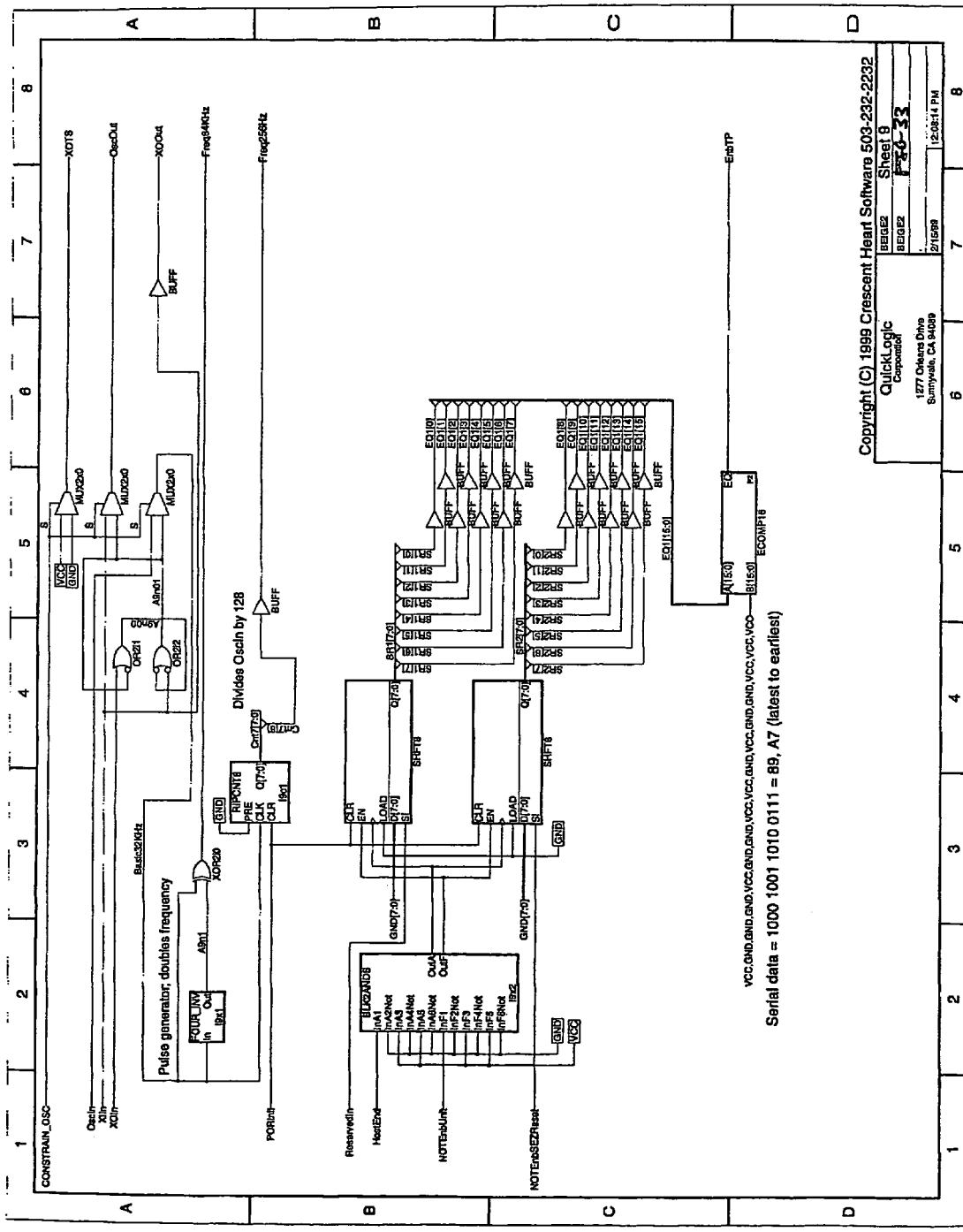

The schematic diagram for a quad-simplex type long-haul extension unit is shown in FIGS. 23 and 24. The unit is a module which is intended to be designed into a USB product to handle all extension-related signaling. The same module is used to implement both the near-end and far-end extension logic, as controlled by an input signal (HostEnd).

In this example implementation most of the circuitry is implemented using an FPGA. The top-level schematic diagram for the FPGA circuitry is shown in FIGS. 25 through 33.

Figure 34:
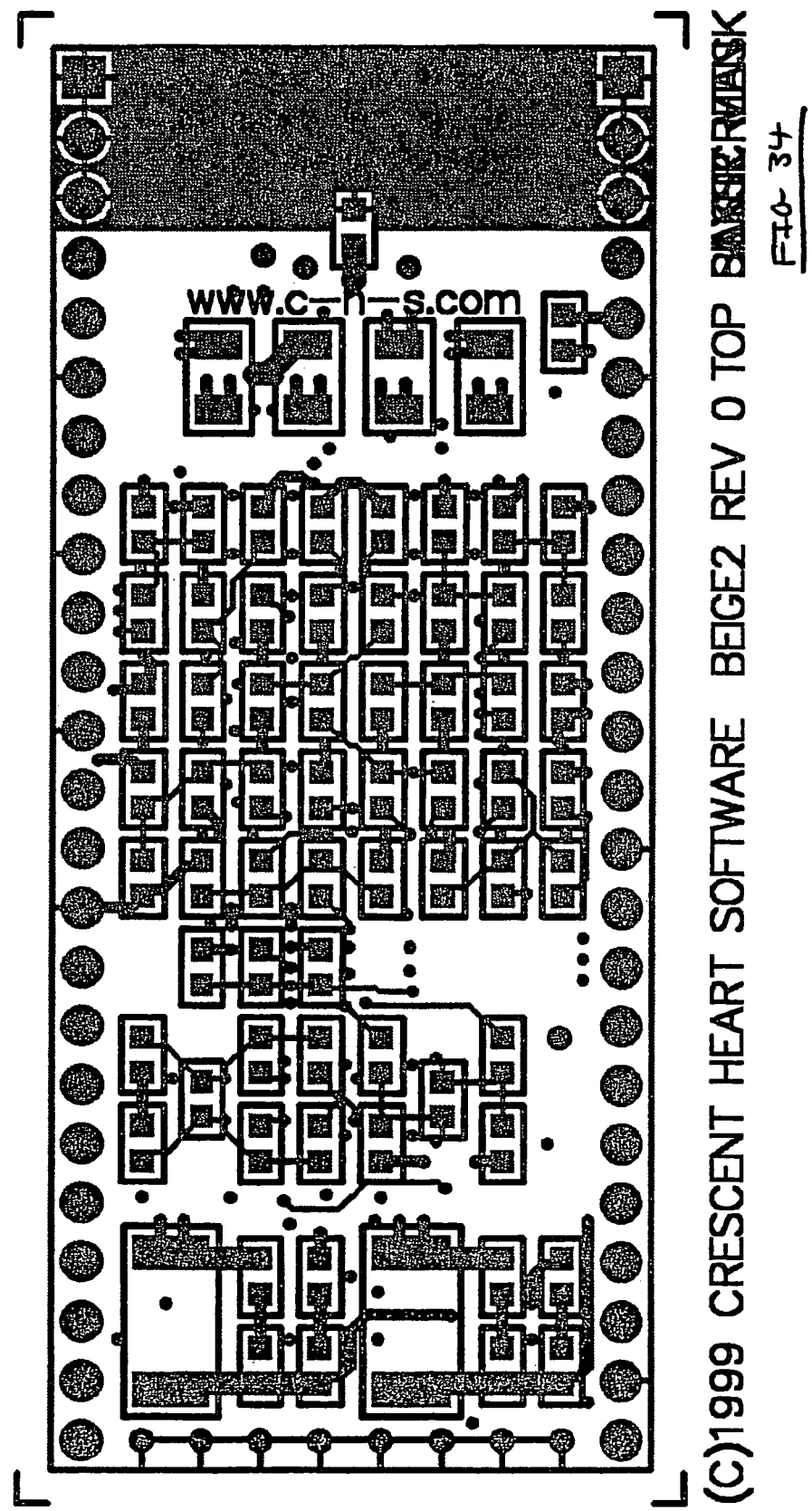
FIGS. 34 and 35 are top and bottom layout diagrams for a printed circuit board for the extender module of FIG. 24.
Figure 35:
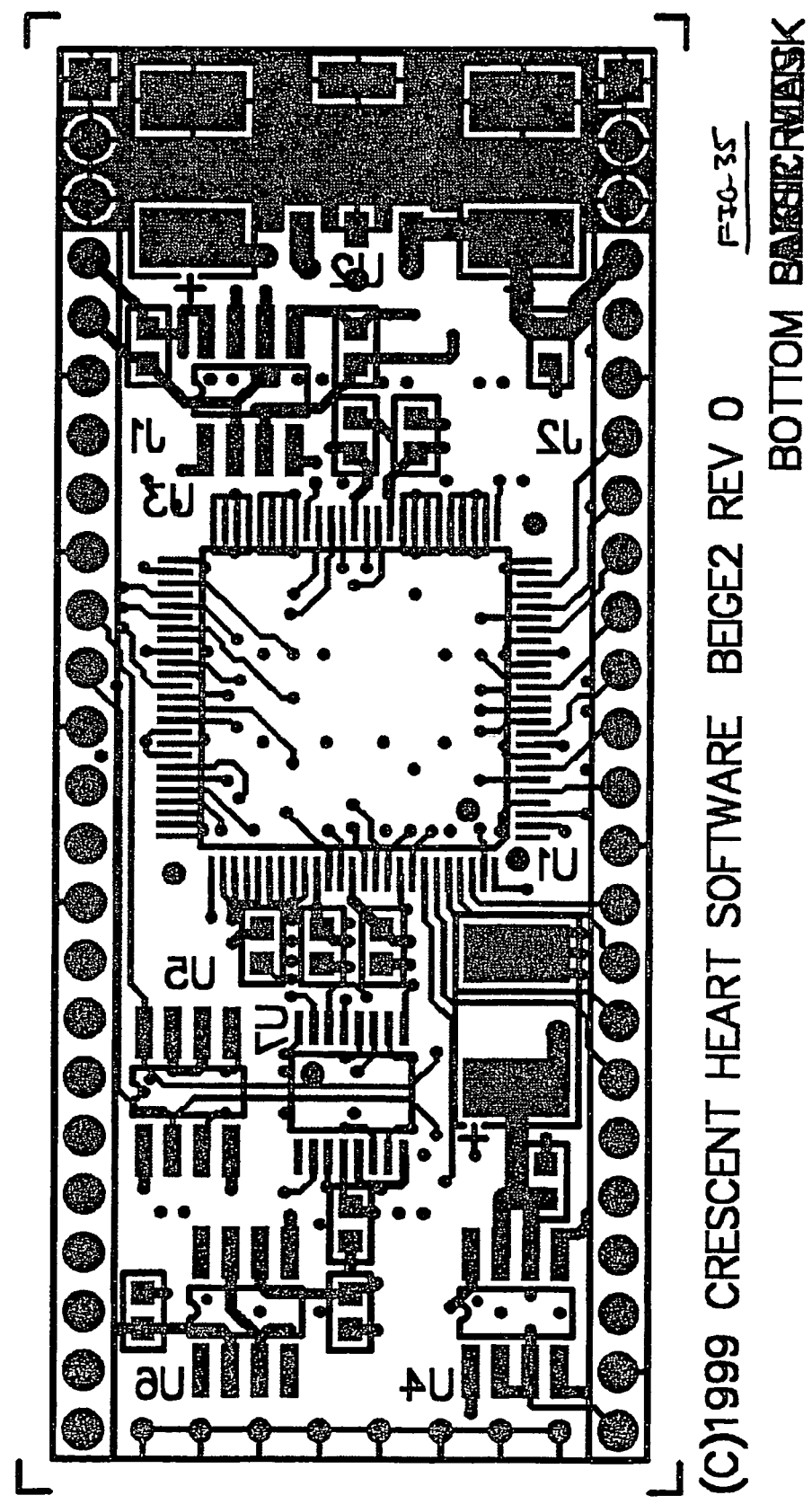

The top and bottom layers of an example PCB layout are shown in FIGS. 34 and 35.

Figure 36:
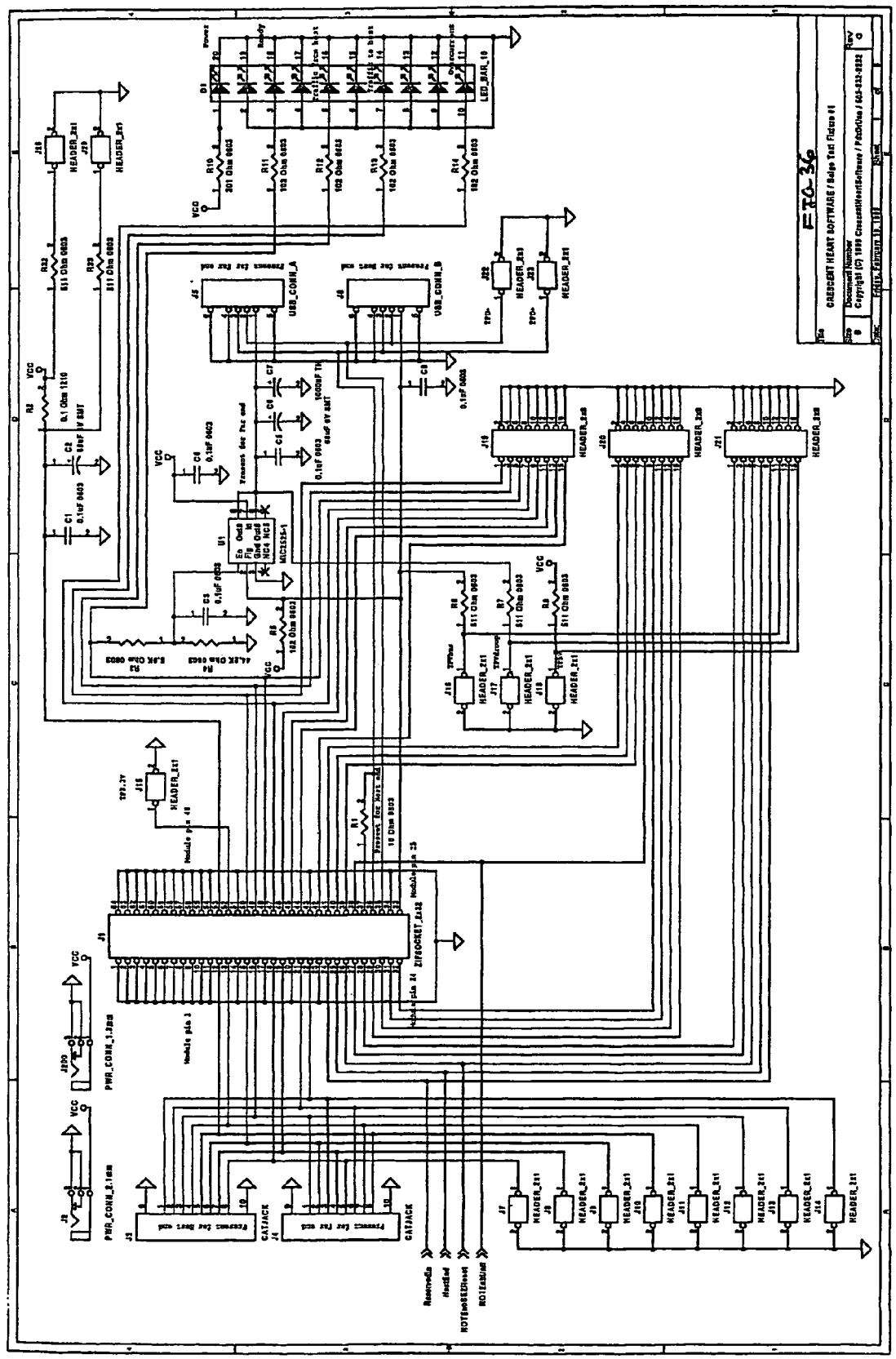
FIGS. 36 and 37 are schematics for test a fixture for testing the module formed by the circuits of FIGS. 23-33.
Figure 37:
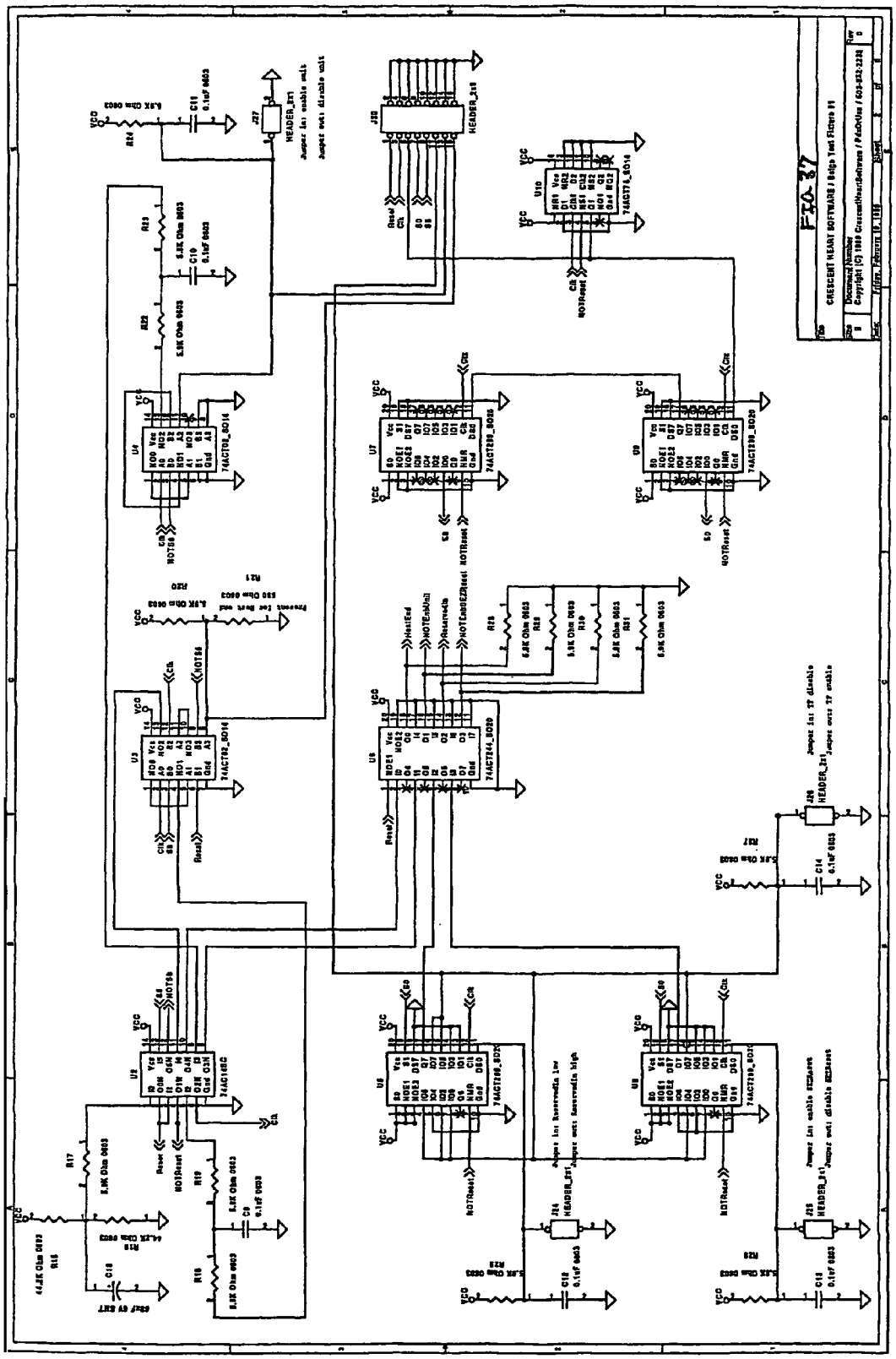

The schematic diagram for an example test fixture for the module is shown in FIGS. 36 and 37. The test fixture utilizes standard LAN CAT 5 shielded twisted-pair cable for connection between the near- and far-end units. Power is not communicated over the cable.

4. META-TIMEOUT EXTENSION

Figure 38:
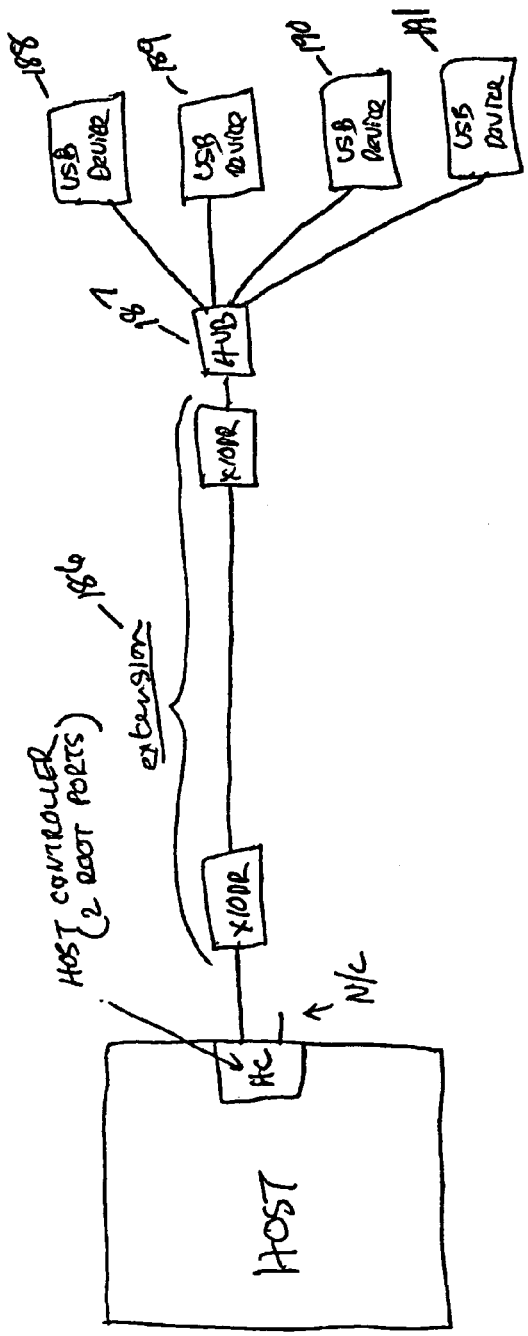
FIG. 38 illustrates a connection topology wherein all USB devices are resident on the extension.
Figure 39:
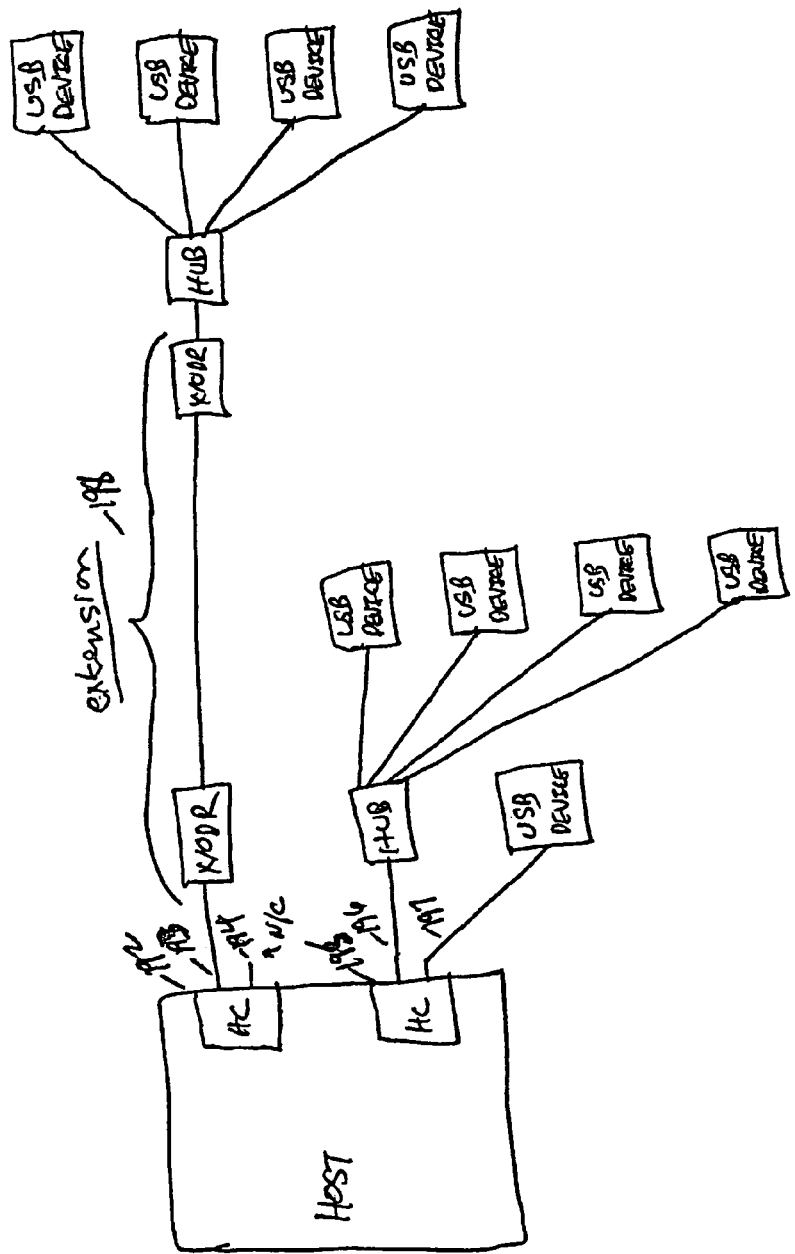
FIG. 39 illustrates a connection topology wherein all USB devices are not resident on the extension, with the extension connected to a dedicated USB system host controller.
Figure 40:
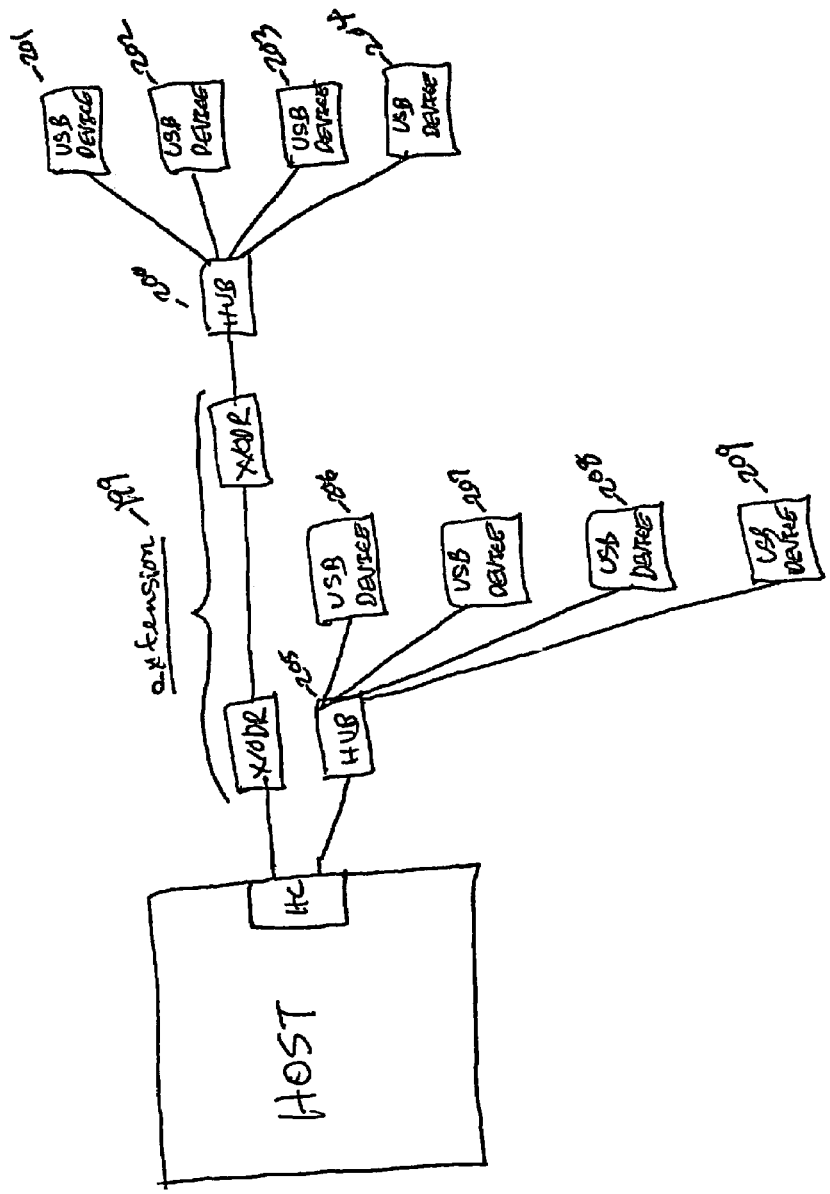
FIG. 40 illustrates a connection topology wherein all USB devices are not resident on the extension, with the extension connected to a non-dedicated USB system host controller.

This section describes means of increasing the maximum distance over which long-haul extension may be accomplished, based on allowing information exchange between the host and extended devices to take longer than the nominal timeout period, with reference to accompanying FIGS. 38 through 40.

The timeout period is circumvented by explicit utilization of the retry mechanism of the host in the case of non-isochronous transactions, and by the effective retry afforded by the continual re-request and retransmission of information in the case of isochronous transactions.

4.1 LONG-HAUL DISTANCE LIMITATION

The previously discussed long-haul extension approach provides for a maximum distance extension of the USB as determined by the USB specification allowance for the maximum propagation delay through a string of hubs of maximum depth.

The distance limitation arises because of the perceived need to ensure that any response sent back to the host from the far-end device must arrive at the host before the host times out. Otherwise, the host will ignore any later-returning response (additionally, such a late response could interfere with the transmission by the host of some later, unrelated packet). The host will generally retry the transmission later. Such a scenario would be repeated until after the third attempt, when the host would give up further attempts, and decide that communication is not possible with the device.

Note that non-isochronous transactions are retried; isochronous transactions are not retried, but are continually repeated.

4.2 SOLUTION IDENTIFIED

An improvement in the manner in which long-haul extension is carried out may be made by allowing information returned to the host to take longer in arriving back at the host than the nominal timeout period (such an approach may be termed a "meta-timeout" approach). Although such information will be available too late to satisfy the host's request, the information can be saved for reuse later. When the host retries the information request, the saved information can then be provided to the host in a timely manner.

4.3 REVIEW OF TRANSACTIONS SIGNALING

Presented here is a review of the information signaling associated with various types of transactions that may be encountered in the course of host-device communication.

4.3.1 Isochronous Output

The host first issues an OUT packet in which the Address and Endpoint to be communicated with are identified. A DATA0 packet follows, containing the data to be communicated. The addressed unit does not issue a handshake response, and the host expects to receive none.

4.3.2 Non-Isochronous Output

The host first issues a SETUP or an OUT packet in which the Address and Endpoint to be communicated with are identified. A DATA0 or DATA1 packet follows, containing the data to be communicated. The addressed unit issues an ACK, NAK or STALL handshake in response, which the host expects to receive back within the nominal timeout period (16-18 bit times following the end of the EOP of the DATA packet).

4.3.3 Isochronous Input

The host first issues an IN packet in which the Address and Endpoint to be communicated with are identified. The addressed unit responds with a DATA0 packet, which the host expects to receive back within the nominal timeout period. The host does not issue a handshake response, and the addressed unit expects to receive none.

4.3.4 Non-Isochronous Input

The host first issues an IN packet in which the Address and Endpoint to be communicated with are identified. The addressed unit responds with a DATA0 or DATA1 packet, or a NAK or STALL handshake, which the host expects to receive back within the nominal timeout period. The host, upon receiving the DATA packet, issues an ACK handshake response, which the addressed unit expects to receive back (if it had issued a DATA packet) within the nominal timeout period.

4.3.5 Identifying Isochronous Transactions

Generally speaking, it is not necessarily obvious by inspection of the bus traffic whether a transaction is isochronous or not. It is the case that Endpoint 0 transactions are never isochronous. It is also true that low-speed transactions (for which host-issued packets have PRE token preambles) are never isochronous. The DATA packet of an isochronous transaction should be DATA0, but this may not be universally true. Data packets containing more than 64 bytes (excluding the CRC16 bytes) can occur only in the case of isochronous transactions.

4.3.6 Start of Frame

The SOF token, while not actually a transaction, is issued periodically (every millisecond) by the host, with no response generated, and none expected by the host.

4.4 SYSTEM TOPOLOGY

When the host attempts to communicate with a unit (device or hub) on a USB system, the request is transmitted throughout the entire USB system. The result is that an extension sees traffic which relates not only to devices located on the extension, but also traffic (i.e., requests) which relates to devices elsewhere in the USB system (i.e., not located over the extension).

Extension utilizing the meta-timeout approach for this general case will be considered later, with the handling of a more restricted topology considered first.

4.4.1 Only Extended Units' Traffic on the Extension

The case considered initially is that wherein all units whose bus traffic is communicated over the extension, are themselves extended (that is, located on the far end of the extension).

One principal example of such a system is where all units (187, 188, 189, 190, 191) in fact do reside on the extension (186). Refer to FIG. 38. Such systems may find practical application, but note that in many systems certain devices (such as the keyboard and mouse) must remain local to the host.

Another system configuration with the same topological constraint can be implemented when multiple, separate USB systems are provided (e.g., through the use of PCI-card-based host controllers (192, 195), each authoring its own USB system, with (e.g.) two root hub ports (193, 194, 196, 197) each). Each extension (198) is connected to its own USB system (192) via one root port (193), with the other root port(s) (194) of that particular USB system left unconnected. Refer to FIG. 39.

Discussed now are the actions taken by the extension means to facilitate communication under the meta-timeout approach. Assumed in the discussion is the ability of the extension means to differentiate isochronous versus non-isochronous transactions, which may be accomplished in a manner described later.

4.4.1.1 Isochronous Output—

The host first issues an OUT packet in which the Address and Endpoint to be communicated with are identified. The near-end extension logic recognizes this as the first packet of an isochronous transaction, and passes it along the extension to the far-end extension logic. That logic in turn passes the packet out to the extended units (hubs and devices resident at the far-end of the extension).

Following the OUT, the host issues a DATA0 packet, containing the data to be communicated. This packet is also passed along the extension by the near-end logic, and out to the extended units by the far-end logic.

4.4.1.1.1 Summary—

The isochronous output transaction packets are passed along the extension in the same manner as described previously for the non-meta-timeout long-haul approach.

4.4.1.2 Non-Isochronous Output—

4.4.1.2.1 Initial Attempt—

The host first issues a SETUP or an OUT packet in which the Address and Endpoint to be communicated with are identified. The near-end extension logic recognizes this as the first packet of a non-isochronous transaction, and passes it along the extension to the far-end extension logic. That logic in turn passes the packet out to the extended units.

Following the SETUP or OUT, the host issues a DATA0 or DATA1 packet, containing the data to be communicated. This packet is also passed along the extension by the near-end logic, and out to the extended units by the far-end logic.

The addressed unit issues an ACK, NAK or STALL (or no) handshake packet. The far-end logic waits a period of time following the end of the DATA packet (e.g., 7.5 bit times; refer to Section 7.1.18) to determine whether a handshake response has been issued by the addressed unit. When a response has been received (or when no response has been received within the period of time allotted), the far-end logic then communicates an indication of whether a handshake response has been received, as well as the type of the response, to the near-end logic.

The near-end logic waits for a portion of the 16 bit-time timeout period (refer to Section 7.1.19) following the end of the DATA packet to see if an early-arriving handshake response may be present. (Such an early response may occur for example if the addressed unit responds significantly more quickly than the maximum 7.5 bit times allowed.) If a response is seen within (e.g.) 15.5 bit times, the response is passed along into the host; the transaction has then been handled per the usual protocol sequence, and the extension logic's involvement has then ended.

If no indication of an early-arriving handshake response is seen by the near-end logic within the period of time, the near-end logic acts to ensure that any later-incoming response will be able to be communicated to it along the extension, and also acts to prevent the host from proceeding on in issuing some later (generally unrelated) outbound packet.

The near-end logic does this by sending a packet into the host, which is effectively a surrogate handshake response in place of any actual later-arriving response. The packet is not a handshake or other standard packet, but is a packet designed to be ignored by the host (a "garbage" packet, which can consist for example of K signaling followed by an EOP). The "information" portion (non-EOP part) of the packet is signaled until an indication of the receipt of the actual response has been communicated by the far-end logic. The near-end logic can signal the end (EOP) portion of the garbage packet in a manner such that the transmission of the response by the addressed unit on the bus and over the extension has been completed before the host can possibly go on and issue a later outbound packet.

The near-end logic signals into the host for up to a maximum period of time; if no response is seen by the near-end logic, the garbage packet is ended (EOP produced) and the host is thereby allowed to continue on.

The near-end logic records whether a response was received in and notes the type of response received (ACK, NAK or STALL). The near-end logic also records information relating to the SETUP or OUT and DATA packets sent out by the host.

4.4.1.2.2 Later Re-Attempt—

The host, having received no valid handshake response, later re-attempts the transaction.

The host reissues the SETUP or OUT packet, followed by the DATA0 or DATA1 packet. The near-end logic recognizes this as a retransmission of the earlier transaction attempt, based on a comparison of the packets' PID, Address, Endpoint and data values with the previously-recorded information concerning the prior-attempted transaction.

If the near-end logic determines that no handshake response had been observed in association with the earlier attempt, the re-attempt is treated as if no earlier attempt had been made. For this re-attempt, any observed handshake response is again recorded by the near-end logic, along with the information communicated in the SETUP or OUT and DATA packets; another host attempt is expected to take place once again later.

If the near-end logic determines instead that a handshake response had been received back in association with the earlier attempt, the near-end logic provides that previously-observed handshake response to the host following the end of the DATA packet re-issuance.

The near-end logic also acts to prevent the re-attempted transaction from being acted upon by the addressed unit, so that the extension and bus remain free to transmit any following (generally unrelated) outbound packet issued by the host. (Any returning handshake response by the addressed unit in association with the re-attempted transaction could interfere with such a subsequent host transmission.)

The near-end unit does this by corrupting the DATA packet (or the SETUP or OUT packet and the DATA packet). (This can be accomplished for instance by extending the pre-EOP portion of the packet by use of a constant J or K signaling level, long enough to ensure a stuff-bit error will result, with an EOP ending the packet.) Note that the corruption is carried out in such a manner that the near-end logic is not prevented from being able to properly evaluate the packets' contents.

The far-end logic passes the packet information out to the extended devices. Recognizing the corrupted packet(s), the far-end logic expects no handshake response in from the addressed unit.

4.4.1.2.3 Summary—

If the addressed unit responds to the SETUP or OUT and DATA packets within the response time-limit, the transaction is handled as usual.

Otherwise, the near-end logic prevents the host from proceeding on and in so doing also allows a late response to be signaled by the addressed unit, by providing the host with a garbage response packet. The logic makes note of the late-arriving response, as well as the particulars of the original request packets.

When the host re-attempts the transaction, the near-end logic recognizes the re-attempt, by matching against the previously-recorded packet information. The near-end logic provides the handshake response as was originally signaled by the addressed unit. The near-end logic also prevents the re-attempted transaction from being acted upon by corrupting the packet(s) as they are sent down the extension.

4.4.1.3 Isochronous Input—

4.4.1.3.1 Initial Request—

The host first issues an IN packet in which the Address and Endpoint to be communicated with are identified. The near-end extension logic recognizes this as the start of an isochronous transaction, and passes it along the extension to the far-end extension logic. That logic in turn passes the packet out to the extended units.

The addressed unit responds with a DATA0 (or with possibly no) packet. The far-end logic waits a period of time following the end of the IN packet (e.g., 7.5 bit times) to determine whether a DATA response has been issued by the addressed unit. The response received (if any, within the period of time allotted) is communicated along the extension to the near-end logic.

The near-end logic waits for a portion of the 16 bit-time timeout period following the end of the IN packet to see if an early-arriving DATA response may be present. If a response is seen within (e.g.) 15.5 bit times, the response is passed along into the host; the transaction has then been handled per the usual protocol sequence, and the extension logic's involvement has then ended.

If no indication of an early-arriving DATA response is seen by the near-end logic within the period of time, the near-end logic acts to ensure that any later-incoming DATA response will be able to be communicated to it along the extension, and also acts to prevent the host from proceeding on in issuing some later (generally unrelated) outbound packet.

The near-end logic does this by sending a packet into the host, which is effectively a surrogate DATA response in place of any actual later-arriving response. The packet is a garbage packet (as described earlier). The "information" portion (non-EOP part) of the packet is signaled until the end of the incoming DATA response is seen, at which point the EOP portion of the garbage packet is signaled.

The near-end logic signals, into the host for up to a maximum period of time; in the case no DATA response is seen by the near-end logic, the garbage packet is ended (EOP produced) and the host is thereby allowed to continue on.

The near-end logic records whether a DATA response was received, as well as the PID and data of the DATA packet received in. The near-end logic also records information relating to the Address and Endpoint values of the IN packet originally sent out by the host.

4.4.1.3.2 Subsequent Requests

The host, although having received no valid DATA response, does not re-attempt the transaction. The host does, however, issue the next isochronous input transaction request for that Address and Endpoint in the following frame.

The host at that time again issues an IN packet. The near-end logic recognizes this as a subsequent, similar isochronous request, based on a comparison of the packet's Address and Endpoint values with the previously-recorded information concerning the prior transaction.

If the near-end logic determines that no DATA response had been observed in association with the earlier request, this following request is treated in the same manner as the earlier request. For this request, any observed DATA response is again recorded by the near-end logic, along with the information communicated in the IN packet.

If the near-end logic determines instead that a DATA response had been received back in association with the earlier request, the near-end logic provides that previously-observed DATA response to the host following the end of the IN packet.

The far-end logic passes the IN packet out to the extended devices. The addressed unit responds with a DATA packet (or with no packet). The response is not passed into the host at this time (as the prior frame's saved DATA response is being returned to the host), but is saved for use at the time of the next request.

Note that each request's IN packet is passed along the extension each time, in order that a new DATA packet be obtained on a regular basis. Note also that in general the prior DATA packet is passed into the host while the new DATA packet is being saved by the extension logic.

4.4.1.3.3 Summary—

If the addressed unit responds to the IN packet within the response time-limit, the transaction is handled as usual.

Otherwise, the near-end logic prevents the host from proceeding on and in so doing also allows a late response to be signaled by the addressed unit, by providing the host with a garbage response packet. The logic makes note of the late-arriving DATA response, as well as the particulars of the original request packet.

When the host attempts a similar isochronous transaction in the following frame, the near-end logic recognizes this as a following request by matching against the previously-recorded packet information. The near-end logic provides the DATA response as was originally signaled by the addressed unit.

The IN packet is sent out over the extension, and the addressed unit responds with a new DATA packet. This DATA response is saved by the extension logic for use the next time.

4.4.1.3.4 Data Response Timing Issues—

This method of handling isochronous input transactions results in data being returned to the host in every frame. This requires that the amount of time taken to provide the prior frame's data to the host be at least as long as the amount of time taken to receive the new frame's data from the device. Otherwise, once the DATA packet sent into the host is completed, the host can move on to issue later (generally unrelated) outbound packets, while the newly-incoming DATA packet is still underway. This can result in those outbound packets not being communicated over the extension.

It is generally the case that the length of time taken to communicate the response data may vary from frame to frame. This is because, even if the number of data bits returned is constant, the content of each frame's data will determine the extent of bit-stuffing required, which will in turn determine the length of time needed to transmit the data.

It is possible to have the prior frame's DATA packet take somewhat less time than the current frame's DATA packet and still not have following host outbound packets be interfered with. The fact, that a finite length of time is generally present between the end of one packet and the beginning of the next packet sent out by the host, can be of benefit here. The between-packets time for current host controller implementations is understood to be a minimum of 24 bit times. During such time following the return of the DATA packet in to the host and prior to the host issuing its next outbound packet, the current frame's DATA packet response can still be occurring without possibility of packet interference.

Furthermore, the extension logic can act in returning the prior frame's DATA packet in such a way as to cause the host to be delayed before proceeding to issue its next outbound packet. The extension logic can hold off the host by intentionally extending the duration of the EOP which ends the DATA packet. Since the USB specification does not provide that a lengthy SEZ be interpreted as a reset until its period is 2.5 us, the EOP can be made to be almost that long without problem. The EOP can likely be as long as 28 bit times.

By intentionally extending the duration of the DATA packet EOP and by utilizing the between-packets delay of the host controller, a time differential of as much as about 50 bit times may exist between the length of time of the prior frame's DATA packet and the current frame's DATA packet. That is, the transmission time for the data portion of the current frame's packet can be as much as 50 bit times longer than the transmission time for the data portion of the prior frame's packet.

This may be sufficient to allow certain isochronous input situations (i.e., those involving transfers of small amounts of data) to be carried out with data returned reliably to the host in every frame.

4.4.1.4 Alternate Isochronous Input Method—

An alternative means of handling isochronous input transactions is described now which allows for the length of time taken to communicate the response data to vary significantly for each DATA packet, with no possibility of interference occurring to later host-issued packets, for any size of data transfer. In this approach data is returned to the host every other frame.

4.4.1.4.1 Initial Attempt—

The host first issues an IN packet in which the Address and Endpoint to be communicated with are identified. The near-end extension logic recognizes this as the start of an isochronous transaction, and passes it along the extension to the far-end extension logic. That logic in turn passes the packet out to the extended units.

The addressed unit responds with a DATA0 (or with possibly no) packet. The far-end logic waits a period of time following the end of the IN packet (e.g., 7.5 bit times) to determine whether a DATA response has been issued by the addressed unit. The response received (if any, within the period of time allotted) is communicated along the extension to the near-end logic.

The near-end logic waits for a portion of the 16 bit-time timeout period following the end of the IN packet to see if an early-arriving DATA response may be present. If a response is seen within (e.g.) 15.5 bit times, the response is passed along into the host; the transaction has then been handled per the usual protocol sequence, and the extension logic's involvement has then ended.

If no indication of an early-arriving DATA response is seen by the near-end logic within the period of time, the near-end logic acts to ensure that any later-incoming DATA response will be able to be communicated to it along the extension, and also acts to prevent the host from proceeding on in issuing some later (generally unrelated) outbound packet.

The near-end logic does this by sending a packet into the host, which is effectively a surrogate DATA response in place of any actual later-arriving response. The packet is a garbage packet (as described earlier). The "information" portion (non-EOP part) of the packet is signaled until the end of the incoming DATA response is seen, at which point the EOP portion of the garbage packet is signaled.

The near-end logic signals into the host for up to a maximum period of time; in the case no DATA response is seen by the near-end logic, the garbage packet is ended (EOP produced) and the host is thereby allowed to continue on.

The near-end logic records whether a DATA response was received, as well as the PID and data of the DATA packet received in. The near-end logic also records information relating to the Address and Endpoint values of the IN packet originally sent out by the host.

4.4.1.4.2 Following Attempt—

The host, although having received no valid DATA response, does not re-attempt the transaction. The host does, however, issue the next isochronous input transaction request for that Address and Endpoint in the following frame.

The host at that time again issues an IN packet. The near-end logic recognizes this as a subsequent, similar isochronous request, based on a comparison of the packet's Address and Endpoint values with the previously-recorded information concerning the prior transaction.

If the near-end logic determines that no DATA response had been observed in association with the earlier request, this following request is treated in the same manner as the earlier request. For this request, any observed DATA response is again recorded by the near-end logic, along with the information communicated in the IN packet.

If the near-end logic determines instead that a DATA response had been received back in association with the earlier request, the near-end logic provides that previously-observed DATA response to the host following the end of the IN packet.

The near-end logic also acts to prevent the currently-issued IN packet from being acted upon by the addressed unit, so that the extension and bus remain free to transmit any following (generally unrelated) outbound packet issued by the host.

The near-end unit does this by corrupting the IN packet, as described previously. Note that the corruption is carried out in such a manner that the near-end logic is not prevented from being able to properly evaluate the packet's contents.

The far-end logic passes the corrupted IN packet out to the extended devices. Recognizing the corrupted packet, the far-end logic expects no DATA response in from the addressed unit.

The next similar isochronous input request in the next frame is then handled as described previously, wherein the DATA response is captured for presentation to the host in the following frame.

4.4.1.4.3 Summary—

If the addressed unit responds to the IN packet within the response time-limit, the transaction is handled as usual.

Otherwise, the near-end logic prevents the host from proceeding on and in so doing also allows a late response to be signaled by the addressed unit, by providing the host with a garbage response packet. The logic makes note of the late-arriving DATA response, as well as the particulars of the original request packet.

When the host attempts a similar isochronous transaction in the following frame, the near-end logic recognizes this as a following request by matching against the previously-recorded packet information. The near-end logic provides the DATA response as was originally signaled by the addressed unit. The near-end logic also prevents the later transaction request from being acted upon by corrupting the IN packet as it is sent down the extension.

Note in this approach that isochronous data is returned to the host only every other frame. This allows the length of time taken to communicate the response data to vary from frame to frame, without interference with later host-issued packets (refer to previous discussion).

4.4.1.5 Non-Isochronous Input—

4.4.1.5.1 Initial Attempt—

The host first issues an IN packet in which the Address and Endpoint to be communicated with are identified. The near-end extension logic recognizes this as the start of a non-isochronous transaction, and passes it along the extension to the far-end extension logic. That logic in turn passes the packet out to the extended units.

The addressed unit responds with a DATA0 or DATA1, or a NAK or STALL (or possibly no) packet. The far-end logic waits a period of time following the end of the IN packet (e.g., 7.5 bit times) to determine whether a response has been issued by the addressed unit. The response received (if any, within the period of time allotted) is communicated along the extension to the near-end logic.

The near-end logic waits for a portion of the 16 bit-time timeout period following the end of the IN packet to see if an early-arriving response may be present. If a response is seen within (e.g.) 15.5 bit times, the response is passed along into the host. In the case of a DATA response, the host then issues an ACK handshake, which is passed along the extension to the extended devices. No matter which type of response is seen, the transaction has then been handled per the usual protocol sequence, and the extension logic's involvement has then ended.

If no indication of an early-arriving response is seen by the near-end logic within the period of time, the near-end logic acts to ensure that any later-incoming response will be able to be communicated to it along the extension, and also acts to prevent the host from proceeding on in issuing some later (generally unrelated) outbound packet.

The near-end logic does this by sending a packet into the host, which is effectively a surrogate response in place of any actual later-arriving response. The packet is a garbage packet (as described earlier). The "information" portion (non-EOP part) of the packet is signaled until the end of the expected incoming response packet is seen, at which point the EOP portion of the garbage packet is signaled.

The near-end logic signals into the host for up to a maximum period of time; in the case no response is seen by the near-end logic, the garbage packet is ended (EOP produced) and the host is thereby allowed to continue on.

The near-end logic records whether a late-arriving response was received, as well as the PID and other information pertaining to the response packet received in. The near-end logic also records information relating to the Address and Endpoint values of the IN packet originally sent out by the host.

In the case a late-arriving DATA response was received in, a follow-up ACK handshake packet is generated by the extension logic and sent out to the extended units. The near-end logic keeps signaling the garbage packet into the host until not only the DATA response has been received in, but until the follow-up ACK handshake has also been sent out.

4.4.1.5.2 Later Re-Attempt—

The host, having received no valid DATA response, later re-attempts the transaction.

The host reissues the IN packet. The near-end logic recognizes this as a retransmission of the earlier transaction attempt, based on a comparison of the packet's Address and Endpoint values with the previously-recorded information concerning the prior-attempted transaction.

If the near-end logic determines that no response had been observed in association with the earlier attempt, the re-attempt is treated as if no earlier attempt had been made. For this re-attempt, any observed response is again recorded by the near-end logic, along with the information communicated in the IN packet; another host attempt is expected to take place once again later.

If the near-end logic determines instead that a response had been received back in association with the earlier attempt, the near-end logic provides that previously-recorded packet response (DATA, NAK or STALL) to the host following the end of the IN packet re-issuance.

The near-end logic also acts to prevent the re-attempted transaction from being acted upon by the addressed unit, so that the extension and bus remain free to transmit any following (generally unrelated) outbound packet issued by the host.

The near-end unit does this by corrupting the IN packet, as discussed previously. Note that the corruption is carried out in such a manner that the near-end logic is not prevented from being able to properly evaluate the packet's contents.

The far-end logic passes the IN packet out to the extended devices. Recognizing the corrupted packet, the far-end logic expects no handshake response in from the addressed unit.

In the case of a DATA packet response provided to the host, the host responds with an ACK handshake reply following the end of the DATA packet. The near-end logic corrupts the handshake and passes it along the extension. The far-end logic passes the corrupted handshake packet to the extended devices which ignore the packet. Alternatively, the ACK handshake can be allowed to pass along uncorrupted, since the unexpected handshake will likewise be ignored by the extended devices.

4.4.1.5.3 Summary

If the addressed unit responds to the IN packet within the response time-limit, the transaction is handled as usual.

Otherwise, the near-end logic prevents the host from proceeding on and in so doing also allows a late response to be signaled by the addressed unit, by providing the host with a garbage response packet. The logic makes note of the late-arriving response packet, as well as the particulars of the original request packet.

In the case a late-arriving DATA response was received in, a follow-up ACK handshake packet is generated by the extension logic and sent out to the extended units. The near-end logic keeps signaling the garbage packet into the host until not only the DATA response has been received in, but until the follow-up ACK handshake has also been sent out.

When the host re-attempts the transaction, the near-end logic recognizes the re-attempt, by matching against the previously-recorded packet information. The near-end logic provides the response as was originally signaled by the addressed unit. The near-end logic also prevents the re-attempted transaction from being acted upon by corrupting the outbound packet as it is sent down the extension.

In the case the response provided to the host is a DATA packet, the host issues an ACK handshake which the extension logic allows to propagate (either corrupted or uncorrupted) to the extended devices (which ignore said packet).

4.4.1.6 Concerning Retries—

Note that with the host attempting the transaction up to three times, two of the three attempts are utilized under the approach as described. This leaves a margin of one attempt to handle the case where noise or other interference occurs in the signaling process. It is possible instead to allow the host to reissue the request a third time before providing a valid response, i.e., in order to allow for a longer period of time (farther extension distance) in communicating with the addressed unit. Such an approach would however leave no margin for miscommunication.

Also note that there is in general a variable length of time which may occur from the time of one transaction request to that of the following retry. Many non-isochronous transactions are retried in the following frame (isochronous transactions are always repeated with an interval of one frame), however that period of time can in some instances involve multiple frames (even as many as 255 in the case of interrupt transactions (refer to the bInterval field of Table 9-10). Furthermore, certain host-controller implementations may implement retries of some types of transactions even within the current frame.

4.4.1.7 Isochronous Versus Non-Isochronous Discrimination—

Assumed in the above discussion is the ability of the extension means to differentiate between isochronous and non-isochronous transactions. As mentioned previously, such discrimination cannot generally be accomplished through inspection of bus traffic as it occurs.

The extension means, in order to determine the type(s) of transactions allowed for the endpoints of an addressed unit, monitors the control transfers involving the default control pipe (accessed via endpoint 0) of each unit residing on the extension. (It is known that accesses involving endpoint 0 of a unit are never isochronous, so there is no difficulty in monitoring the transactions involving that endpoint of each unit.)

As discussed in Sections 9.3 through 9.7, the USB specification provides for a set of standard device requests, such as GET_CONFIGURATION, GET_DESCRIPTOR and GET_INTERFACE (refer to Table 9-3). Control transfers, issued by the host as part of the enumeration procedure carried out when the unit is first connected to the USB system, result in the transfer of descriptor information to the host, including standard endpoint descriptor information (refer to Table 9-10). For defined endpoints that will be utilized in communicating between the host and the unit, information is provided in such descriptors regarding the transaction type that is supported (refer to the bmAttributes field in Table 9-10).

By tracking the information returned to the host as a result of the control transfers involving endpoint 0 (whether related to the unit's enumeration, or occurring thereafter), the extension logic is able to maintain information about all endpoints of all units which reside on the extension, including information concerning which endpoints (if any) are currently configured to perform isochronous input or output transactions.

The tracking may involve not only monitoring the standard device requests mentioned above, but additionally standard device requests such as SET_CONFIGURATION, SET_DESCRIPTOR and SET_INTERFACE (as well as possibly other device requests).

4.4.2 Other Topologies

In the most general case, the bus traffic on the extension may involve units (200, 201, 202, 203, 204) which reside on the extension (199), as well as units (205, 206, 207, 208, 209) which are located elsewhere. For these latter units, the traffic seen involves just the packets issued by the host; no responses issued by the addressed units are witnessed. Refer to FIG. 40.

By observing the bus traffic, logic can determine, when the host issues a request, whether the request is answered by a unit present on the extension, or by a unit located elsewhere (or by no unit). Information can be thus maintained by the logic for each address value seen to occur in a SETUP (or OUT or IN) packet concerning the location of the associated unit (resident on the extension, resident elsewhere, or not resident).

Such information can be consulted by the extension logic to enable it to determine whether it should monitor the endpoint 0 device requests issued by the host which target a particular address (i.e., unit), as well as generally to involve itself in any way with transactions associated with a particular address (unit). Normally, the extension logic will only monitor and/or involve itself with transactions associated with addresses (units) which have been found to be resident on the extension.

5. DELAYED-REQUEST EXTENSION

Figure 41:
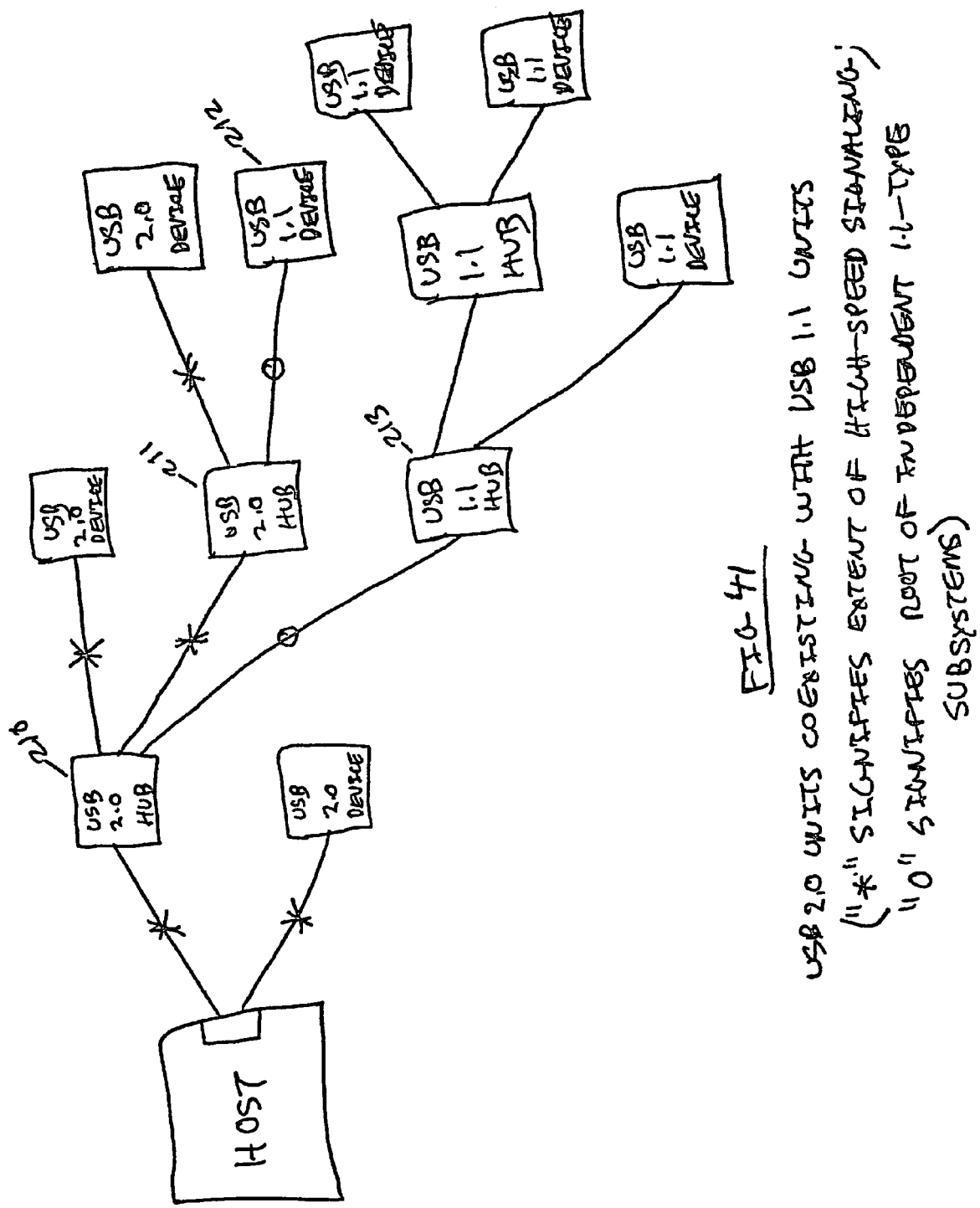
FIG. 41 illustrates a connection topology wherein both USB 2.0 and USB 1.1 units are present.
Figure 42:
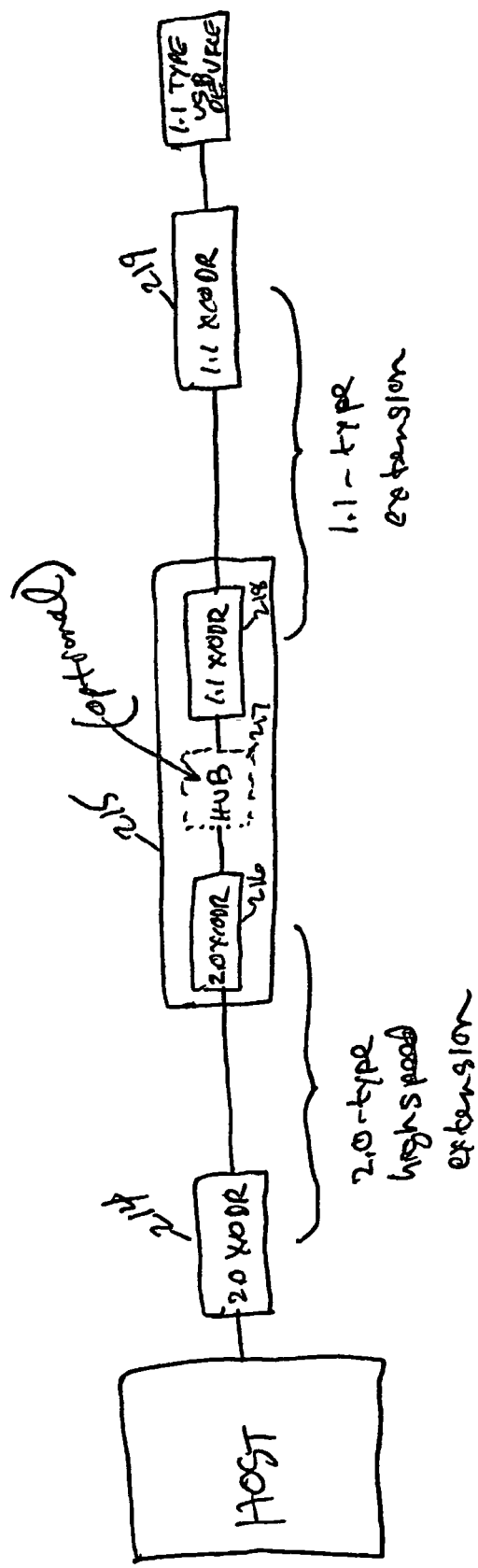
FIG. 42 illustrates a connection topology wherein both USB 2.0 and USB 1.1 extenders are present.

This section describes means of increasing the performance of the meta-timeout extension technique, based on allowing host requests to be delayed for transmission to the extended devices until the extended bus is available for use, with reference to accompanying FIGS. 41 and 42.

5.1 META-TIMEOUT PERFORMANCE LIMITATION

The previously discussed meta-timeout extension approach provides for increased extension distance by allowing information to take longer in arriving back at the host than the nominal timeout period. This approach allows for extended isochronous output, non-isochronous output, isochronous input and non-isochronous input transactions.

Isochronous input transactions are generally limited however to returning data to the host only every other frame. The issue is that otherwise, the host may want to move on to issuing later (generally unrelated) outbound requests, even while a DATA response may still be incoming from the addressed device, as previously discussed.

5.2 SOLUTION IDENTIFIED

An improvement in the isochronous input performance of the meta-timeout approach may be had by allowing the host to continue on to issue further outbound requests while an addressed unit is still in the process of providing a response. This technique generally requires that later requests from the host be stored for communication when the extension bus is ready, and may be termed a "delayed-request" approach.

5.3 GENERAL REQUIREMENTS

As described previously, addressed-unit responses may have been stored and provided to the host at a later point in time. However, host packets which were to be passed to the extended units were propagated "in real time" along the extension to the far-end logic and out to the extended units. Although traffic composed of different packets may have been seen by the host, along the extension, and by the extended units at certain times, information flow along the extension was generally half-duplex in nature.

In order to accommodate delayed transmission of requests (as well as responses), the information flow along the extension must generally be full-duplex.

Generally, information received by the near-end extension logic from the host may be communicated along the extension to the far-end logic, where it may be stored for later transmission (or to influence or control later transmission) to the extended units. Information received by the far-end extension logic from the extended devices may be communicated along the extension to the near-end logic, where it may be stored for later transmission (or to influence or control later transmission) to the host.

5.4 DELAYED-REQUEST FUNCTIONALITY 5.4.1 Dummy Response into the Host

Under the meta-timeout approach described previously, the response sent into the host the first time is a garbage packet in order to hold the host off to prevent it from issuing any later outbound requests, until the addressed unit's response has been received in and the extension bus is ready to accept new packets.

Under the delayed-request approach, there may be no need to hold off the host, since host requests can be accepted whenever they are issued. Therefore the extension logic, rather than sending in a garbage packet, can choose to do nothing; the host will perform a retry later on.

Alternately, the extension logic can issue a very short garbage packet instead, the purpose of which is simply to move the host along, in order to get the next request issued from the host as quickly as possible. (Such a garbage packet can consist of just an EOP, or alternatively a few bit times of K signaling followed by an EOP.)

The length of the garbage packet, as well as the amount of time which is allowed to elapse after the host request before the packet is sent in to the host, can be controlled by the extension logic as may be desired.

5.4.2 Handling Host Requests

When the host has issued a request and the request can then be communicated to the extended devices (which are resident on USB segment(s) beyond the far-end of the extension: the "extension bus"), the request will generally be placed on the extension bus at that time.

Host requests, which cannot be issued onto the extension bus because an earlier host request or an associated response is still in progress, are accepted from the host and saved. Such saved requests are issued onto the extension bus at a later time in the order in which they originally occurred.

Responses to the saved requests are themselves saved (as is done under the meta-timeout approach) and presented to the host when the host re-attempts the transaction.

5.4.3 Maintaining the Frame Environment

Since all requests are no longer necessarily passed out to the extension bus "in real time", special attention is required to ensure that the frame environment is established and maintained on the extension bus as required by the USB specification.

The USB specification requires that an SOF token must occur once a millisecond. Since the frame numbers of the SOF tokens on the extension bus must be related to the frame numbers carried by the SOF tokens issued by the host, and since the period between SOF tokens must be accurately controlled, the extension logic must generally see to it that SOF tokens issued by the host are passed along the extension and out onto the extension bus "in real time".

In order that this be accomplished, the extension logic must ensure that the extension bus around the time of the start of frame is kept clear of traffic, this will enable the host-issued SOF token to be communicated without any interference.

This means that saved requests must not be issued onto the extension bus (or must be corrupted, once issued) when there would not be enough time in the frame for their transmission, based on the time it would take for the request packet(s) to be communicated. Also taken into account must be the length of the response possibly to be returned by the addressed unit.

Such frame-related message tracking and control activities are similar to those required of the host controller(s) in the computer (refer to Sections 11.2 and 11.3).

5.4.4 Near-End Versus Far-End Logic

Generally, host requests may be passed by the near-end logic along the extension to the far-end logic. The far-end logic may store host requests and issue them out onto the extension bus when appropriate. The far-end logic may maintain the frame environment of the extension bus, as previously discussed.

Responses may be received in from the extension bus by the far-end logic, passed along the extension to the near-end logic. The near-end logic may store responses and issue them to the host when appropriate.

Other divisions of labor may be implemented with respect to the activities carried out by the logic at the two ends of the extension. For example, host requests may be stored by just the far-end logic, by just the near-end logic, or by both sets of logic in coordination.

5.4.5 Maintaining Address and Endpoint Information

As described previously with regard to the meta-timeout approach, the extension logic monitors bus traffic in order to determine which endpoints are configured to perform isochronous transactions, as well as to determine which addresses (units) reside on the extension.

5.4.6 Transactions' Protocols

The descriptions following assume that there are no pending saved host requests waiting to be output onto the extension bus, so that the host request(s) can be issued immediately onto the extension bus.

The descriptions also assume that no dummy responses are provided to the host, which then time out when expecting a response. As described previously, another possibility is to instead provide a garbage packet to the host.

5.4.6.1 Isochronous Output—

The host first issues an OUT packet in which the Address and Endpoint to be communicated with are identified. The near-end extension logic recognizes this as the first packet of an isochronous transaction, and passes it along the extension to the far-end extension logic. That logic in turn passes the packet out to the extended units (hubs and devices resident at the far-end of the extension).

Following the OUT, the host issues a DATA0 packet, containing the data to be communicated. This packet is also passed along the extension by the near-end logic, and out to the extended units by the far-end logic.

5.4.6.1.1 Summary—

The isochronous output transaction packets are passed along the extension in the same manner as described previously for the meta-timeout approach.

5.4.6.2 Non-Isochronous Output—

5.4.6.2.1 Initial Attempt—

The host first issues a SETUP or an OUT packet in which the Address and Endpoint to be communicated with are identified. The near-end extension logic recognizes this as the first packet of a non-isochronous transaction, and passes it along the extension to the far-end extension logic. That logic in turn passes the packet out to the extended units.

Following the SETUP or OUT, the host issues a DATA0 or DATA1 packet, containing the data to be communicated. This packet is also passed along the extension by the near-end logic, and out to the extended units by the far-end logic.

The addressed unit issues an ACK. NAK or STALL (or no) handshake packet. The far-end logic waits a period of time following the end of the DATA packet (e.g., 7.5 bit times; refer to Section 7.1.18) to determine whether a handshake response has been issued by the addressed unit. When a response has been received (or when no response has been received within the period of time allotted), the far-end logic then communicates an indication of whether a handshake response has been received, as well as the type of the response, to the near-end logic.

The near-end logic waits for a portion of the 16 bit-time timeout period (refer to Section 7.1.19) following the end of the DATA packet to see if an early-arriving handshake response may be present. (Such an early response may occur for example if the addressed unit responds significantly more quickly than the maximum 7.5 bit times allowed.) If a response is seen within (e.g.) 15.5 bit times, the response is passed along into the host; the transaction has then been handled per the usual protocol sequence, and the extension logic's involvement has then ended.

If no indication of an early-arriving handshake response is seen by the near-end logic within the period of time, the near-end logic acts to save any later-incoming response from the addressed unit. The logic also makes sure that any such response is not passed into the host, to ensure that a retry will later be attempted.

The near-end logic records whether a response was received in and notes the type of response received (ACK, NAK or STALL). The near-end logic also records information relating to the SETUP or OUT and DATA packets sent out by the host.

The host generally proceeds to issue further outbound packets, which if addressed to units on the extension bus, are saved for later transmission if the extension bus is being utilized at that time.

5.4.6.2.2 Later Re-Attempt—

The host, having received no valid handshake response, later re-attempts the transaction.

The host reissues the SETUP or OUT packet, followed by the DATA0 or DATA1 packet. The near-end logic recognizes this as a retransmission of the earlier transaction attempt, based on a comparison of the packets' PID, Address, Endpoint and data values with the previously-recorded information concerning the prior-attempted transaction.

If the near-end logic determines that no handshake response had been observed in association with the earlier attempt, the re-attempt is treated as if no earlier attempt had been made. For this re-attempt, any observed handshake response is again recorded by the near-end logic, along with the information communicated in the SETUP or OUT and DATA packets; another host attempt is expected to take place once again later.

If the near-end logic determines instead that a handshake response had been received back in association with the earlier attempt, the near-end logic provides that previously-observed handshake response to the host following the end of the DATA packet re-issuance.

The near-end logic also acts to prevent the re-attempted transaction from being acted upon by the addressed unit. The near-end unit does this by corrupting the DATA packet (or the SETUP or OUT packet and the DATA packet). Note that the corruption is carried out in such a manner that the near-end logic is not prevented from being able to properly evaluate the packets' contents.

The far-end logic passes the packet information out to the extended devices. Recognizing the corrupted packet(s), the far-end logic expects no handshake response in from the addressed unit.

5.4.6.2.3 Summary—

If the addressed unit responds to the SETUP or OUT and DATA packets within the response time-limit, the transaction is handled as usual.

Otherwise, the near-end logic provides no response to the host, which continues on to issue other outbound packets. The extension logic makes note of the late-arriving response, as well as the particulars of the original request packets.

When the host re-attempts the transaction, the near-end logic recognizes the re-attempt, by matching against the previously-recorded packet information. The near-end logic provides the handshake response as was originally signaled by the addressed unit. The near-end logic also prevents the re-attempted transaction from being acted upon by corrupting the packet(s) as they are sent down the extension.

5.4.6.3 Isochronous Input—

5.4.6.3.1 Initial Request—

The host first issues an IN packet in which the Address and Endpoint to be communicated with are identified. The near-end extension logic recognizes this as the start of an isochronous transaction, and passes it along the extension to the far-end extension logic. That logic in turn passes the packet out to the extended units.

The addressed unit responds with a DATA0 (or with possibly no) packet. The far-end logic waits a period of time following the end of the IN packet (e.g., 7.5 bit times) to determine whether a DATA response has been issued by the addressed unit. The response received (if any, within the period of time allotted) is communicated along the extension to the near-end logic.

The near-end logic waits for a portion of the 16 bit-time timeout period following the end of the IN packet to see if an early-arriving DATA response may be present. If a response is seen within (e.g.) 15.5 bit times, the response is passed along into the host; the transaction has then been handled per the usual protocol sequence, and the extension logic's involvement has then ended.

If no indication of an early-arriving DATA response is seen by the near-end logic within the period of time, the near-end logic acts to save any later-incoming response from the addressed unit. The logic also makes sure that any such response is not passed into the host.

The near-end logic records whether a DATA response was received, as well as the PID and data of the DATA packet received in. The near-end logic also records information relating to the Address and Endpoint values of the IN packet originally sent out by the host.

The host generally proceeds to issue further outbound packets, which if addressed to units on the extension bus, are saved for later transmission if the extension bus is being utilized at that time.

5.4.6.3.2 Subsequent Requests—

The host, although having received no valid DATA response, does not re-attempt the transaction. The host does, however, issue the next isochronous input transaction request for that Address and Endpoint in the following frame.

The host at that time again issues an IN packet. The near-end logic recognizes this as a subsequent, similar isochronous request, based on a comparison of the packet's Address and Endpoint values with the previously-recorded information concerning the prior transaction.

If the near-end logic determines that no DATA response had been observed in association with the earlier request, this following request is treated in the same manner as the earlier request. For this request, any observed DATA response is again recorded by the near-end logic, along with the information communicated in the IN packet.

If the near-end logic determines instead that a DATA response had been received back in association with the earlier request, the near-end logic provides that previously-observed DATA response to the host following the end of the IN packet.

The far-end logic passes the IN packet out to the extended devices. The addressed unit responds with a DATA packet (or with no packet). The response is not passed into the host at this time (as the prior frame's saved DATA response is being returned to the host), but is saved for use at the time of the next request.

If the prior-frame DATA response being returned to the host is finished prior to the completion of receiving the current frame's DATA response, the host will generally proceed to issue further outbound packets even while the current frame's DATA packet is being received in. If the outbound packets are addressed to units on the extension bus, they are saved for later transmission if the extension bus is being utilized at that time.

5.4.6.3.3 Summary—

If the addressed unit responds to the IN packet within the response time-limit, the transaction is handled as usual.

Otherwise, the near-end logic provides no response to the host, which continues on to issue other outbound packets. The logic makes note of the late-arriving DATA response, as well as the particulars of the original request packet.

When the host attempts a similar isochronous transaction in the following frame, the near-end logic recognizes this as a following request by matching against the previously-recorded packet information. The near-end logic provides the DATA response as was originally signaled by the addressed-unit.

The IN packet is sent out over the extension, and the addressed unit responds with a new DATA packet. This DATA response is saved by the extension logic for use the next time.

The host may proceed to issue further outbound packets while the current frame's DATA packet is being received in. If the outbound packets are addressed to units on the extension bus, they are saved for later transmission if the extension bus is being utilized at that time.

5.4.6.4 Non-Isochronous Input—

5.4.6.4.1 Initial Attempt—

The host first issues an IN packet in which the Address and Endpoint to be communicated with are identified. The near-end extension logic recognizes this as the start of a non-isochronous transaction, and passes it along the extension to the far-end extension logic. That logic in turn passes the packet out to the extended units.

The addressed unit responds with a DATA0 or DATA1, or a NAK or STALL (or possibly no) packet. The far-end logic waits a period of time following the end of the IN packet (e.g., 7.5 bit times) to determine whether a response has been issued by the addressed unit. The response received (if any, within the period of time allotted) is communicated along the extension to the near-end logic.

The near-end logic waits for a portion of the 16 bit-time timeout period following the end of the IN packet to see if an early-arriving response may be present. If a response is seen within (e.g.) 15.5 bit times, the response is passed along into the host. In the case of a DATA response, the host then issues an ACK handshake, which is passed along the extension to the extended devices. No matter which type of response is seen, the transaction has then been handled per the usual protocol sequence, and the extension logic's involvement has then ended.

If no indication of an early-arriving response is seen by the near-end logic within the period of time, the near-end logic acts to save any later-incoming response from the addressed unit. The logic also makes sure that any such response is not passed into the host.

The near-end logic records whether a late-arriving response was received, as well as the PID and other information pertaining to the response packet received in. The near-end logic also records information relating to the Address and Endpoint values of the IN packet originally sent out by the host.

In the case a late-arriving DATA response was received in, a follow-up ACK handshake packet is generated by the extension logic and sent out to the extended units.

The host generally proceeds to issue further outbound packets, which if addressed to units on the extension bus, are saved for later transmission if the extension bus is being utilized at that time.

5.4.6.4.2 Later Re-Attempt—

The host, having received no valid DATA response, later re-attempts the transaction.

The host reissues the IN packet. The near-end logic recognizes this as a retransmission of the earlier transaction attempt, based on a comparison of the packet's Address and Endpoint values with the previously-recorded information concerning the prior-attempted transaction.

If the near-end logic determines that no response had been observed in association with the earlier attempt, the re-attempt is treated as if no earlier attempt had been made. For this re-attempt, any observed response is again recorded by the near-end logic, along with the information communicated in the IN packet; another host attempt is expected to take place once again later.

If the near-end logic determines instead that a response had been received back in association with the earlier attempt, the near-end logic provides that previously-recorded packet response (DATA, NAK or STALL) to the host following the end of the IN packet re-issuance.

In the case of a DATA packet response provided to the host, the host responds with an ACK handshake reply following the end of the DATA packet. The near-end logic corrupts the handshake and passes it along the extension. The far-end logic passes the corrupted handshake packet to the extended devices which ignore the packet. Alternatively, the ACK handshake can be allowed to pass along uncorrupted, since the unexpected handshake will likewise be ignored by the extended devices.

The near-end logic also acts to prevent the re-attempted transaction from being acted upon by the addressed unit. The near-end unit does this by corrupting the IN packet, as discussed previously. Note that the corruption is carried out in such a manner that the near-end logic is not prevented from being able to properly evaluate the packet's contents.

The far-end logic passes the IN packet out to the extended devices. Recognizing the corrupted packet, the far-end logic expects no handshake response in from the addressed unit.

5.4.6.4.3 Summary—

If the addressed unit responds to the IN packet within the response time-limit, the transaction is handled as usual.

Otherwise, the near-end logic provides no response to the host, which continues on to issue other outbound packets. The logic makes note of the late-arriving response, as well as the particulars of the original request packet.

In the case a late-arriving DATA response was received in, a follow-up ACK handshake packet is generated by the extension logic and sent out to the extended units.

When the host re-attempts the transaction, the near-end logic recognizes the re-attempt, by matching against the previously-recorded packet information. The near-end logic provides the response as was originally signaled by the addressed unit. The near-end logic also prevents the re-attempted transaction from being acted upon by corrupting the outbound packet as it is sent down the extension.

In the case the response provided to the host is a DATA packet, the host issues an ACK handshake which the extension logic allows to propagate (either corrupted or uncorrupted) to the extended devices (which ignore said packet).

5.4.7 Concerning Retries

As described previously, it is possible to allow the host to reissue the request a third time before providing a valid response, i.e., in order to allow for a longer period of time (farther extension distance) in communicating with the addressed unit. Such an approach would however leave no margin for miscommunication.

Note as also discussed previously, there is in general a variable length of time which may occur from the time of one transaction request to that of the following retry. Certain host-controller implementations may implement retries of some types of transactions even within the current frame.

5.4.8 Maximum Cable Length

It is the latter situation which effectively limits the amount of time allowed for the response to be obtained so as to be provided when the retry is again attempted. In general, the worst-case situation of a retry possibly being attempted immediately following the preceding attempt requires that the response be available for transmission to the host in a timely manner.

With the timeout period commencing from the end of the EOP of the (last) packet output by the host, the extension propagation time out, the addressed unit's reply time, and the inbound response propagation time must be accomplished by about no later than when the end of the EOP of the (last) retry packet is retransmitted.

The amount of time available is thus the timeout period, plus the minimum time between consecutive transactions output by the host controller, plus the length of time to output the request packet(s). The minimum timeout period is 16 bit times, the between-transactions time is understood to be a minimum of typically 24 bit times (for current host controller implementations), and the shortest request packet time is about 34 bit times (an IN packet). The total response time is thus about 74 bit times.

With a maximum addressed-unit reply time of 7.5 bit times, about 66.5 bit times is available for the round-trip propagation, or about 33 bit times for the one-way propagation. A more conservative figure is about 21 bit times, for the computation of which a between-transactions time approaching zero is utilized.

This translates (for full-speed transmissions) to about a 1750 ns one-way delay. Assuming a total extension logic propagation delay overhead of about 50 ns, about 1700 ns is left for cable propagation delay. Assuming a velocity of propagation of about 0.67 ft/ns (0.2 m/ns), a cable length of about 1130 ft (345 m) is possible.

5.4.9 Ensuring Reliable System Behavior

Methods may be employed as discussed previously to help ensure that an unworkable or potentially unreliable system cannot be configured. These methods may be practiced for the meta-timeout extension means as well as for the delayed-request extension means.

As discussed, the actual propagation delay of the cable being utilized can be determined, with functioning of the extension occurring only if the cable delay is no greater than an allowed limit (e.g., 1700 ns as determined above).

Also as discussed previously, use can be made of TEHubs in the near-end extension unit. The "per-TEHub" delay equivalent may be computed as the total propagation delay allowed (e.g., 1700 ns as determined above) divided by the maximum depth of hubs allowed (5), for example, 340 ns per hub.

This approach, although workable, results in an overly-conservative figure for the amount of extension delay allowed, since the overhead of each hub (plus cable) is actually only 70 ns. Thus, a system employing for example three hubs ahead of the extension would be allowed to utilize an extension delay of only 680 ns (equivalent to about 450 ft or 140 m).

Since the maximum allowable extension delay of about 1700 ns is much greater than the maximum-hub-depth delay of 350 ns, an alternative approach is to simply limit the total extension delay to about 1350 ns, independent of the number of hubs actually present in the system. In this approach no TEHubs would be required or utilized.

5.4.10 Impact of Higher Data Rates

The USB specification has recently been revised, resulting in Revision 2.0 of the specification.

One significant change is an increase in the maximum data rate by a factor of forty. Such a data rate suggests that fiber optics would likely be employed in extending the high-speed transfers of USB 2.0. Use of electrical cable is not necessarily ruled out, although transmission and/or reception means which act to compensate for the high frequency attenuation characteristics of the cable would likely need to be employed.

Another significant change is in the role that high-speed-capable hubs play in USB 2.0. The hubs perform "rate-matching" when communicating information between high-speed portions of the system and slower full/low-speed portions of the system. The result is that each high-speed hub (210, 211) acts as a separate host controller (i.e., USB system) which regard to the full- and low-speed devices (and hubs) (212, 213) attached to it. Refer to FIG. 41.

In such systems the there would be a first maximum hub depth (e.g., five) relating to the number of 2.0-type hubs which can be connected in series to the host, as well as the extant maximum hub depth limitation (five) relating to the number of 1.1-type hubs.

Therefore in those situations where extension of only 1.1-type devices is required in a USB 2.0 environment, a combination 2.0-type and 1.1-type extension may be of advantage. Here, near-end extension logic (214) handles USB 2.0 protocol to enable extension of 2.0-type high-speed signaling. The middle unit (215) has high-speed extension logic (216) to communicate with the near-end unit. The middle unit optionally incorporates a hub (217), and has 1.1-type extension logic (218) (similar to previously-described near-end extension logic. The far-end unit (219) has 1.1-type extension logic to communicate with the middle unit. Refer to FIG. 42.

Such an implementation may be utilized in the context of long-haul, meta-timeout and delayed-request extension techniques. The advantage of such an implementation is that greater extension distance (e.g., twice the distance) can be achieved through the coupling of 2.0-type and 1.1-type extension means where extension of 1.1-type devices (possibly including 1.1-type hubs) is required.

While a preferred embodiment of the invention has been shown and described, it will be apparent to those skilled in the art that many other changes and modifications may be made without departing from the invention in its broader aspects. It is therefore intended that the appended claims cover all such changes and modifications coming within the spirit and scope of the accompanying claims.

The invention claimed is:

1. An extension-optimized, self-powered hub for use in a USB-compliant system, the hub comprising:
   USB hub circuitry;
   an upstream USB connection;
   a downstream USB connection; and
   an auxiliary power connection in which the auxiliary power connection includes four conductors: Aux Power, Aux Power Return, Sense and Sense Return, wherein the Sense conductor is to provide a signal to an upstream power source or hub that indicates a position of the self-powered hub in a series of hubs.

2. A hub according to claim 1 in which the auxiliary power connection includes a first conductor connecting auxiliary power to a power supply in the hub circuitry, and a second conductor coupled to a controller in the hub circuitry operable to detect presence/absence of auxiliary power and to select operation of the hub as self-powered or bus-powered.

3. A hub according to claim 1 in which there are two said auxiliary power connections including input and output auxiliary power connections.

4. A hub according to claim 1 in combination with a cable containing a set of USB conductors coupled to one of the USB connections and a power conductor supplying auxiliary power coupled to the auxiliary power connection.

5. A system including a hub according to claim 1, the hub connecting a USB host via the upstream USB connection through the hub to a USB device via the downstream connection; the auxiliary power connection including upstream and downstream auxiliary power connections; the system including an auxiliary power source connected to the upstream auxiliary power connection.

6. The combination of claim 4 further including an auxiliary signal conductor connected to circuitry in the hub for transmitting or receiving signals in parallel to the USB conductors.

7. A system according to claim 5 including means for signaling position of one of said hubs in the system.

* * * * *